(12) United States Patent
Tazume

(10) Patent No.: US 12,307,411 B2
(45) Date of Patent: May 20, 2025

(54) INFORMATION PROCESSING DEVICE, METHOD, AND PROGRAM

(71) Applicant: Rakuten Group, Inc., Tokyo (JP)

(72) Inventor: Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 1003 days.

(21) Appl. No.: 17/251,066

(22) PCT Filed: Dec. 27, 2018

(86) PCT No.: PCT/JP2018/048321
§ 371 (c)(1),
(2) Date: Dec. 10, 2020

(87) PCT Pub. No.: WO2020/136844
PCT Pub. Date: Jul. 2, 2020

(65) Prior Publication Data
US 2021/0125146 A1    Apr. 29, 2021

(51) Int. Cl.
*G06Q 10/0835*    (2023.01)
*B64D 1/08*    (2006.01)
(Continued)

(52) U.S. Cl.
CPC ......... *G06Q 10/08355* (2013.01); *B64D 1/08* (2013.01); *B64U 10/14* (2023.01);
(Continued)

(58) Field of Classification Search
CPC .............. G06Q 10/08355; B64U 10/14; B64U 2101/64; B64U 2101/30; B64D 1/08; G05D 1/0011
See application file for complete search history.

(56) References Cited

U.S. PATENT DOCUMENTS

| | | | |
|---|---|---|---|
| 6,940,451 B2* | 9/2005 | Kanerva | H04W 64/00 342/357.31 |
| 2015/0193724 A1* | 7/2015 | Stevens | G06Q 10/083 705/330 |

(Continued)

FOREIGN PATENT DOCUMENTS

| | | |
|---|---|---|
| JP | 2003-085382 A | 3/2003 |
| JP | 2016-153337 A | 8/2016 |

(Continued)

OTHER PUBLICATIONS

Liverpool Echo, "Parcel lockers >>at stations," Liverpool, UK, May 20, 2015, 4.*

(Continued)

*Primary Examiner* — Nathan Erb
(74) *Attorney, Agent, or Firm* — Sughrue Mion, PLLC

(57) ABSTRACT

An information processing device (10, 310) includes an information acquirer that acquires to-be-delivered package information related to a package to be delivered to a user, and movement information related to a movement of the user to a first geographical point, and an information generator that generates, on the basis of the movement information, receiving method information expressing a receiving method whereby the user receives the package related to the to-be-delivered package information, the receiving method information being generated from when the movement information is acquired to when the user arrives at the first geographical point.

6 Claims, 45 Drawing Sheets

(51) Int. Cl.
  *B64U 10/14*    (2023.01)
  *G05D 1/00*     (2006.01)
  *B64U 101/30*   (2023.01)
  *B64U 101/64*   (2023.01)

(52) U.S. Cl.
  CPC ........ *G05D 1/0011* (2013.01); *B64U 2101/30* (2023.01); *B64U 2101/64* (2023.01)

(56) References Cited

U.S. PATENT DOCUMENTS

| | | | |
|---|---|---|---|
| 2016/0257401 A1* | 9/2016 | Buchmueller | G01C 21/3423 |
| 2017/0147929 A1  | 5/2017 | Tsunoda et al. | |
| 2017/0169373 A1* | 6/2017 | Roulland | G06Q 10/06313 |
| 2017/0193309 A1* | 7/2017 | Kanda | G06T 7/215 |
| 2018/0174102 A1* | 6/2018 | Winkle | G06Q 10/08355 |
| 2018/0204178 A1* | 7/2018 | Arshad | G01C 21/3415 |
| 2019/0333130 A1* | 10/2019 | Jha | G06Q 30/0635 |

FOREIGN PATENT DOCUMENTS

| | | | |
|---|---|---|---|
| JP | 6159859 B1 | 7/2017 |
| JP | 6370441 B1 | 8/2018 |
| WO | 2015/182200 A1 | 12/2015 |
| WO | 2018/229871 A1 | 12/2018 |

OTHER PUBLICATIONS

International Search Report for PCT/JP2018/048321 dated Mar. 12, 2019 (PCT/ISA/210).

\* cited by examiner

FIG. 7

BOX MANAGEMENT TABLE

| BOX ID | STATE INFORMATION | PACKAGE ID | CARD ID |
|---|---|---|---|
| B01 | IN USE | P01 | ... |
| B02 | EMPTY | NULL | NULL |
| B03 | RESERVED | P02 | ... |
| B04 | IN USE | P05 | ... |
| B05 | IN USE | P04 | ... |
| B06 | IN USE | P08 | ... |
| B07 | IN USE | P06 | ... |
| B08 | IN USE | P07 | ... |

FIG. 10

USER TABLE

| USER ID | CARD ID |
|---------|---------|
| U101    | C001    |
| ...     | ...     |
| U999    | C999    |

FIG. 11

USE STATE TABLE

| LOCKER ID | BOX ID | STATE INFORMATION | PACKAGE ID | CARD ID |
|---|---|---|---|---|
| R228 | B01 | IN USE | P101 | ... |
| R228 | B02 | EMPTY | NULL | NULL |
| R228 | B03 | RESERVED | P103 | ... |
| R228 | B04 | IN USE | P104 | ... |
| R228 | B05 | IN USE | P105 | ... |
| R228 | B06 | IN USE | P106 | ... |
| R228 | B07 | IN USE | P107 | ... |
| R228 | B08 | IN USE | P108 | ... |
| R229 | B01 | IN USE | P109 | ... |
| R229 | B02 | IN USE | P110 | ... |
| ... | ... | ... | ... | ... |
| R229 | B08 | IN USE | P118 | ... |
| ... | ... | ... | ... | ... |

FIG. 12

TO-BE-DELIVERED PACKAGE TABLE

| PACKAGE ID | USER ID | STATE INFORMATION | NOTES INFORMATION ||
| --- | --- | --- | --- | --- |
| | | | SENDER INFORMATION | TYPE INFORMATION |
| P001 | U001 | UNSPECIFIED | ... | BOOK |
| P002 | U001 | SPECIFIED | ... | CLOTHING |
| P003 | U001 | DELIVERED | ... | FOOD |
| P004 | U001 | RECEIVED | ... | NEEDS REFRIGERATION |
| P005 | U001 | ... | ... | NEEDS FREEZING |
| ... | ... | ... | ... | ... |
| P091 | U002 | RECEIVED | ... | NEEDS FREEZING |
| ... | ... | ... | ... | ... |

FIG. 16

INPUT SCREEN

| DEPARTURE TRAIN STATION | TRAIN STATION A |
|---|---|
| + TRANSFER TRAIN STATION ||
| ARRIVAL TRAIN STATION | TRAIN STATION B |

ROUTE SEARCH

| ROUTE 1 | 17:33 – 18:00 (27 min) TOKAIDO MAIN LINE |
| ROUTE 2 | 17:41 – 18:07 (26 min) TOKAIDO MAIN LINE |
| ROUTE 3 | 17:48 – 18:13 (25 min) TOKAIDO MAIN LINE |
| ROUTE 4 | 17:34 – 18:15 (41 min) KEIHIN TOHOKO LINE |

ROUTE SELECT

FIG. 17

INSTALLATION LOCATION TABLE

| LOCKER ID | NAME OF TRAIN STATION | LATITUDE AND LONGITUDE | MOVEMENT TIME IN TRAIN STATION |
|---|---|---|---|
| R228 | TRAIN STATION B | ... | 03:00 |
| R229 | TRAIN STATION B | ... | 02:30 |
| ... | ... | ... | ... |
| R928 | TRAIN STATION I | ... | 01:30 |
| ... | ... | ... | ... |

FIG. 26

LANDING PORT TABLE

| NAME OF TRAIN STATION | PORT ID | LATITUDE AND LONGITUDE | PORT MOVEMENT TIME |
|---|---|---|---|
| TRAIN STATION B | P228 | ... | 13:00 |
| TRAIN STATION B | P229 | ... | 12:30 |
| ... | ... | ... | ... |
| TRAIN STATION I | P928 | ... | 11:30 |
| ... | ... | ... | ... |

FIG. 30

FLIGHT TIME TABLE

| NAME OF TRAIN STATION | FLIGHT TIME |
|---|---|
| B1 | 8 MIN |
| B2 | 4 MIN |
| B3 | 8 MIN |

FIG. 31

RIDE TIME TABLE

| NAME OF DEPARTURE TRAIN STATION | NAME OF ARRIVAL TRAIN STATION | RIDE TIME |
|---|---|---|
| ... | ... | ... |
| A | B1 | 5 MIN |
| A | B2 | 10 MIN |
| A | B3 | 20 MIN |
| ... | ... | ... |
| B1 | B2 | 5 MIN |
| ... | ... | ... |

FIG. 34

SETTING POINT TABLE

| USER ID | LATITUDE AND LONGITUDE OF CHECKPOINT | LATITUDE AND LONGITUDE OF FIRST GEOGRAPHICAL POINT |
|---|---|---|
| U101 | ... | ... |
| ... | ... | ... |
| U999 | ... | ... |

FIG. 35

ACTION HISTORY TABLE

| USER ID | LATITUDE AND LONGITUDE | DETECTION TIME AND DATE |
|---|---|---|
| ... | ... | ... |
| U101 | ... | 2018/04/01 08:00 |
| U101 | ... | 2018/04/01 08:10 |
| U101 | ... | 2018/04/01 08:20 |
| ... | ... | ... |
| U999 | ... | 2018/03/31 23:30 |
| U999 | ... | 2018/03/31 23:40 |
| U999 | ... | 2018/03/31 23:50 |
| ... | ... | ... |

FIG. 36

ACTION PREDICTION RESULT TABLE

| USER ID | LATITUDE AND LONGITUDE | PREDICTED TIME |
|---|---|---|
| ... | ... | ... |
| U101 | ... | 08:00 |
| U101 | ... | 08:10 |
| U101 | ... | 08:20 |
| ... | ... | ... |
| U999 | ... | 22:00 |
| U999 | ... | 22:10 |
| U999 | ... | 22:20 |
| ... | ... | ... |

FIG. 40

USE STATE TABLE

| LOCKER ID | BOX ID | STATE INFORMATION | PACKAGE ID | CARD ID | PRIORITY |
|---|---|---|---|---|---|
| R228 | B01 | IN USE | P101 | ... | 1 |
| R228 | B02 | IN USE | P102 | ... | 2 |
| R228 | B03 | IN USE | P103 | ... | 3 |
| R228 | B04 | IN USE | P104 | ... | 4 |
| R228 | B05 | IN USE | P105 | ... | 5 |
| R228 | B06 | IN USE | P106 | ... | 6 |
| R228 | B07 | IN USE | P107 | ... | 7 |
| R228 | B08 | IN USE | P108 | ... | 8 |
| R229 | B01 | IN USE | P109 | ... | 1 |
| R229 | B02 | IN USE | P110 | ... | 2 |
| ... | ... | ... | ... | ... | ... |

FIG. 41

USER TABLE

| USER ID | CARD ID | LATITUDE AND LONGITUDE |
|---------|---------|------------------------|
| U101    | C001    | ...                    |
| ...     | ...     | ...                    |
| U999    | C999    | ...                    |

FIG. 42

PACKAGE IN DELIVERY TABLE

| PACKAGE ID | LOCKER ID | CARD ID | PRIORITY |
|---|---|---|---|
| P151 | R228 | ... | 9 |
| P152 | R229 | ... | 9 |

FIG. 45

BOX MANAGEMENT TABLE

| BOX ID | STATE INFORMATION | PACKAGE ID | CARD ID | STORE TIME | PRIORITY |
|---|---|---|---|---|---|
| B01 | IN USE | P01 | ... | 12:00 | 1 |
| B02 | IN USE | P01 | ... | 11:00 | 2 |
| B03 | IN USE | P02 | ... | 10:00 | 3 |
| B04 | IN USE | P05 | ... | 09:00 | 4 |
| B05 | IN USE | P04 | ... | 08:00 | 5 |
| B06 | IN USE | P08 | ... | 07:00 | 6 |
| B07 | IN USE | P06 | ... | 06:00 | 7 |
| B08 | IN USE | P07 | ... | 05:00 | 8 |

INFORMATION PROCESSING DEVICE, METHOD, AND PROGRAM

CROSS REFERENCE TO RELATED APPLICATIONS

This application is a National Stage of International Application No. PCT/JP2018/048321 filed Dec. 27, 2018.

TECHNICAL FIELD

This present disclosure relates to an information processing device, a method, and a program.

BACKGROUND ART

Conventionally, systems that use unmanned aircraft such as drones to deliver packages are known (for example, Patent Literature 1).

CITATION LIST

Patent Literature

Patent Literature 1: Unexamined Japanese Patent Application Publication No. 2016-153337

SUMMARY OF INVENTION

Technical Problem

However, with the system of Patent Literature 1, the unmanned aircraft delivers the package to the home of the user irrespective of the movement of the user, even in cases in which the user is not at home and is moving to the home, for example. Consequently, with the system of Patent Literature 1, there are cases in which a package cannot be delivered by a delivery method that is sufficiently convenient to the user.

The present disclosure is made with the view of the above situation, and an objective of the present disclosure is to provide an information processing device, a method, and a program that enable a package to be delivered by a delivery method that is sufficiently convenient to the user.

Solution to Problem

An information processing device according to a first aspect of the present disclosure that achieves the objective described above includes:

an information acquirer that acquires
  to-be-delivered package information related to a package to be delivered to a user, and
  movement information related to a movement of the user to a first geographical point; and
an information generator that generates, on the basis of the movement information, receiving method information expressing a receiving method whereby the user receives the package related to the to-be-delivered package information, the receiving method information being generated from when the movement information is acquired to when the user arrives at the first geographical point.

Advantageous Effects of Invention

With the information processing device, the method, and the program according to the present disclosure, a package can be delivered by a delivery method that is sufficiently convenient to the user.

BRIEF DESCRIPTION OF DRAWINGS

FIG. 7 is a drawing illustrating an example of a box management table stored in the locker device according to Embodiment 1;

FIG. 10 is a drawing illustrating an example of a user table stored in the delivery control server according to Embodiment 1;

FIG. 11 is a drawing illustrating an example of a use state table stored in the delivery control server according to Embodiment 1;

FIG. 12 is a drawing illustrating an example of a to-be-delivered package table stored in the delivery control server;

FIG. 16 is a drawing illustrating an example of an input screen displayed by the mobile terminal;

FIG. 17 is a drawing illustrating an example of an installation location table stored in the delivery control server;

FIG. 26 is a drawing illustrating an example of a landing port table stored in the delivery control server;

FIG. 30 is a drawing illustrating an example of a flight time table stored in the delivery control server;

FIG. 31 is a drawing illustrating an example of a ride time table stored in the delivery control server;

FIG. 34 is a drawing illustrating an example of a setting point table stored in the delivery control server;

FIG. 35 is a drawing illustrating an example of an action history table stored in the delivery control server;

FIG. 36 is a drawing illustrating an example of an action prediction result table stored in the delivery control server;

FIG. 40 is a drawing illustrating an example of a use state table stored in the delivery control server according to Embodiment 4;

FIG. 41 is a drawing illustrating an example of a user table stored in the delivery control server according to Embodiment 4;

FIG. 42 is a drawing illustrating an example of a package in delivery table stored in the delivery control server;

FIG. 45 is a drawing illustrating an example of a box management table stored in a locker device according to Modified Example of Embodiment 4.

DESCRIPTION OF EMBODIMENTS

Embodiment 1

Hereinafter, Embodiment 1 of the present disclosure is described while referencing the drawings.

Figure 1:
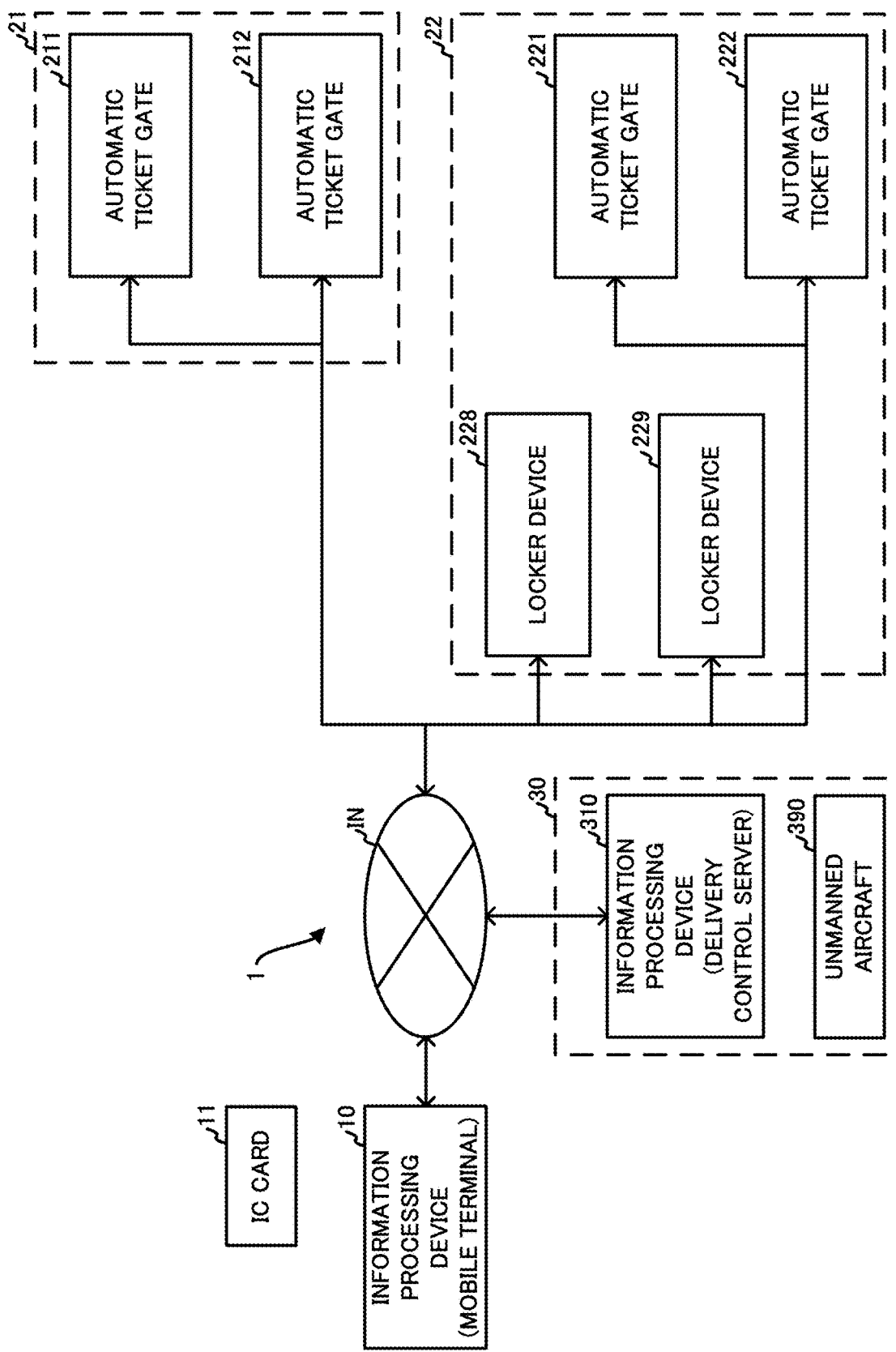
FIG. 1 is a system configuration drawing illustrating a configuration example of an information processing system according to Embodiment 1 of the present disclosure.

As illustrated in FIG. 1, an information processing system 1 according to Embodiment 1 of the present disclosure includes an information processing device 10 that is carried by a user, train station service systems 21 and 22 that perform services at train stations used by the user, and a delivery system 30 that delivers packages to a receiving location in a train station specified by the information processing device 10. The information processing device 10, the train station service systems 21 and 22, and the delivery system 30 are communicably connected to an internet IN.

In one example, the information processing device 10 is a smartphone or a tablet personal computer, and has a size and a weight suitable for carrying. As such, in the following, the information processing device 10 is referred to as "mobile terminal 10."

Figure 2:
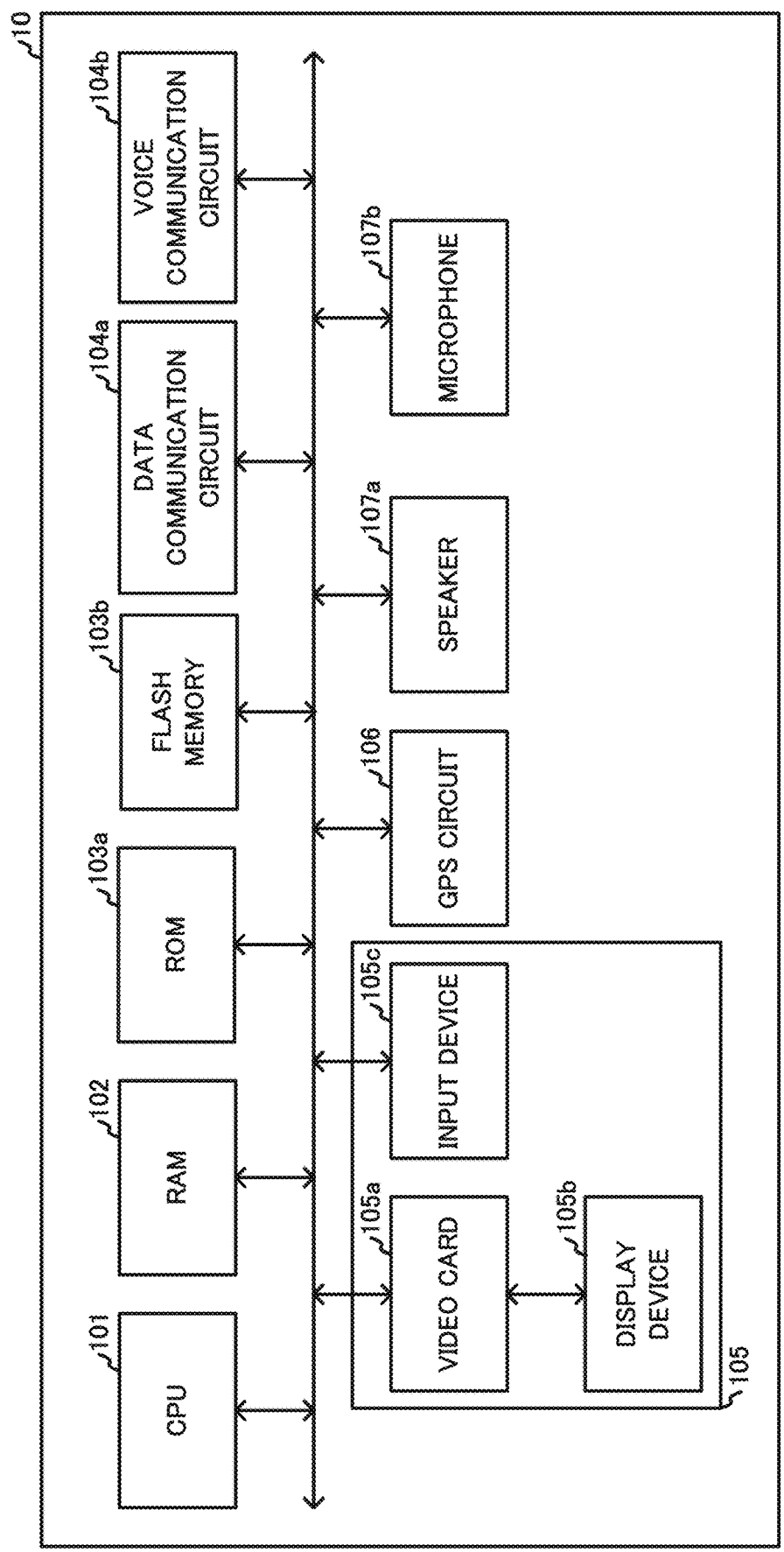
FIG. 2 is a hardware configuration diagram illustrating a configuration example of a terminal device.

As illustrated in FIG. 2, the mobile terminal 10 includes a central processing unit (CPU) 101, a random access memory (RAM) 102, a read only memory (ROM) 103a, a flash memory 103b, a data communication circuit 104a, a voice communication circuit 104b, a touch panel 105, a global positioning system (GPS) circuit 106, a speaker 107a, and a microphone 107b.

The CPU 101 carries out total control of the mobile terminal 10 by executing programs stored in the ROM 103a or the flash memory 103b. At the time of execution of the programs by the CPU 101, the RAM 102 temporarily stores data to be processed.

Various types of programs are stored in the ROM 103a and the flash memory 103b. The flash memory 103b is implemented as semiconductor memory and also stores various types of data and tables in which data is stored. The mobile terminal 10 may include a hard disk instead of the flash memory 103b.

In one example, the data communication circuit 104a carries out, in accordance with a communication standard such as long term evolution (LTE) or 3rd Generation (3G), data communication using radio waves with a non-illustrated base station that is connected to the internet IN. Thus, the data communication circuit 104a carries out data communication with the delivery system 30 and the train station service systems 21 and 22 that are connected via the internet IN. The voice communication circuit 104b carries out voice communication with the non-illustrated base station using radio waves.

The touch panel 105 includes a video card 105a, a display device 105b, and an input device 105c. The video card 105a renders images on the basis of digital signals output from the CPU 101, and outputs image signals that represent the rendered images. The display device 105b is implemented as a liquid crystal display (LCD), and displays images in accordance with the image signals output from the video card 105a. The mobile terminal 10 may include a plasma display panel (PDP) or electroluminescence (EL) display instead of the LCD. The input device 105c is implemented as a touchpad, and inputs signals corresponding to user operations. When viewed from the display direction of the display device 105b, the display device 105b and the input device 105c are arranged so that the display surface and the input surface overlap each other.

The GPS circuit 106 receives a GPS signal emitted from a GPS satellite, measures the latitude and longitude of the mobile terminal 10 on the basis of the received GPS signal, and outputs a signal expressing the measured latitude and longitude. The speaker 107a outputs speech in accordance with signals output by the CPU 101, and the microphone 107b inputs signals expressing ambient speech.

The user carrying the mobile terminal 10 also carries an integrated circuit (IC) card 11 used to pay for fares with electronic money. The IC card 11 includes a communication circuit that includes an antenna, a CPU, a RAM, a ROM, and an electrically erasable programmable read-only memory (EEPROM) (all not illustrated in the drawings).

The communication circuit receives, via the antenna, radio waves from the train station service system 21 or 22, demodulates signals output from the antenna, and outputs the demodulated signals to the CPU. Additionally, the communication circuit modulates signals output from the CPU, and sends the modulated signals via the antenna to the train station service system 21 or 22 as radio waves.

The configurations and functions of the CPU, the RAM, and the ROM of the IC card 11 are the same as the configurations and functions of the CPU 101, the RAM 102, and the ROM 103a of the mobile terminal 10 illustrated in FIG. 2. The EEPROM of the IC card 11 is rewritable memory, information is stored, updated, and deleted from the EEPROM by the CPU, and the stored information is read by the CPU.

The EEPROM stores identification information (hereinafter referred to as "card IDentification (ID)") that identifies the IC card 11, and information expressing a charged amount, which is an amount of money deposited with an electronic money management entity.

When the communication circuit receives, from the train station service system 21 or 22, a read signal commanding the reading of the information expressing the charged amount, the CPU reads the card ID and the information expressing the charge amount from the EEPROM in accordance with the received read signal. Thereafter, the CPU outputs the read information to the communication circuit, and the communication circuit returns the output information to the train station service system 21 or 22.

Then, the communication circuit receives, from the train station service system 21 or 22, information expressing an amount obtained by subtracting the train station admission fee or fare from the charged amount (hereinafter referred to as "balance"), and an update signal commanding updating of the information expressing the charged amount. Thereafter, in accordance with the received update signal, the CPU updates the information expressing the charged amount stored in the EEPROM with the received information expressing the balance. Thus, the admission fee to the train station or the fare is settled by electronic money. In the present embodiment, for ease of description, the admission fee and the fare are assumed to be fixed amounts, regardless of the boarding and deboarding train stations.

The user carrying the IC card 11 performs, on the input device 105c of the mobile terminal 10, an operation to download an application used to specify a receiving method of a package (hereinafter referred to as "receiving method specification app"). When the input device 105c inputs a signal corresponding to this operation, the CPU 101 reads, in accordance with the signal, a predetermined uniform resource locator (URL) stored in advance in the flash memory 103b. Next, the CPU 101 generates a request for requesting permission to download the receiving method specification app, and outputs the request to the data communication circuit 104a with the read URL as the destination.

When the data communication circuit 104a, which sent the request, completes downloading the receiving method specification app, the CPU 101 executes the receiving method specification app. When the execution of the receiving method specification app starts, the CPU 101 executes non-illustrated registration request processing for requesting registration, in the delivery system 30, of identification information identifying the user (hereinafter referred to as "user ID") and the card ID of the IC card 11 to be used by the user. This is to prepare for the user to use the receiving method specification app to specify a location in the train station as a receiving location of a package addressed to the user.

When the execution of the registration request processing starts, the CPU 101 causes the display device 105b to perform a display prompting inputting of the user ID and the card ID. In one example, the user that views the display device 105b views the card ID printed on the back side of the IC card 11, and performs operations on the input device 105c for inputting the card ID of the IC card 11 and the user ID.

When the input device 105c inputs signals in accordance with the operations of the user, the CPU 101 generates, on the basis of the input signals, a registration request that includes the user ID and the card ID and that requests the registration of these pieces information, and outputs the generated registration request to the communication circuit 104a with the delivery system 30 as the destination. Thereafter, the data communication circuit 104a sends the registration request and, then, the CPU 101 ends the execution of the registration request processing.

Next, an example of a case is described in which the user that has completed the usage preparation of the receiving method specification app boards a train at train station A, which is the train station nearest to the place of work of the user, carrying the mobile terminal 10, and deboards at a train station B, which is the train station nearest to the home of the user. In this example, the train station service system 21 is installed at the train station A and the train station service system 22 is installed at the train station B.

As illustrated in FIG. 1, the train station service system 21 includes an automatic ticket gate 211 that allows or denies admission onto the platform of the train station A in accordance with the payment of an admission fee using the IC card 11, and an automatic ticket gate 212 that allows or denies exiting from the platform in accordance with the payment of a fare.

Figure 3:
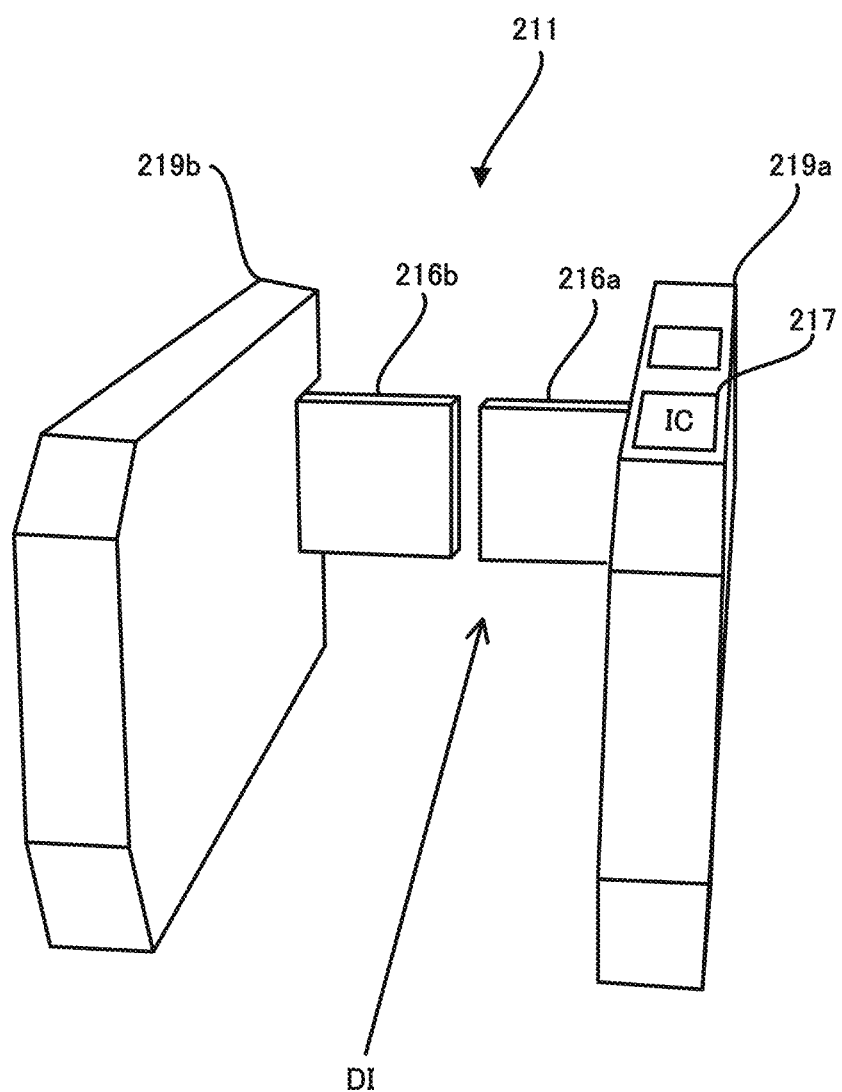
FIG. 3 is an appearance configuration drawing illustrating an example of the appearance of an automatic ticket gate.

The automatic ticket gate 211 includes a master 219a and a slave 219b as illustrated in FIG. 3. The master 219a and the slave 219b are disposed so as to face each other across a path leading to the platform. The master 219a and the slave 219b respectively include a gate 216a and a gate 216b that open and close the path.

The master 219a includes an IC card reader/writer (hereafter referred to as "IC card RW") 217 that performs the settlement of the admission fee by communicating with the IC card 11 carried by the user. This settlement is performed at a position prior to the gate 216a and the gate 216b when facing an admission direction DI to the platform. The IC card RW 217 includes a non-illustrated communication circuit that has the same configuration and functions as the communication circuit of the IC card 11.

Figure 4:
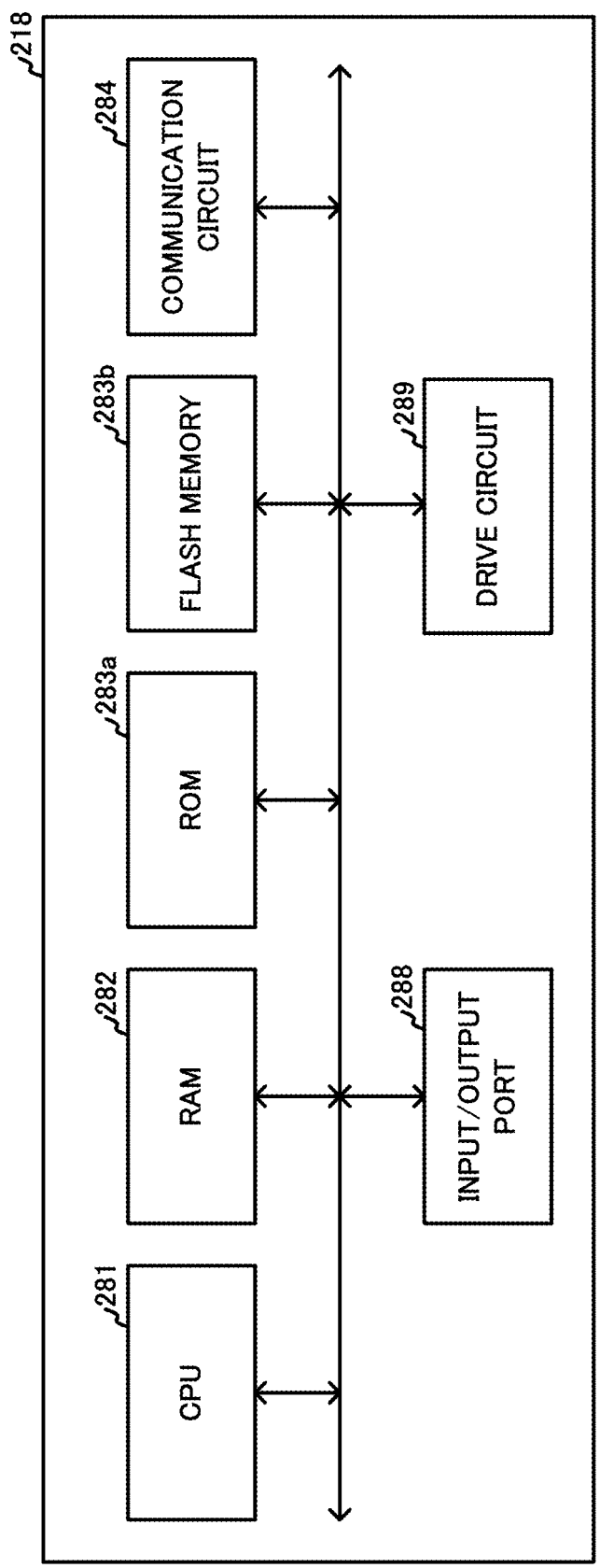
FIG. 4 is a hardware configuration diagram illustrating a configuration example of a control device of the automatic ticket gate.

The master 219a includes, in a housing, a control device 218 such as illustrated in FIG. 4 that controls the opening/closing of the gate 216a and the gate 216b so as to open the path for a predetermined amount of time when the settlement of the admission fee by the IC card RW 217 is successful and close the path after the predetermined amount of time elapses or when the settlement fails.

The control device 218 includes a CPU 281, a RAM 282, a ROM 283a, a flash memory 283b, a communication circuit 284, an input/output port 288, and a drive circuit 289. The configurations and functions of the CPU 281, the RAM 282, the ROM 283a, and the flash memory 283b of the control device 218 are the same as the configurations and functions of the CPU 101, the RAM 102, the ROM 103a, and the flash memory 103b of the mobile terminal 10 illustrated in FIG. 2.

In one example, the communication circuit 284 is implemented as a network interface card (NIC) and communicates with the delivery system 30 via a router (not illustrated in the drawings) that is connected to the internet IN. The input/output port 288 is connected to the IC card RW 217 of FIG. 3 by a non-illustrated communication cable, outputs, to the IC card RW 217, signals output by the CPU 281, and inputs, to the CPU 281, signals output by the IC card RW 217.

The drive circuit 289 drives non-illustrated motors that open and close the gates 216a and 216b of FIG. 3 in accordance with signals output by the CPU 281.

Here, when a user seeking admission to the platform holds the IC card 11 up to the IC card RW 217 of the automatic ticket gate 211, the non-illustrated antenna of the communication circuit of the IC card RW 217 and the non-illustrated antenna of the communication circuit of the IC card 11 couple by electromagnetic induction. When the coupling of the antennas is detected, the communication circuit of the IC card RW 217 outputs, to the control device 218 of the automatic ticket gate 211, a coupling signal that notifies of the coupling.

When the coupling signal is input via the input/output port 288, the CPU 281 of the control device 218 illustrated in FIG. 4 outputs a read signal to the IC card RW 217 via the input/output port 288. The IC card RW 217 sends the output read signal to the IC card 11 and, then, receives the card ID of the IC card 11 and the information expressing the charged amount.

Thereafter, the CPU 281 of the automatic ticket gate 211 acquires the card ID and the information expressing the charged amount that are input from the IC card RW 217, and determines whether or not the charged amount is greater than or equal to the admission fee read from the flash memory 283b at startup. When the CPU 281 determines that the charged amount is greater than or equal to the predetermined admission fee, the CPU 281 determines to permit the admission of the user that used the IC card 11.

Thereafter, the CPU 281 generates an admission notification that includes the acquired card ID of the IC card 11 and that notifies that the user that used the IC card 11 has passed through the automatic ticket gate 211 and entered the platform. Next, the CPU 281 outputs the admission notification to the communication circuit 284 with the delivery system 30 as the destination, and the communication circuit 284 sends the output admission notification.

The CPU 281 calculates the balance by subtracting the admission fee from the charged amount and outputs, to the IC card RW 217, information expressing the balance and an update signal and, then, outputs, to the drive circuit 289, a signal commanding the opening of the path.

In contrast, when the CPU 281 determines that the charged amount is less than the admission fee, the CPU 281 denies the admission of the user that used the IC card 11, and outputs, to the drive circuit 289, a signal commanding the closing of the path.

The configuration and functions of the automatic ticket gate 212 illustrated in FIG. 1 are the same as the configuration and functions of the automatic ticket gate 211. However, the automatic ticket gate 211 and the automatic ticket gate 212 are different in that, while the automatic ticket gate 211 permits and denies admission of the user onto the platform in accordance with the payment of the admission fee and sends the admission notification when admission is permitted, the automatic ticket gate 212 permits and denies exiting of the user from the platform in accordance with the payment of the fare and sends an exit notification notifying that the user has exited the platform when exiting is permitted.

The train station service system 22 installed at train station B includes the automatic ticket gates 221 and 222, and locker devices 228 and 229. The configurations and functions of the automatic ticket gates 221 and 222 of the train station service system 22 of train station B are the same as the configurations and functions of the automatic ticket gates 211 and 212 of the train station service system 21 of train station A.

Figure 5:
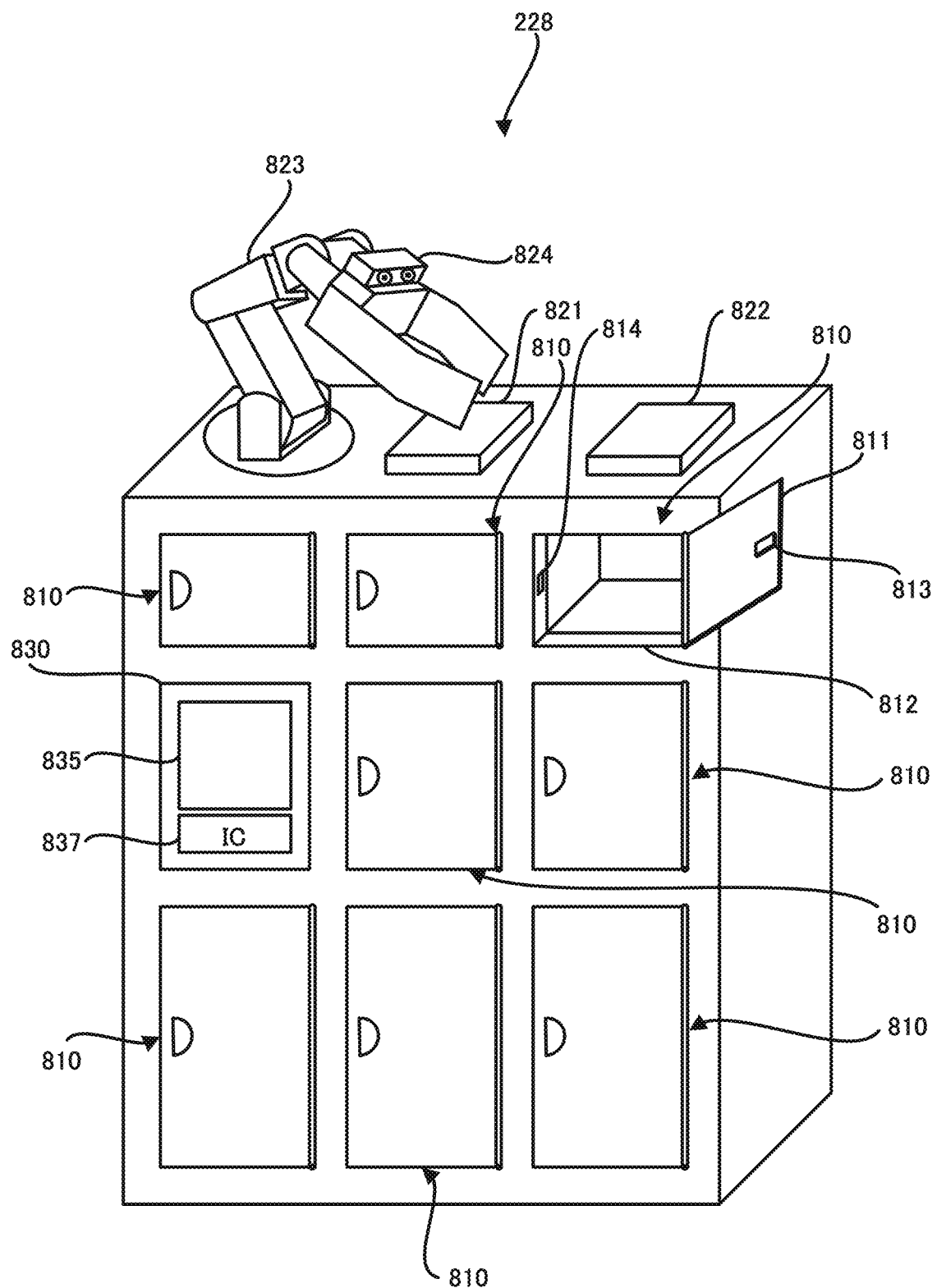
FIG. 5 is an appearance configuration drawing illustrating an example of the appearance of a locker device.

The locker device 228 includes a plurality of storage boxes 810 such as illustrated in FIG. 5. The plurality of storage boxes 810 is used to store packages. Additionally, the locker device 228 includes, on a top surface, package stands 821 and 822 on which packages are placed, and a robot arm 823 that stores the packages placed on the package stands 821 and 822 in storage boxes 810 in which packages are not stored (that is, storage boxes 810 that are empty). Furthermore, the locker device 228 includes a control device 830 that controls locking and unlocking of the storage boxes 810 and the movements of the robot arm 823.

The storage boxes 810 each include a door 811, a door frame 812 that receives the door 811, a bolt that is a deadbolt 813 installed on a back side of the door 811, and a strike plate 814 that is a seat of the deadbolt 813 and that is installed on the door frame 812.

Additionally, the storage boxes 810 each include a non-illustrated motor which, in accordance with signals output from the control device 830, locks the door 811 by inserting the deadbolt 813 into the strike plate 814 and unlocks the door 811 by pulling the deadbolt 813 out of the strike plate 814.

The robot arm 823 is implemented as a vertical articulated robot. The robot arm 823 includes a drive circuit that drives a non-illustrated motor in accordance with signals output from the control device 830, and a two-claw-type gripper that is opened and closed in parallel by the motor. The robot arm 823 also includes an imaging device 824 that is mounted on the gripper and that has an optical axis that is directed toward the tips of the claws of the gripper, a plurality of joint structures that can be moved by motors, and a plurality of arms that move around the joint structures. The gripper is not limited to two-claw-type grippers and may have three or more claws, or may include a plurality of fingers instead of the two claws.

The imaging device 824 of the robot arm 823 is implemented as a digital stereo camera. The imaging device 824 performs imaging in accordance with signals output from the control device 830, and outputs, to the control device 830, information expressing two captured images that have parallax with each other. This is for the control device 830 to identify, on the basis of the parallax, the positional coordinates in three-dimensional space, the size, and the like of the object to be gripped by the gripper.

Figure 6:
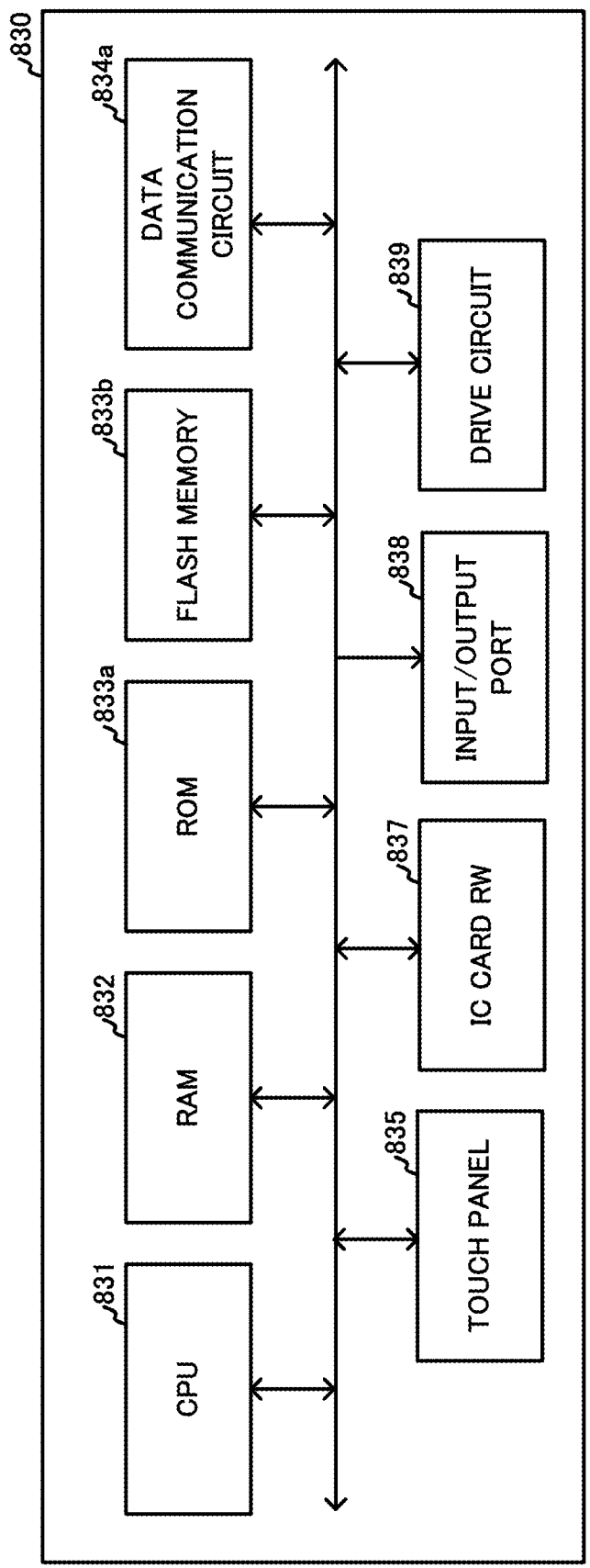
FIG. 6 is a hardware configuration diagram illustrating a configuration example of a control device of the locker device.

As illustrated in FIG. 6, the control device 830 includes a CPU 831, a RAM 832, a ROM 833a, a flash memory 833b, a data communication circuit 834a, a touch panel 835, an IC card RW 837, an input/output port 838, and a drive circuit 839. The configurations and functions of the CPU 831, the RAM 832, the ROM 833a, the flash memory 833b, the data communication circuit 834a, and the touch panel 835 of the control device 830 are respectively the same as the configurations and functions of the CPU 101, the RAM 102, the ROM 103a, the flash memory 103b, the data communication circuit 104a, and touch panel 105 of the mobile terminal 10 illustrated in FIG. 2. The configuration and functions of the IC card RW 837 of the control device 830 are the same as the configuration and functions of the IC card RW 217 of the automatic ticket gate 211 illustrated in FIG. 3.

The flash memory 833b stores a box management table such as illustrated in FIG. 7. Information used to manage the storage states of the storage boxes 810 is stored in the box management table. A plurality of data is stored in the box management table. In each piece of the data, a box ID that identifies a storage box 810, state information that expresses the storage state of that storage box 810, a package ID of a package stored in that storage box 810, and the card ID of the IC card 11 used by the user that is the destination of that package are associated.

The input/output port 838 is connected, via non-illustrated communication cables, to the non-illustrated drive circuit and the imaging device 824 of the robot arm 823. The input/output port 838 outputs, to the drive circuit or the imaging device 824 of the robot arm 823, control signals output from the CPU 831, and inputs signals output from the imaging device 824 to the CPU 831.

The drive circuit 839 is connected, via a plurality of non-illustrated cables, to the non-illustrated motor of each of the plurality of doors 811, and drives each of the motors in accordance with signals output by the CPU 831.

Facing a non-illustrated exit direction from the platform of the train station B, the locker device 228 is installed at a position beyond the automatic ticket gate 222. As such, the locker device 228 may be used by general users such as shoppers, for example, in addition to passengers at train station B. As such, first, a simple example is described of a case in which a shopper that shops in the vicinity of the train station B, for example, deposits a package obtained by shopping in the locker device 228 and, thereafter, a detailed example is described of the receiving of a package by a user that boarded a train using the IC card 11.

When the shopper stands in front of the locker device 228 and performs an operation on the touch panel 835 for selecting an empty storage box 810, the touch panel 835 outputs a signal that corresponds to that operation. The CPU 831 of the control device 830 illustrated in FIG. 6 acquires, in accordance with the signal output from the touch panel 835, identification information (hereinafter referred to as "box ID") that identifies the storage box 810 selected by the shopper. Next, the CPU 831 outputs, to the drive circuit 839, the acquired box ID and an open signal commanding the unlocking and opening of the door 811. Thereafter, the drive circuit 839 drives the non-illustrated motor of the selected storage box 810 to unlock and open the door 811.

The shopper places the package on the package stand 821 or 822 and performs, on the touch panel 835, an operation of specifying the package stand 821 or 822 on which the package is placed, and an operation that causes the robot arm 823 to store the package that is placed on the package stand 821 or 822. Thereafter, the CPU 831 acquires, on the basis of the signal output from the touch panel 835, identification information (hereinafter referred to as "package stand ID") that identifies the package stand 821 or 822 on which the package is placed. Next, the CPU 831 outputs, to the input/output port 838 connected to the robot arm 823, the acquired package stand ID and a control signal that causes the imaging device 824 to move to a position at which it is possible to image the package stand 821 or 822 identified by the package stand ID and, then, causes the imaging device 824 to face a direction in which it is possible to image the package stand 821 of 822.

Thereafter, the CPU 831 outputs, to the imaging device 824 via the input/output port 838, a signal commanding imaging to be performed, and inputs, via the input/output port 838, a signal output from the imaging device 824. The CPU 831 calculates, on the basis of the parallax of the two captured images expressed in the input signal, the positional coordinates and the size in three-dimensional space of the package to be stored. Thereafter, the CPU 831 acquires, from the flash memory 833b, information expressing the positional coordinates and size of the storage box 810 that is stored in advance in association with the box ID of the selected storage box 810.

Next, the CPU 831 generates, on the basis of the calculated information expressing the positional coordinates and size of the package and the acquired information expressing the positional coordinates and size of the storage box 810, a control signal that causes the package placed on the package stand 821 or 822 to be gripped and stored in the storage box 810. Thereafter, the CPU 831 outputs the generated control signal to the robot arm 823 via the input/output port 838, and the robot arm 823 operates in accordance with the control signal to store the package of the shopper, which is placed on the package stand 821 or 822, in the storage box 810 selected by the shopper.

Thereafter, the CPU 831 controls the touch panel 835 so as to perform a display prompting the shopper to hold up the IC card to the IC card RW 837. When the shopper that views the touch panel 835 holds up the IC card to the IC card RW 837, the CPU 831 acquires, from the IC card RW 837, the card ID that identifies the IC card of the shopper. This is done in order to use the acquired card ID as an electronic key to the door 811 of the selected storage box 810. Next, the CPU 831 outputs, to the drive circuit 839, the box ID of the selected storage box 810, and a close signal commanding the closing and the locking of the door 811. Thereafter, the CPU 831 associates and stores, in the box management table of FIG. 7, the box ID of the storage box 810 that is now in an in-use state, state information expressing the in-use state, a package ID of "NULL", and the acquired card ID. The package ID is set to "NULL" because a package ID was not given to the package of the shopper. Thus, the depositing of the package is completed.

Next, when the shopper that has completed shopping holds up the IC card to the IC card RW 837 to settle the storage fee, the CPU 831 acquires the card ID from the IC card RW 837, and acquires, from the box management table of FIG. 7, the box ID associated with the acquired card ID. This is to identify the storage box 810 in which the package of the shopper is stored. Thereafter, the CPU 831 outputs, to the drive circuit 839, the acquired box ID and an open signal commanding the unlocking and opening of the door 811. Additionally, in the box management table illustrated in FIG. 7, the CPU 831 updates the state information associated with the box ID to state information expressing an empty state, and updates the package ID and the card ID to "NULL." Thereafter, the shopper removes the package, thus completing the retrieval of the package.

In one example, the CPU 831 of the locker device 228 executes non-illustrated use state notification processing for outputting, on a predetermined cycle such as one minute, a use state notification that notifies the delivery system 30 of the use state of the locker. This is because the delivery system 30 determines the receiving location of the package on the basis of the use state of the locker. When the execution of the use state notification processing starts, the CPU 831 acquires, from the flash memory 833b, the information stored in the box management table of FIG. 7 and identification information that identifies the locker device 228 (hereinafter referred to as "locker ID"). Next, the CPU 831 generates a use state notification that includes the acquired information, and outputs the generated use state notification to the data communication circuit 834a with the delivery system 30 as the destination. Thereafter, when the data communication circuit 834a sends the use state notification, the CPU 831 ends the execution of the use state notification processing.

The configuration and functions of the locker device 229 are the same as the configuration and functions of locker device 228.

The delivery system 30 is installed at an office that delivers packages in the area including the train station B and the home of the user that uses the mobile terminal 10. The delivery system 30 includes an information processing device 310 that processes information related to the delivery control of packages delivered to the office, and an unmanned aircraft 390 that delivers packages in accordance with the control of the information processing device 310. Since the information processing device 310 is a server device, in the following description, the information processing device 310 is referred as "delivery control server 310."

Figure 8:
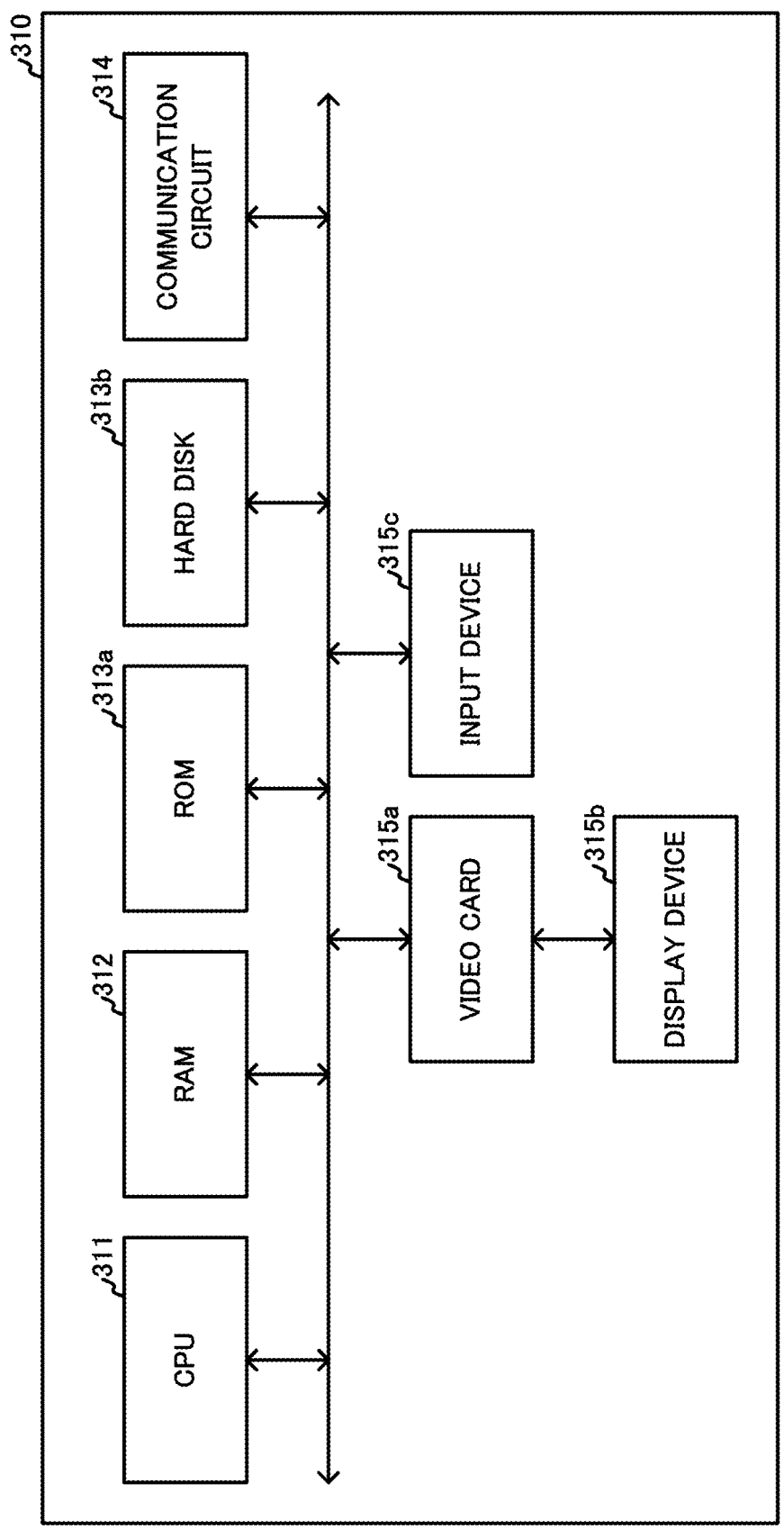
FIG. 8 is a hardware configuration diagram illustrating a configuration example of a delivery control server.

As illustrated in FIG. 8, the delivery control server 310 includes a CPU 311, a RAM 312, a ROM 313a, a hard disk 313b, a communication circuit 314, a video card 315a, a display device 315b, and an input device 315c. The configurations and functions of the CPU 311, the RAM 312, the ROM 313a, the video card 315a, and display device 315b of the delivery control server 310 are the same as the configurations and the functions of the CPU 101, the RAM 102, the ROM 103a, the video card 105a, and the display device 105b of the mobile terminal 10 illustrated in FIG. 2. Additionally, the configuration and functions of the communication circuit 314 of the delivery control server 310 are the same as the configuration and functions of the communication circuit 284 of the automatic ticket gate 211 illustrated in FIG. 4.

The hard disk 313b of the delivery control server 310 illustrated in FIG. 8 stores various types of data and tables in which data is stored. The delivery control server 310 may include flash memory instead of the hard disk 313b. The input device 315c is implemented as one or more of a keyboard, a mouse, and a touch pad, for example.

Figure 9:
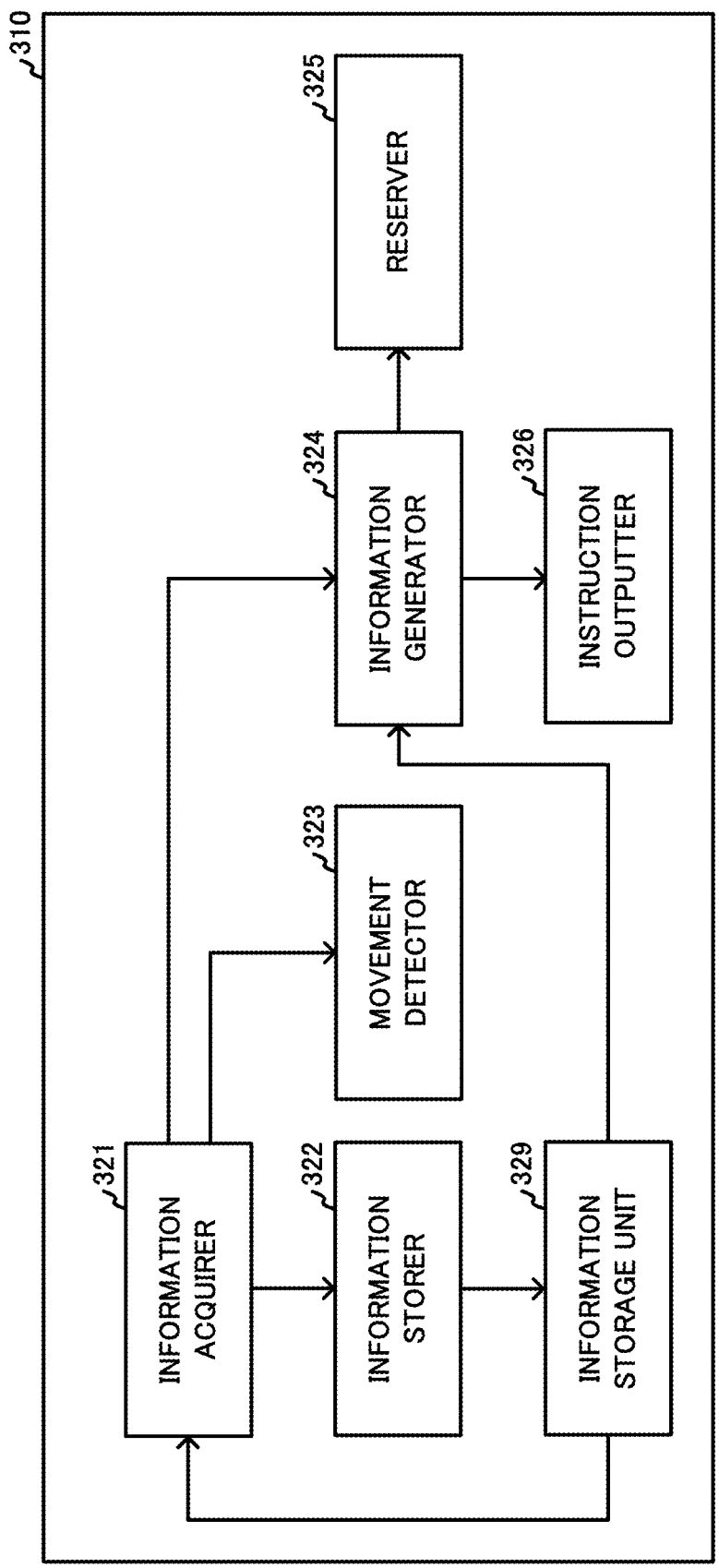
FIG. 9 is a functional block diagram illustrating an example of the functions of the delivery control server according to Embodiment 1.

When the communication circuit 314 receives a registration request from the mobile terminal 10, the CPU 311 of the delivery control server 310 executes non-illustrated user registration processing for registering the user ID of the user using the mobile terminal 10. Thus, the CPU 311 functions as an information acquirer 321 and an information storer 322 such as illustrated in FIG. 9, and the hard disk 313b functions as an information storage unit 329 such as illustrated in FIG. 9.

A user table such as illustrated in FIG. 10 is stored in the information storage unit 329. One or a plurality of data, in which the user ID of the user and the card ID of the IC card 11 used by the user are associated, is stored in the user table.

When the execution of the non-illustrated registration processing starts, the information acquirer 321 acquires the registration request from the communication circuit 314 and acquires the user ID and the card ID included in the registration request. Thereafter, the information storer 322 associates and stores the acquired user ID and the card ID in the user table of FIG. 10 and, then, ends the execution of the user registration processing.

The information storage unit 329 further stores a use state table such as illustrated in FIG. 11. Information about the use states of the locker devices 228 and 229, for which the storage fees are settled using IC cards, is stored in the state use table. A plurality of records is stored in the use state table. In each record, the locker ID of the locker device 228 or 229, the box ID of the storage box 810 of the locker device 228 or 229, the state information that expresses the use state of the storage box 810, the package ID of the package stored in the storage box 810, and the card ID of the IC card 11 used by the user that is the addressee of the package are associated and stored.

When the communication circuit 314 of the delivery control server 310 receives the use state notification from the locker device 228 or 229, the CPU 311 of the delivery control server 310 executes non-illustrated state update processing for updating the use state table of FIG. 11 on the basis of the received use state notification.

When the execution of the non-illustrated state update processing starts, the information acquirer 321 acquires the use state notification from the communication circuit 314, and acquires the locker ID, the box ID, the state information, the package ID, and the card ID included in the use state notification. Thereafter, in the use state table of FIG. 11, the information storer 322 updates the state information, the package ID, and the card ID that are associated with the acquired locker ID and box ID to the acquired state information, package ID, and card ID and, then, ends the execution of the state update processing.

The information storage unit 329 further stores a to-be-delivered package table such as illustrated in FIG. 12. A plurality of information related to packages to be delivered (hereinafter referred to as "to-be-delivered package information") is stored in the to-be-delivered package table. The to-be-delivered package information is information in which information identifying the package to-be-delivered (hereinafter referred to as "package ID"), the user ID of the user specified as the addressee of the package, state information expressing a delivery state of the package, and notes information expressing notes such as the sender or type of the package are associated.

The delivery states of the package include an unspecified state in which the receiving method of the package is not specified, a specified state in which the receiving method is specified but the package has not been delivered to the specified receiving location, a delivered state in which the package has been delivered to the specified receiving location but the user has not received the package, and a received state in which user has received the package.

Figure 13:
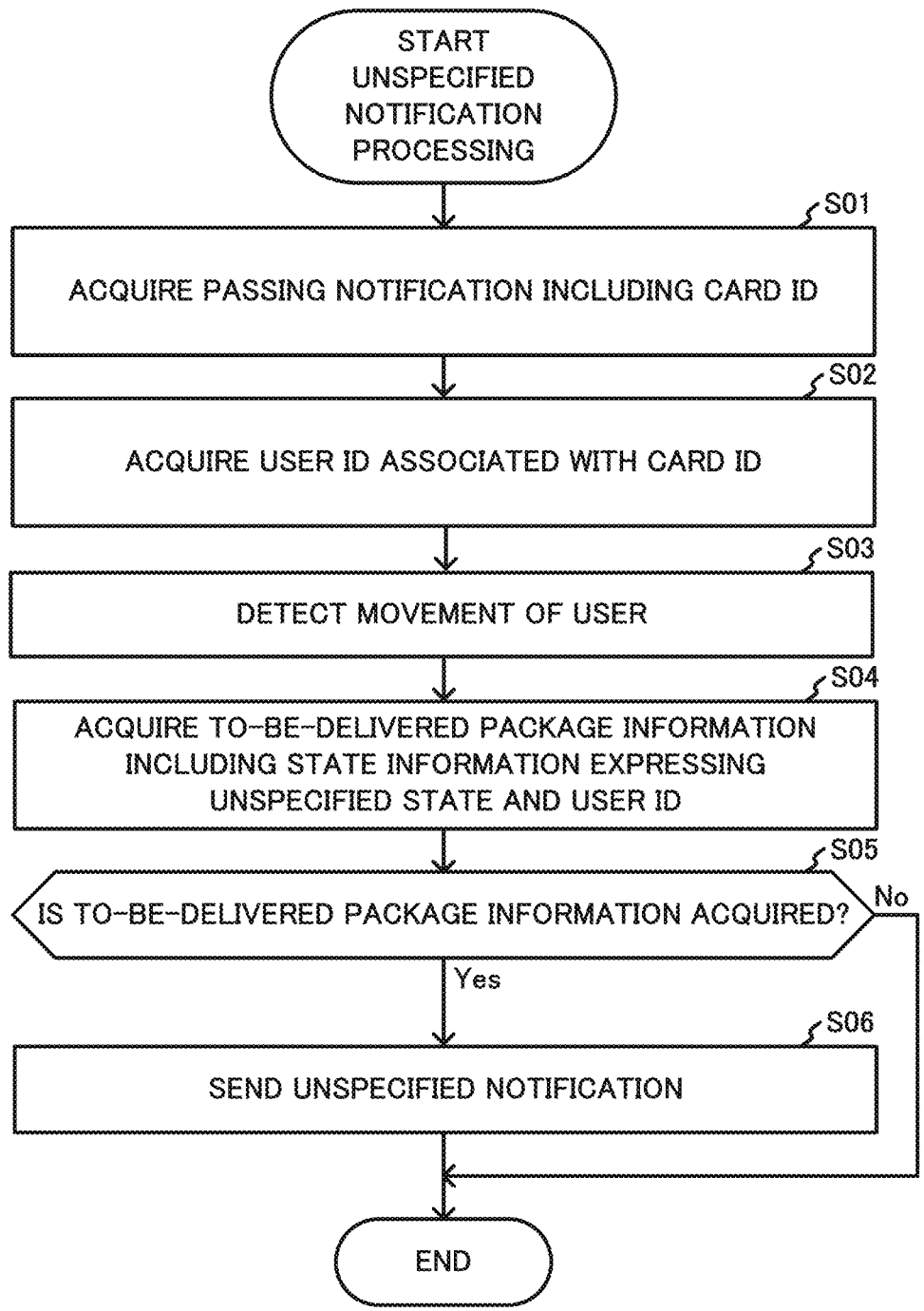
FIG. 13 is a flowchart illustrating unspecified notification processing executed by the delivery control server.

When the communication circuit 314 of the delivery control server 310 receives, from the automatic ticket gate 211 illustrated in FIG. 1, an admission notification notifying that the user has entered the platform, the CPU 311 executes unspecified notification processing such as illustrated in FIG. 13 for notifying the user that there is a package addressed to the user for which the receiving method is not specified. Thus, the CPU 311 functions as a movement detector 323 such as illustrated in FIG. 9 that detects movement of the user from the train station A where the automatic ticket gate 211 is installed or movement of the user passing the train station A as a transit train station.

When the execution of the unspecified notification processing starts, the information acquirer 321 illustrated in FIG. 9 acquires the admission notification from the communication circuit 314 illustrated in FIG. 8, and acquires the card ID included in the admission notification (step S01). Next, the movement detector 323 acquires the user ID, in the user table of FIG. 10, associated with the acquired card ID (step S02). This is to identify the user that used the IC card 11 identified by the card ID at the automatic ticket gate 211. Next, the movement detector 323 detects the movement of the user identified by the acquired user ID (step S03).

Thereafter, the information acquirer 321 acquires, from the to-be-delivered package table of FIG. 12, the to-be-delivered package information that includes the acquired user ID and the state information expressing the unspecified state (step S04). Next, the information acquirer 321 determines whether or not the to-be-delivered package information can be acquired (step S05). At this time, when the information acquirer 321 determines that the to-be-delivered package information cannot be acquired (step S05; No), it is determined that there is not a package for which the receiving method is not specified and that is addressed to the user for which movement is detected. Thereafter, the information acquirer 321 ends the execution of the unspecified notification processing without sending an unspecified notification.

In contrast, when the information acquirer 321 determines that the to-be-delivered package information can be acquired (step S05; Yes), the information acquirer 321 generates an unspecified notification that includes the to-be-delivered package information and that notifies that the receiving method for that package is not specified. Thereafter, the information acquirer 321 outputs the generated unspecified notification to the communication circuit 314 with the mobile terminal 10, used by the user for which movement is detected, as the destination (step S06), and, after the communication circuit 314 sends the unspecified notification, ends the execution of the unspecified notification processing.

When, after the user passes through the automatic ticket gate 211 of train station A, the delivery control server 310 that receives the admission notification from the automatic ticket gate 211 sends the unspecified notification, the mobile terminal 10 carried by the user receives the unspecified notification. As such, typically, the mobile terminal 10 receives the unspecified notification while the user is waiting for a train on the platform of train station A, or while riding on a train and moving from train station A toward train station B.

When the data communication circuit 104a illustrated in FIG. 2 receives the unspecified notification, the CPU 101 of the mobile terminal 10 executes non-illustrated execution prompting processing for prompting the user to execute the receiving method specification app. As a result, the CPU 101 functions as an information acquirer 121 such as illustrated in FIG. 14 that acquires the unspecified notification, and as an audio and display controller 125 that controls the output of displays and audio prompting the execution of the receiving method specification app.

When the execution prompting processing starts, the information acquirer 121 acquires the unspecified notification from the data communication circuit 104a, and acquires the to-be-delivered package information included in the acquired unspecified notification. Thereafter, the information acquirer 121 acquires the notes information included in the to-be-delivered package information, and the audio and display controller 125 controls the touch panel 105 so as to display a message prompting the user to specify the receiving method of the package and also display the sender and the type of the package that are expressed in the notes information. Next, the audio and display controller 125 controls the speaker 107a so as to output audio prompting the user to specify the receiving method and, thereafter, ends the execution of the execution prompting processing.

Figure 15:
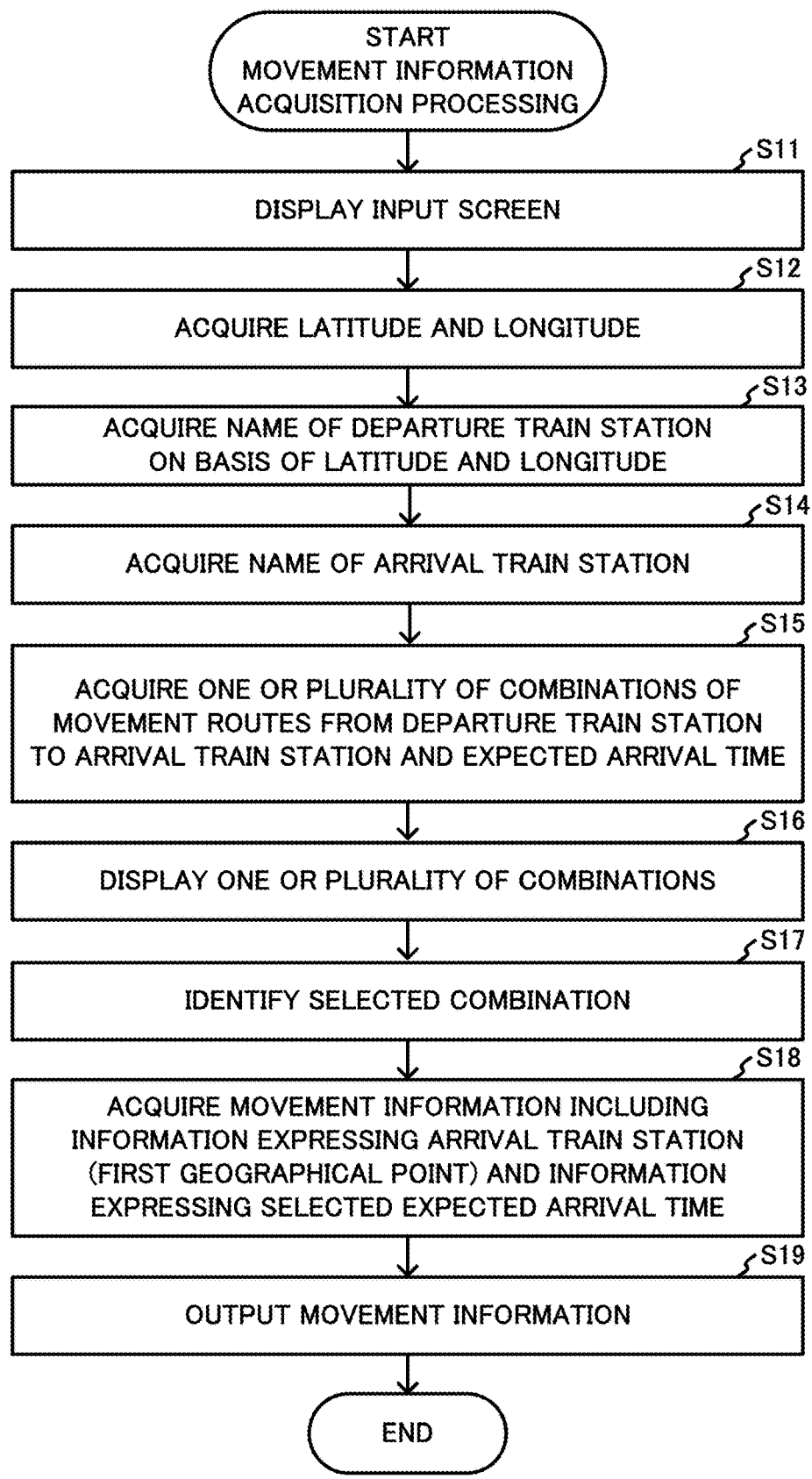
FIG. 15 is a flowchart illustrating movement information acquisition processing executed by the mobile terminal.

When the user that views the message and the sender and the type of the package performs an operation on the touch panel 105 to startup the receiving method specification app, the CPU 101 executes the receiving method specification app in accordance with the signal that the touch panel 105 outputs in response to the operation. As a result, the CPU 101 executes movement information acquisition processing such as illustrated in FIG. 15 for acquiring information related to the movement of the user, which is used in the generation of the receiving method (hereinafter referred to as "movement information").

Figure 14:
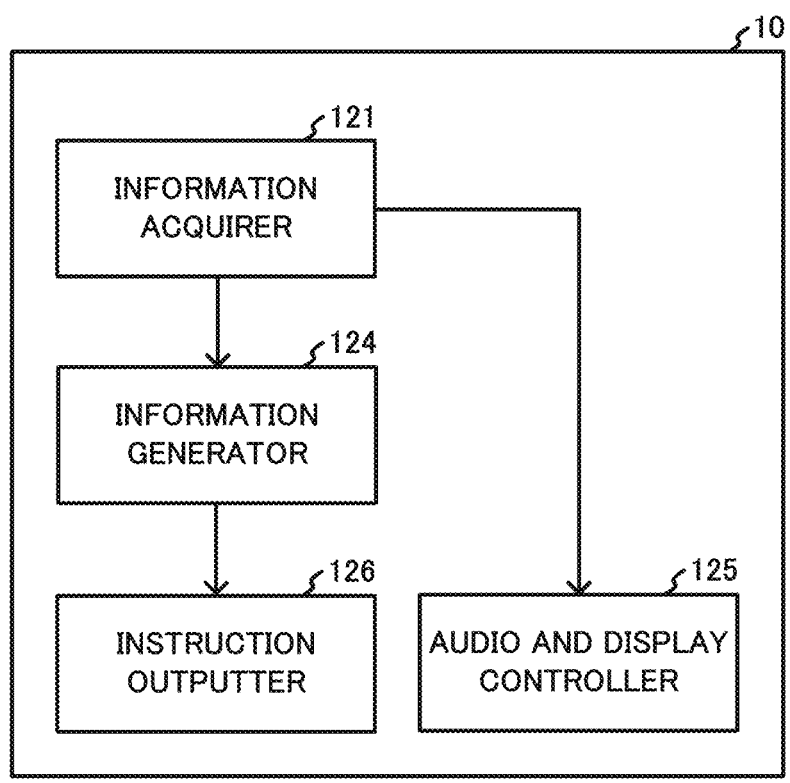
FIG. 14 is a functional block diagram illustrating an example of the functions of a mobile terminal according to Embodiment 1.

When the execution of the movement information acquisition processing starts, the audio and display controller 125 of the mobile terminal 10 illustrated in FIG. 14 causes the display device 105b illustrated in FIG. 2 to display an input screen such as illustrated in FIG. 16 used for inputting the movement information (step S11).

In the present embodiment, it is described that the movement information includes information expressing the geographical point (hereinafter referred to as "first geographical point") where the train station at which the user deboards the train or the arrival train station at which the train station that the user ultimately arrives by riding the train, is located, and information expressing an expected arrival time of the train at the first geographical point. In the following description, since the train station B is located at the geographical point where the user arrives by the train, information expressing the name of the train station B is used as the information expressing the first geographical point.

After step S11 is executed, the information acquirer 121 acquires, from the GPS circuit 106 illustrated in FIG. 2, a signal expressing the latitude and longitude (step S12). Next, the information acquirer 121 outputs, to the data communication circuit 104a with a non-illustrated search engine connected to the internet IN as the destination, a request that includes the information expressing the latitude and longitude and that requests a search for the train station that is closest to the geographical point expressed by the latitude and longitude.

The search engine includes a non-illustrated train station search table in which information expressing names of train stations and information expressing the latitude and longitude of the train stations is associated and stored in advance. As such, the search engine identifies, from the information expressing the latitude and longitude stored in the train station search table, the information that expresses the latitude and longitude of the geographical point with the shortest distance from the geographical point at the latitude and longitude expressed in the request. Next, the search engine searches the search table for the information expressing the name of the train station A that is associated with the information expressing the latitude and longitude identified in the train station search table.

When, after sending the request, the data communication circuit 104a receives, from the search engine, a response including the information expressing the name of the train station A that is found, the information acquirer 121 acquires the response from the data communication circuit 104a. Next, the information acquirer 121 sets the information expressing the name of the train station A included in the response as information expressing the name of the departure train station (step S13). Thereafter, the audio and display controller 125 controls the display device 105b so as to display the input screen of FIG. 16 with the name of the train station A that is found as the name of the departure train station.

Thereafter, when the user performs an operation of inputting, on the input device 105c, the name of the arrival train station, the information acquirer 121 acquires, on the basis of a signal output by the input device 105c in accordance with the operation, information expressing the name of the train station B that is the arrival train station (step S14).

Next, the information acquirer 121 generates a request that includes the information expressing the name of the departure train station and the information expressing the name of the arrival train station, and that requests searching for a combination of a movement route that is usable when moving by train from the departure train station to the arrival train station and the expected arrival time at the arrival train station. Thereafter, the information acquirer 121 outputs the generated request to the data communication circuit 104a with the search engine as the destination.

The search engine stores a non-illustrated route search table in which information expressing railway lines, information expressing the names of train stations on the railway lines, information expressing the expected arrival times of the train at the train stations, and information expressing expected departure times from the train stations are associated and stored in advance. The search engine searches for one or a plurality of combinations of movement routes and expected arrival times on the basis of the route search table, the information expressing the name of the departure train station and the information expressing the name of the arrival train station included in the request, and a current time managed by, for example, an operating system (OS).

When, after sending the request, the data communication circuit 104a receives the one or plurality of combinations that is found, the information acquirer 121 acquires the received one or plurality of combinations from the data communication circuit 104a (step S15). Next, the audio and display controller 125 controls the display device 105b so as to display the received one or plurality of combinations on the input screen of FIG. 16 (step S16).

Thereafter, the user that views the display device 105b performs, on the input device 105c, an operation for selecting, from the one or plurality of combinations displayed on the input screen, the combination of the movement route of the train to be boarded or the train that is already boarded and the expected arrival time. When the input device 105c outputs a signal in accordance with the operation, the information acquirer 121 identifies the selected combination on the basis of the signal (step S17).

Thereafter, the information acquirer 121 acquires, from information expressing the identified combination and as the movement information, information expressing the name of the train station B that is the final geographical point of the movement route (that is, information expressing the first geographical point), and information expressing the expected arrival time at the arrival train station B (that is, the first geographical point) included in the identified combination (step S18). Thereafter, the information acquirer 121 outputs the acquired movement information to the data communication circuit 104a with the delivery control server 310 as the destination (step S19), and after the data communication circuit 104a sends the movement information, ends the execution of the movement information acquisition processing.

The information storage unit 329 of the delivery control server 310 illustrated in FIG. 9 stores an installation location table such as illustrated in FIG. 17 in which information related to installation locations of the locker devices 228 and 229 is stored. A plurality of records is stored in the installation location table. Data in which the locker IDs of the locker devices 228 and 229, information expressing the name of the train station where the locker devices 228 and 229 are installed, information expressing the latitudes and longitudes of the installation locations of the locker devices 228 and 229, and information expressing an average movement time needed to move from the platform of the train station to the locker device 228 or 229 (hereinafter referred to as "movement time in train station") are associated is stored in each record of the installation location table.

Figure 18:
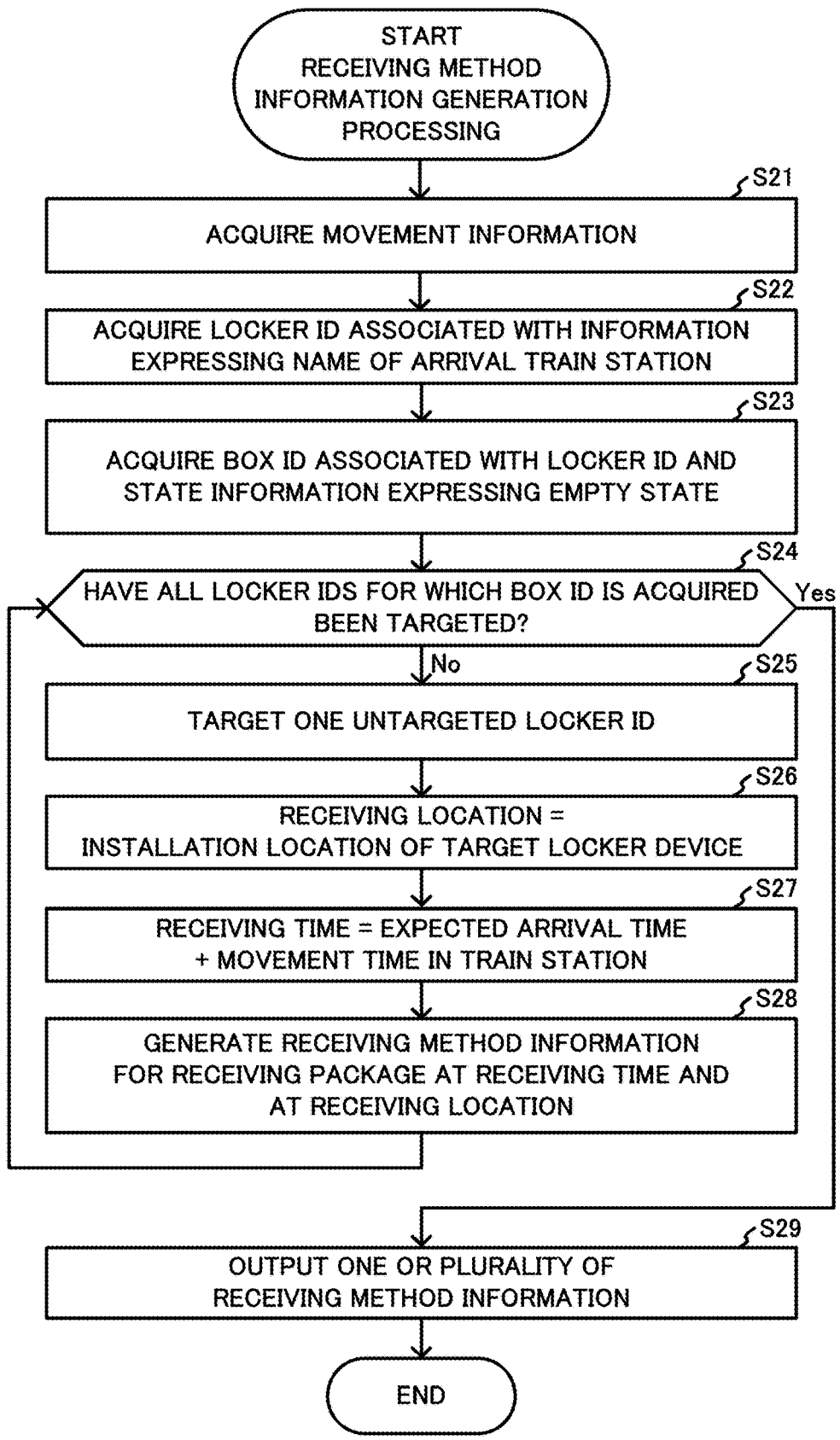
FIG. 18 is a flowchart illustrating receiving method information generation processing executed by the delivery control server according to Embodiment 1.

When the communication circuit 314 of the delivery control server 310 illustrated in FIG. 8 receives the movement information, the CPU 311 executes receiving method information generation processing such as illustrated in FIG. 18 for generating information expressing the receiving method of the package (hereinafter referred to as "receiving method information"). Thus, the CPU 311 further functions as an information generator 324 such as illustrated in FIG. 9 that generates the receiving method information.

When the execution of the receiving method information generation processing starts, the information acquirer 321 illustrated in FIG. 9 acquires the movement information from the communication circuit 314 (step S21), and acquires the information expressing the name of the arrival train station and the information expressing the expected arrival time at the arrival train station that are included in the movement information.

Next, the information acquirer 321 acquires, from the installation location table of FIG. 17, the locker ID associated with the information expressing the name of the train station B that is the acquired arrival train station (step S22). This is to identify the locker devices 228 and 229 that are installed at the train station B.

Thereafter, the information acquirer 321 acquires, from the use state table of FIG. 11, the box ID associated with the acquired locker ID and the state information expressing an empty state (step S23). Thereafter, the information acquirer 321 determines whether or not all of the locker IDs for which a box ID is acquired have been targeted (step S24). This is to determine whether or not there is a storage box 810 in an empty state.

At this time, when the information acquirer 321 determines that all of the locker IDs for which a box ID is acquired have not been targeted (step S24; No), the information generator 324 targets one locker ID that has not been targeted, and sets the locker device 228 or 229 identified by the targeted locker ID as the target locker device 228 or 229 (step S25).

Thereafter, the information acquirer 321 acquires, from the installation location table of FIG. 17, information expressing the latitude and longitude associated with the locker ID of the target locker device 228 or 229, and the information expressing the movement time in train station. Next, the information generator 324 acquires the to-be-delivered package information acquired in step S04 of FIG. 13 that is, for example, stored in shared memory. This is because the to-be-delivered package information acquired in step S04 is acquired by a different process than the receiving method information generation processing, which is the process that is being executed. Thereafter, the information generator 324 sets the installation location of the target locker device 228 or 229 located at the latitude and longitude expressed in the acquired information as the receiving location of the package related to the acquired to-be-delivered package information (step S26).

The information generator 324 sets, as a receiving time of the package, a time obtained by adding the movement time in train station expressed in the acquired information to the expected arrival time expressed in the information acquired in step S21 (step S27). The receiving location and the receiving time determined by the information generator 324 are provisional, and approval is carried out after adjusting, as needed, by a process described later.

Thereafter, the information generator 324 generates receiving method information that includes a combination of the information expressing the latitude and longitude of the determined receiving location and the information expressing the determined receiving time, and that expresses the receiving method for receiving the package at the receiving location and at the receiving time (step S28). Then, the information generator 324 repeats the steps described above from step S24.

In step S24, when the information acquirer 321 determines that all of the locker IDs for which a box ID is acquired have been targeted in step S23 (step S24; Yes), the information generator 324 outputs, to the communication circuit 314 illustrated in FIG. 8 with the mobile terminal 10 as the destination, the one or plurality of receiving method information generated in step S28 in the order generated (step S29). Thereafter, when the communication circuit 314 sends the one or plurality of receiving method information in the outputted order, the information generator 324 ends the execution of the receiving method information generation processing.

Figure 19:
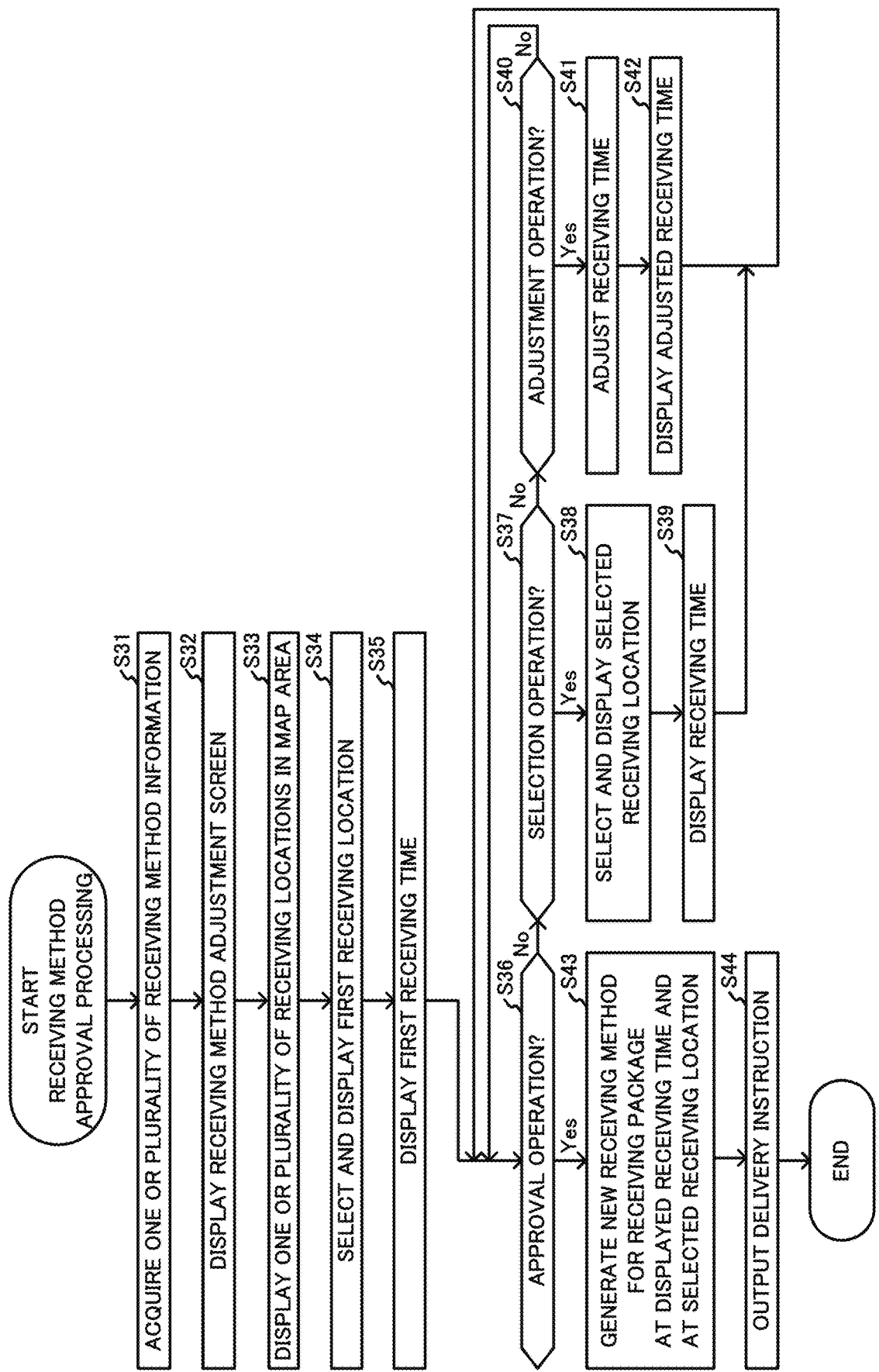
FIG. 19 is a flowchart illustrating receiving method approval processing executed by the mobile terminal.

When the data communication circuit 104a of the mobile terminal 10 illustrated in FIG. 2 receives the one or plurality of receiving method information, the CPU 101 of the mobile terminal 10 executes receiving method approval processing such as illustrated in FIG. 19 for selecting, adjusting as necessary, and approving one receiving method from the one or plurality of receiving methods expressed in each of the one or plurality of receiving method information. Thus, the CPU 101 further functions as an information generator 124 and an instruction outputter 126 such as illustrated in FIG. 14. In the present embodiment, for ease of description, an example is described of a case in which the mobile terminal 10 receives two pieces of the receiving method information.

Figure 20:
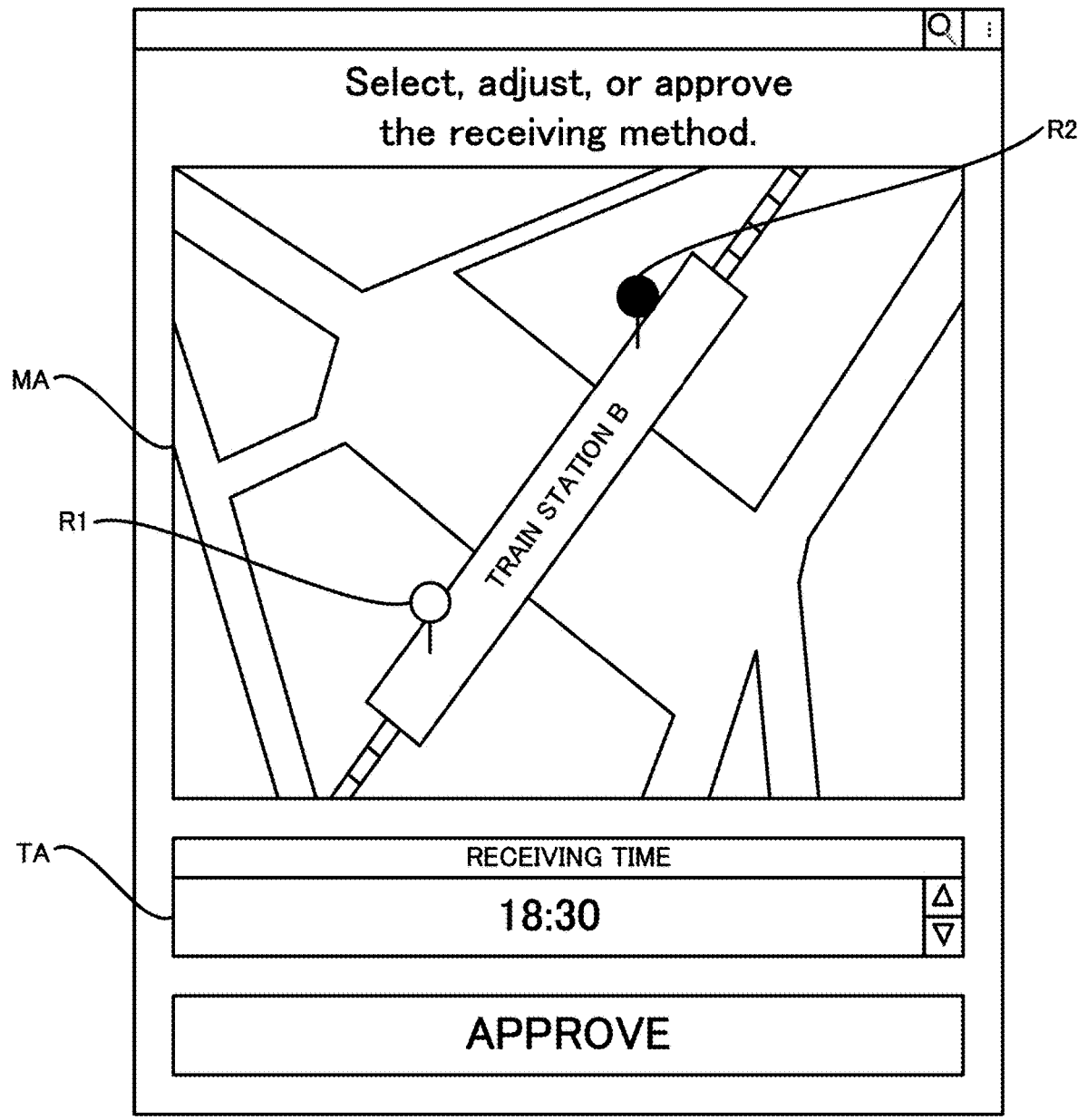
FIG. 20 is a drawing illustrating an example of a receiving method adjustment screen displayed by the mobile terminal.

When the execution of the receiving method approval processing starts, the information acquirer 121 acquires, from the data communication circuit 104a, two pieces of the receiving method information in the transmitted order (step S31). Next, the information acquirer 121 controls the display device 105b so as to display a receiving method adjustment screen such as illustrated in FIG. 20 (step S32). The receiving method adjustment screen is used to adjust the receiving method.

The information acquirer 121 acquires, from each of the two pieces of receiving method information, the information expressing the latitude and longitude of the receiving location, and generates a request that includes the acquired information expressing the latitude and longitude of the two receiving locations, and that is for requesting that information expressing a map that displays the two receiving locations by returned. Next, the information acquirer 121 outputs the generated request to the data communication circuit 104a of FIG. 2 with a non-illustrated search engine as the destination.

The search engine stores a non-illustrated map table in which the information expressing the map, and information expressing the minimum latitude and minimum longitude and information expressing the maximum latitude and maximum longitude of the geographical point included in the map are stored. The search engine acquires, from the map table, information expressing a map associated with information expressing the minimum latitude and the minimum longitude, which are respectively smaller than all of the two latitudes and longitudes expressed in the information included in the request, and information expressing the maximum latitude and the maximum longitude, which are respectively larger than all of the two latitudes and longitudes included in the request. Thereafter, the search engine returns a response that includes the acquired information expressing the map, and the information expressing the minimum latitude and minimum longitude and the information expressing the maximum latitude and maximum longitude that are associated with the information expressing the map.

When the response is received after the data communication circuit 104a sends the request, the information acquirer 121 acquires the response from the data communication circuit 104a. Thereafter, the information acquirer 121 identifies, on the basis of the information expressing the latitude and longitude of the two receiving locations, and the information expressing the minimum latitude and the minimum longitude and the information expressing the maximum latitude and the maximum longitude that are included in the response, drawing positions of the two receiving locations on the map expressed in the information included in the response. Thereafter, the information generator 124 synthesizes, at the identified drawing positions of the two receiving locations, two receiving location icons R1 and R2 expressing each of the two receiving locations, and controls the display device 105b so as to display the synthesized map in a map display area MA such as illustrated in FIG. 20 (step S33).

Display states of the receiving location icons R1 and R2 include a state expressing that the receiving locations respectively represented by the receiving location icons R1 and R2 are selected by the user (hereinafter referred to as "selected state"), and a state expressing that the receiving locations respectively expressed by the receiving location icons R1 and R2 are not selected by the user (hereinafter referred to as "unselected state"). The receiving location icons R1 and R2 in the selected state are, respectively, inverted displays of the receiving location icons R1 and R2 in the unselected state. The inverted display may be a color inverted display such as a monochrome inverted display or a color inverted display, or may be a darkened display or a brightened display. Note that the display state of the receiving location icon R1 illustrated in FIG. 20 is the selected state, and the display state of the receiving location icon R2 is the unselected state. Thus, the receiving location icon R1 illustrated in FIG. 20 is an inverted display of the receiving location icon R2.

After the execution of step S33, the information generator 124 regards the receiving location, expressed in the receiving method information received first, as having been selected by the user, and controls the display device 105b so as to switch the display state of the receiving location icon R1 to the selected state. Additionally, the information generator 124 regards the receiving location, expressed in the receiving method information received second, as having not been selected by the user, and controls the display device 105b so as to switch the display state of the receiving location icon R2 to the unselected state (step S34).

Thereafter, the information generator 124 controls the display device 105b so as to display the receiving time, expressed in the receiving method information received first, in a receiving time display area TA such as illustrated in FIG.

20 (step S35). Thus, the receiving method expressed in the receiving method information received first is presented to the user.

Thereafter, when the user that views the receiving method adjustment screen of FIG. 20 performs an operation on the input device 105c for selecting the receiving location icon R2 that is in the unselected state (hereinafter referred to as "selection operation"), the input device 105c outputs a signal corresponding to that operation. After the information generator 124 determines, on the basis of the signal output from the input device 105c, that the operation is not an operation for approving the receiving method (hereinafter referred to as "approval operation") (step S36; No), the information generator 124 determines that the operation is the selection operation (step S37; Yes).

Thereafter, the information generator 124 sets, on the basis of the signal output from the input device 105c, the receiving location represented by the receiving location icon R2 as the receiving location selected by the user. Next, the information generator 124 switches the display state of the receiving location icon R1 to the unselected state and, then, switches the display state of the receiving location icon R2 to the selected state (step S38). Thereafter, the information generator 124 controls the display device 105b so as to display, in the receiving time display area TA, the receiving time expressed in the information combined with the information expressing the latitude and longitude of the selected receiving location (step S39) and, then, returns to step S36 and repeats the steps described above.

Next, it is assumed that, due to user-specific circumstances such as, for example, deboarding the train prior to the destination train station in order to go shopping, the user performs an operation for adjusting the displayed receiving time (hereinafter referred to as "adjustment operation") on the input device 105c. In this case, the information generator 124 determines, on the basis of the signal output by the input device 105c in accordance with the operation, that the operation is not the approval operation or the selection operation (step S36; No, step S37; No), and determines that the operation is the adjustment operation (step S40; Yes).

Thereafter, the information generator 124 adjusts the displayed receiving time on the basis of the signal output by the input device 105c (step S41), controls the display device 105b so as to display the adjusted receiving time in the receiving time display area TA (step S42) and, then, returns to step S35 and repeats the steps described above.

Thereafter, when the user performs the approval operation on the input device 105c, the information generator 124 determines, on the basis of the signal output from the input device 105c, that the operation is the approval operation (step S36; Yes). Then, the information generator 124 determines that the receiving method for receiving the package at the displayed receiving time and at the selected receiving location is approved. Next, the information generator 124 newly generates receiving method information that includes a combination of the information expressing that receiving time and information expressing the latitude and longitude of that receiving location, and that expresses the approved receiving method (step S43).

Next, the instruction outputter 126 sets the newly generated receiving method information as a delivery instruction that specifies a delivery destination (that is, the receiving location) and a delivery time (that is, the receiving time) of the package. Thereafter, the instruction outputter 126 outputs the delivery instruction to the data communication circuit 104a of FIG. 2 with the delivery control server 310 as the destination (step S44), the data communication circuit 104a sends the delivery instruction and, then, the execution of the receiving method approval processing is ended.

Figure 21:
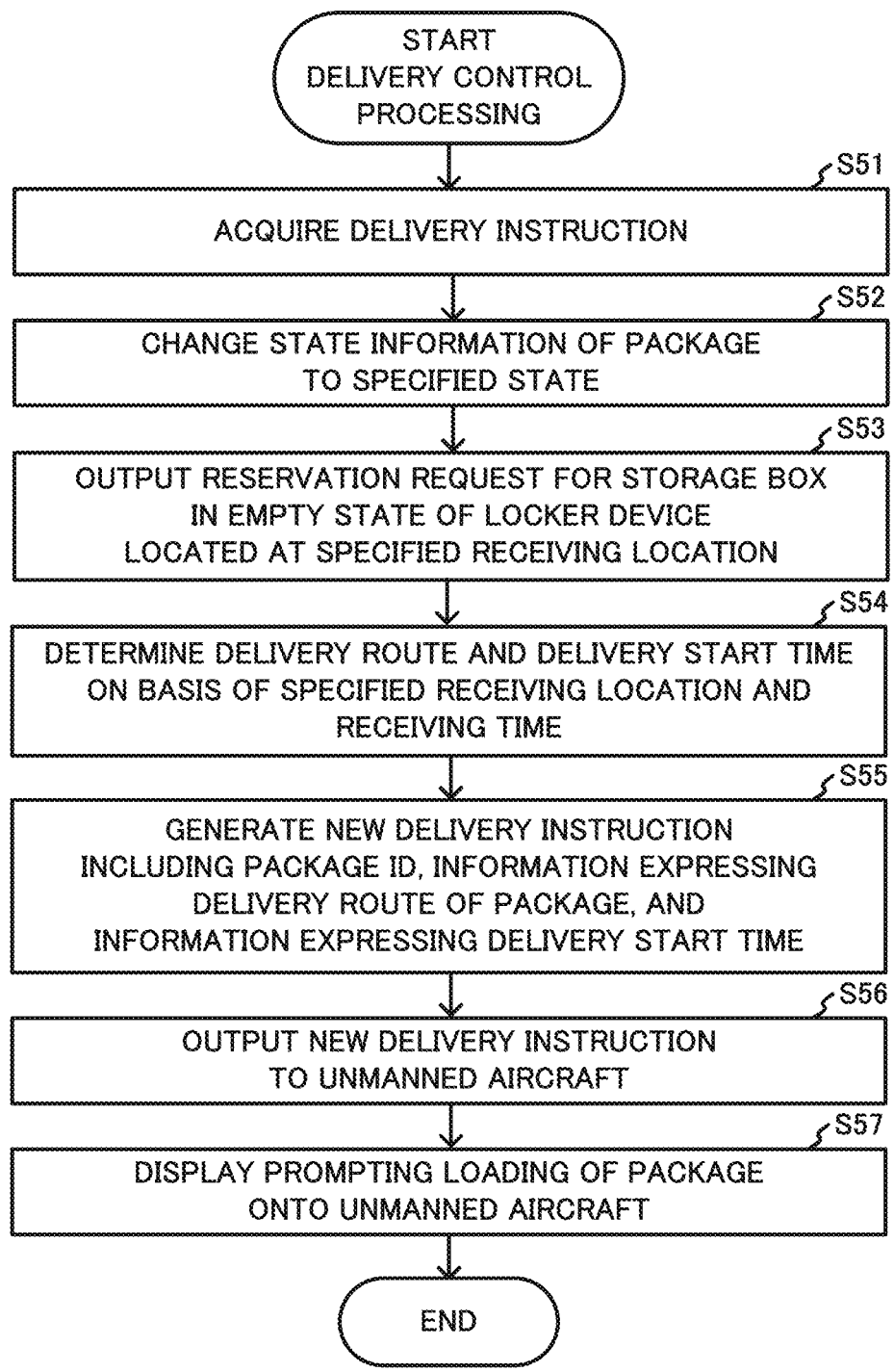
FIG. 21 is a flowchart illustrating delivery control processing executed by the delivery control server.

When the communication circuit 314 of the delivery control server 310 illustrated in FIG. 8 receives the delivery instruction, the CPU 311 of the delivery control server 310 executes, on the basis of the delivery instruction, delivery control processing such as illustrated in FIG. 21 for controlling the delivery of the package by the unmanned aircraft 390 illustrated in FIG. 1. Thus, the CPU 101 also functions as a reserver 325 such as illustrated in FIG. 9 that reserves the locker device 228 or 229 in which the package delivered by the unmanned aircraft 390 is to be stored, and as an instruction outputter 326 that outputs the delivery instruction of the package to the unmanned aircraft 390.

When the execution of the delivery control processing starts, the information acquirer 321 acquires, from the communication circuit 314, the delivery instruction sent by the mobile terminal 10 (step S51), and acquires the package ID included in the to-be-delivered package information acquired in step S04 of FIG. 13. Next, the information storer 322 updates the state information associated with the acquired package ID in the to-be-delivered package table of FIG. 12 to the state information expressing the specified state (step S52). This is because the delivery instruction acquired in step S51 specifies the receiving method of the package identified by the package ID.

Next, the reserver 325 of FIG. 9 acquires, from the installation location table of FIG. 17, the locker ID associated with the information expressing the latitude and longitude of the receiving location included in the delivery instruction, and acquires, from the use state table of FIG. 11, the box ID associated with the acquired locker ID and the state information of the empty state. This is to identify the locker device 228 installed at the approved receiving location and a storage box 810, which is in the empty state, of the locker device 228.

Thereafter the reserver 325 acquires, from the to-be-delivered package table of FIG. 12, the user ID associated with the package ID, and acquires, from the user table of FIG. 10, the card ID associated with the acquired user ID. This is to identify the IC card 11 that the user that is the addressee of the package uses to receive the package. Thereafter, the reserver 325 outputs, to the communication circuit 314 with the locker device 228 identified by the acquired locker ID as the destination, a reservation request that includes the acquired box ID, the package ID, and the card ID, and that requests a reservation of a storage box 810 (step S53).

When the data communication circuit 834a receives the reservation request, the CPU 831 of the locker device 228 illustrated in FIG. 6 outputs the box ID included in the reservation request and a close signal to the drive circuit 839 to close and lock the door 811 of the storage box 810 identified by the box ID. Next, the CPU 831 associates and stores, in the box management table of FIG. 7, the box ID of the closed storage box 810, state information expressing the reserved state, and the package ID and the card ID included in the reservation request. Thus, the reservation of the storage box 810 in which the package is to be stored is completed.

After the execution of step S53, the information acquirer 321 acquires, from the hard disk 313b illustrated in FIG. 8, information expressing the latitude and longitude of the office that is stored in advance. Thereafter, the information acquirer 321 generates a request that includes the information expressing the latitude and longitude of the office and the information expressing the latitude and longitude of the receiving location included in the delivery instruction, and that requests searching for a flight route that realizes the shortest flight distance from the office to the receiving location. Thereafter, the information acquirer 321 outputs the request to the communication circuit 314 illustrated in FIG. 8 with a non-illustrated search engine as the destination.

The search engine stores a route table. Information expressing an edge that corresponds to a partial route on which the unmanned aircraft 390 can fly, such as road and rivers in the vicinity of the train station B, nodes respectively expressing a start point and an end point of the partial route, and information expressing a distance of the partial route are stored in the route table. Using the route table, the search engine executes a route search algorithm such as Dijkstra's algorithm, for example, and searches for the shortest flight route that realizes the shortest flight distance from a plurality of flight routes obtained by combining partial routes from the office to the receiving location. Thereafter, the search engine returns a response that includes information expressing the latitude and longitude of the nodes of the shortest flight route (hereinafter referred to simply as "information expressing the shortest flight route), and information expressing the shortest flight distance.

When the response is received after the communication circuit 314 of the delivery control server 310 sends the request, the information acquirer 321 acquires the information expressing the shortest flight distance included in the received response, and acquires, from the hard disk 313b illustrated in FIG. 8, information expressing an average flying speed of the unmanned aircraft 390 that is stored in advance.

Next, the instruction outputter 326 determines a time needed for delivery by dividing the shortest flight distance expressed in the acquired information by the average flying speed of the unmanned aircraft 390, and determines a time that is the time needed for delivery prior to the receiving time as a delivery start time.

Additionally, the information acquirer 321 acquires the information expressing the shortest flight route included in the received response, and the instruction outputter 326 determines, as a delivery route, the shortest flight route expressed in the acquired information (step S54).

Thereafter, the instruction outputter 326 generates a new delivery instruction that includes the acquired package ID, the information expressing the delivery route of the package identified by the package ID, and the information expressing the delivery start time, and that instructs so as to deliver the package to the receiving location by the receiving time by departing from the office at the delivery start time and flying on the delivery route (step S55). Next, the instruction outputter 326 sets the generated delivery instruction as a control instruction of the unmanned aircraft 390, and outputs the control instruction to the communication circuit 314 with the unmanned aircraft 390 as the destination.

Thereafter, the instruction outputter 326 controls the display device 315b illustrated in FIG. 8 so as to display a message that includes the package ID and the notes information included in the to-be-delivered package information acquired in step S04 of FIG. 13, and that prompts to load the package identified by the package ID onto the unmanned aircraft 390 (step S57). Then, the instruction outputter 326 ends the execution of the delivery control processing.

Figure 22:
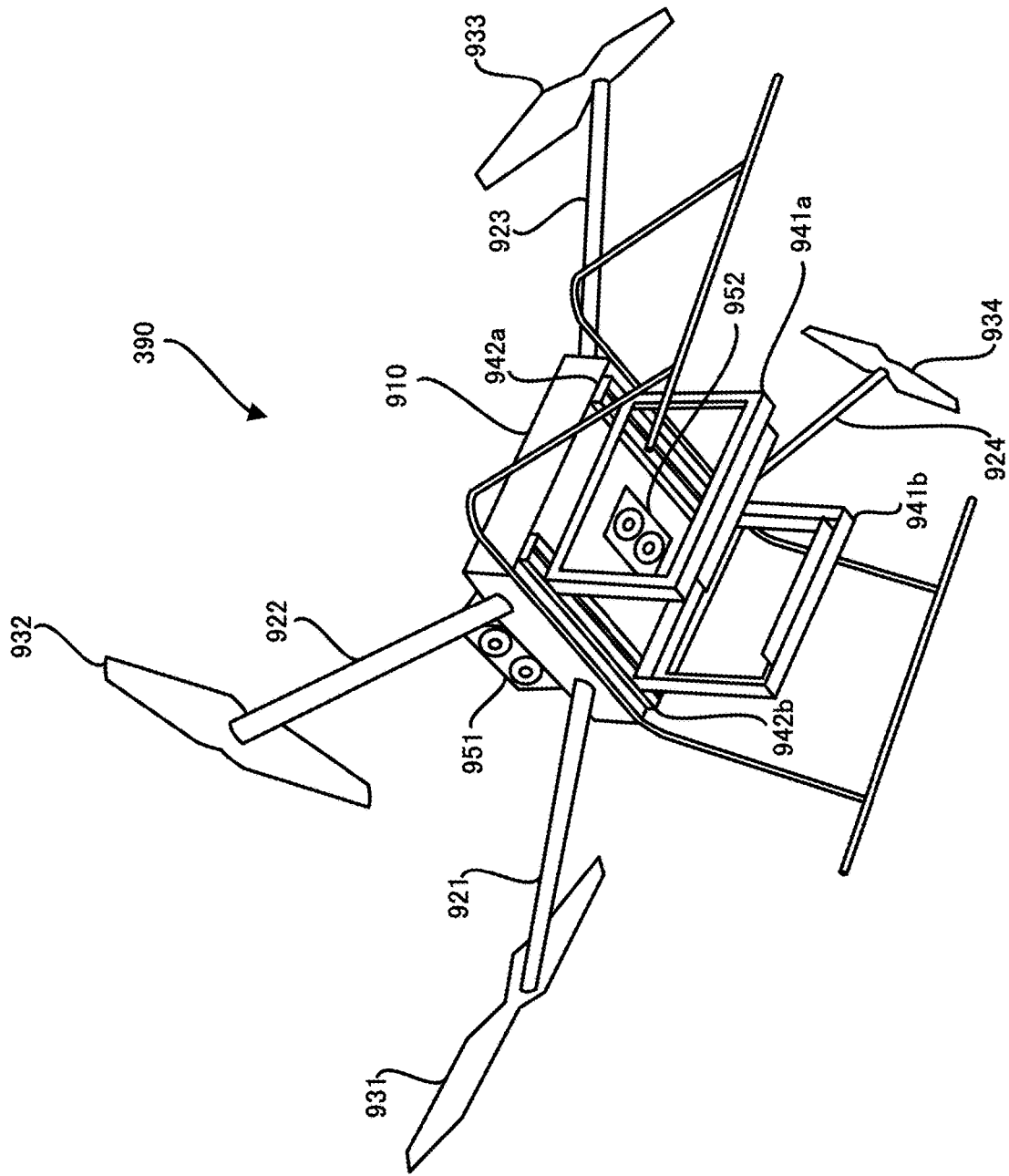
FIG. 22 is an appearance configuration drawing illustrating the appearance of an unmanned aircraft according to Embodiment 1.

The unmanned aircraft 390 includes a control device 910 such as illustrated in FIG. 22 that controls the attitude and flight of the unmanned aircraft 390, propeller arms 921 to 924 that respectively protrude forward to the left and forward to the right, and backward to the left and backward to the right from the control device 910, propellers 931 to 934 that are respectively installed on tips of the propeller arms 921 to 924, and non-illustrated motors that rotate the propellers 931 to 934 in accordance with the control of the control device 910.

Additionally, the unmanned aircraft 390 includes, beneath the control device 910, a first holding frame 941a that surrounds and holds four sides of one side face (hereinafter referred to as "first surrounded face") of the four side faces of the parallelepiped shaped package, and a second holding frame 941b that surrounds and holds four sides of a side face (hereinafter referred to as "second surrounded face") opposite the first surrounded face. Furthermore, the unmanned aircraft 390 includes, on a bottom surface of the control device 910, guide rails 942a and 942b that extend in a normal direction of the first surrounded face and the second surrounded face of the package, suspend the first holding frame 941a and the second holding frame 941b, and have the movement direction of the first holding frame 941 and the second holding frame 941b as the extending direction. Furthermore, the unmanned aircraft 390 includes a non-illustrated motor which, in accordance with the control of the control device 910, causes the first holding frame 941a and the second holding frame 941b to surround and hold the package by moving the first holding frame 941a and the second holding frame 941b in directions so as to approach each other, and causes the first holding frame 941a and the second holding frame 941b to release the surrounded and held package by moving the first holding frame 941a and the second holding frame 941b in directions so as to separate from each other.

Furthermore, the unmanned aircraft 390 includes an imaging device 951 that is provided on the top surface of the control device 910 and that has an optical axis that is directed in front of the unmanned aircraft 390. Additionally, the unmanned aircraft 390 includes an imaging device 952 that is provided on the bottom surface of the control device 910 and that has an optical axis that is directed downward from the unmanned aircraft 390. The imaging device 952 has an angle of view that includes, in the imaging range, when the package is placed below the unmanned aircraft 390, the package, the first holding frame 941a, and the second holding frame 941b. The configurations and functions of the imaging devices 951 and 952 are the same as the configuration and functions of the imaging device 824 of the locker device 228 illustrated in FIG. 5.

Figure 23:
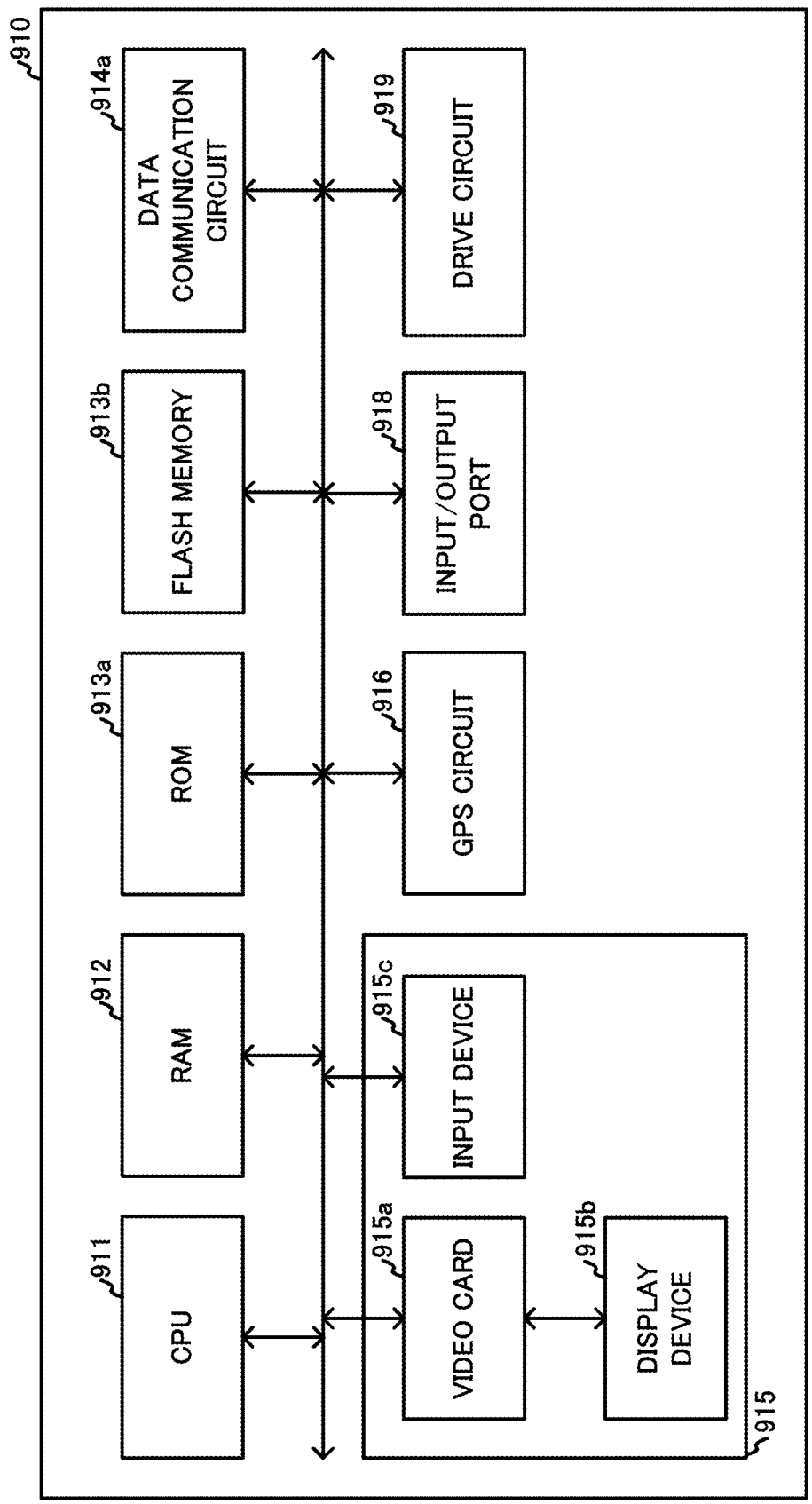
FIG. 23 is a hardware configuration diagram illustrating a configuration example of a control device of the unmanned aircraft.

As illustrated in FIG. 23, the control device 910 includes a CPU 911, a RAM 912, a ROM 913a, a flash memory 913b, a data communication circuit 914a, a touch panel 915, a GPS circuit 916, an input/output port 918, and a drive circuit 919. The configurations and functions of the CPU 911, the RAM 912, the ROM 913a, the flash memory 913b, the data communication circuit 914a, the touch panel 915, and the GPS circuit 916 of the control device 910 are the same as the configurations and functions of the CPU 101, the RAM 102, the ROM 103a, the flash memory 103b, the data communication circuit 104a, the touch panel 105, and the GPS circuit 106 of the mobile terminal 10 illustrated in FIG. 2.

The input/output port 918 is connected to non-illustrated cables that are respectively connected to the imaging devices 951 and 952, outputs signals output by the CPU 911 to the imaging devices 951 and 952, and inputs signals output by the imaging devices 951 and 952 into the CPU 911.

The drive circuit 919 is connected to non-illustrated four cables that are connected to each of the non-illustrated motors that rotate the propellers 931 to 934 illustrated in FIG. 22, and a cable that is connected to the non-illustrated motor that moves the first holding frame 941a and the second holding frame 941b. The drive circuit 919 drives, in accordance with the signals output by the CPU 911, the non-illustrated motors that rotate the propellers 931 to 934 or the non-illustrated motor that moves the first holding frame 941a and the second holding frame 941b.

When a worker working at the office views the message displayed on the display device 315b of the delivery control server 310, the worker searches for the package identified by the package ID in accordance with the message. Next, the worker places the found package on a non-illustrated work stand that is installed near the unmanned aircraft 390, and performs an operation on the touch panel 915 of the unmanned aircraft 390 for starting the delivery of the package.

Figure 24:
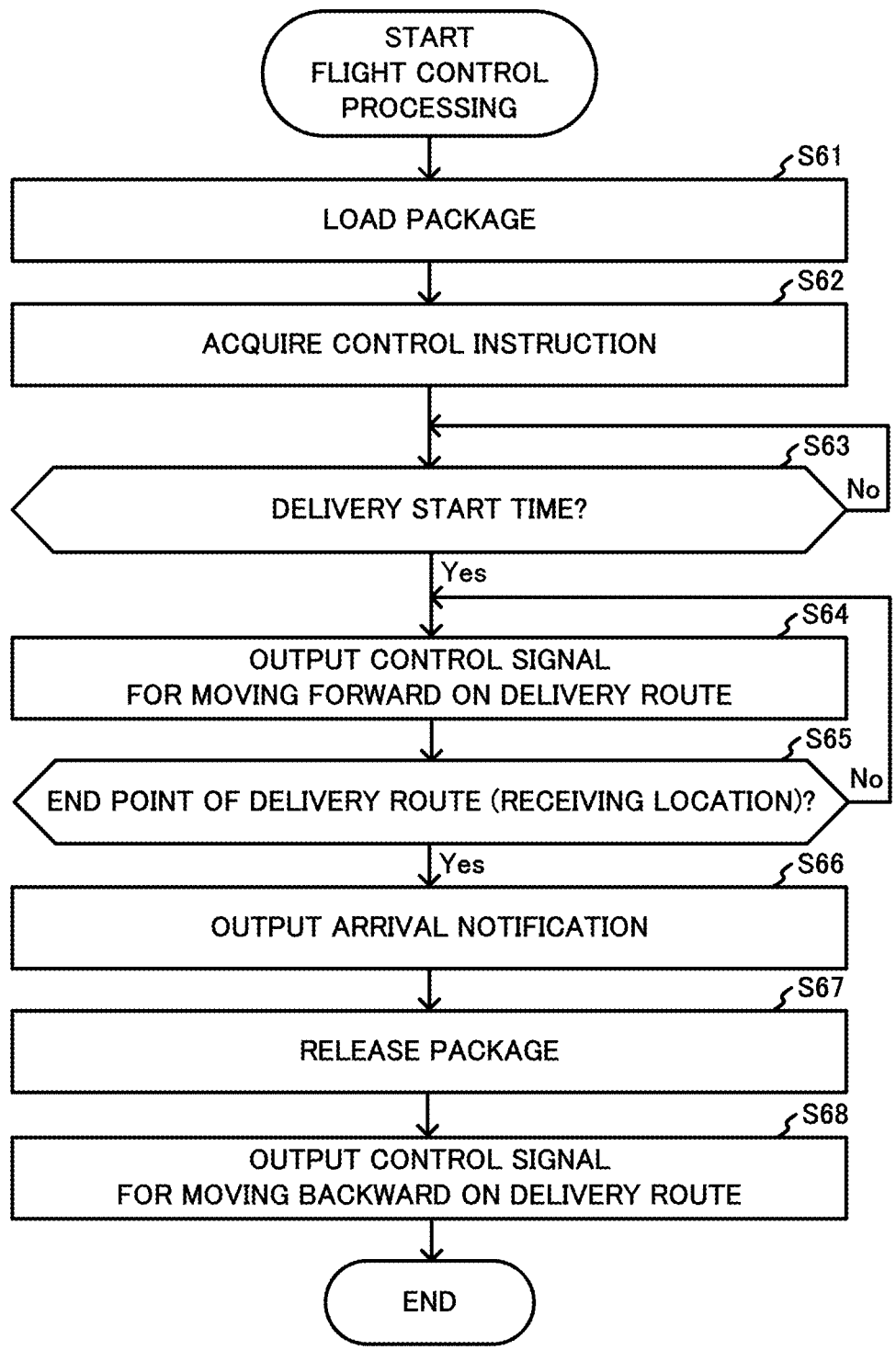
FIG. 24 is a flowchart illustrating flight control processing executed by the unmanned aircraft.

When the touch panel outputs a signal in response to the operation, the CPU 911 of the control device 910 of the unmanned aircraft 390 executes flight control processing such as illustrated in FIG. 24 for controlling the flight of the unmanned aircraft 390.

When the CPU 911 starts the execution of the flight control processing, the CPU 911 outputs a control signal to the drive circuit 919 that causes the unmanned aircraft 390 to ascend to a predetermined altitude, and the drive circuit 919 drives the non-illustrated motors to rotate the propellers 931 to 934 illustrated in FIG. 22 in accordance with the control signal.

Next, the CPU 911 outputs a signal commanding imaging to be performed to the imaging device 952 provided below the unmanned aircraft 390. The signal is output via the input/output port 918. Thereafter, when a signal expressing a captured image is input from the imaging device 952 via the input/output port 918, the CPU 911 analyzes the captured image to detect, from the captured image, a package area in which the package is drawn when viewed from above. Next, the CPU 911 outputs, to the drive circuit 919, a control signal that causes the unmanned aircraft 390 to move, on the basis of the detected package area, to a position directly above the package.

Thereafter, the CPU 911 outputs, to the drive circuit 919, a control signal for sufficiently separating the first holding frame 941a and the second holding frame 941b illustrated in FIG. 22, and the drive circuit 919 drives, in accordance with the control signal, the non-illustrated motor that moves the first holding frame 941a and the second holding frame 941b.

Next, the CPU 911 again outputs, to the imaging device 952, a signal that commands imaging to be performed, and analyzes the captured image again to detect the package area, and a first frame area and a second frame area where the first holding frame 941a and the second holding frame 941b are respectively drawn. Thereafter, the CPU 911 outputs, to the drive circuit 919, a control signal that causes, on the basis of the package area, the first frame area, and the second frame area, the unmanned aircraft 390 to land or sufficiently descend while straddling the package between the first holding frame 941a and the second holding frame 941b.

Thereafter, the CPU 911 outputs, to the drive circuit 919, a control signal that causes the first holding frame 941a and the second holding frame 941b to sufficiently move toward each other. As a result, the unmanned aircraft 390 surrounds and holds the package by the first holding frame 941a and the second holding frame 941b. Thus, the loading of the package by the unmanned aircraft 390 is completed (step S61).

Next, the CPU 911 acquires the control instruction that the data communication circuit 914a receives from the delivery control server 310 (step S62), and acquires the information expressing the delivery start time and the information expressing the delivery route that are included in the control instruction.

Next, the CPU 911 acquires the system time managed by the OS, for example, and determines whether or not the delivery start time has arrived on the basis of whether or not the acquired system time is a time that is later than the delivery start time (step S63). Here, when the system time is a time that is earlier than the delivery start time and, as such, the CPU 911 determines that the delivery start time has not arrived (step S63; No), the CPU 911 sleeps for a predetermined amount of time and, then, repeats the processing of step S63.

In contrast, when the CPU 911 determines that the delivery start time has arrived since the system time is the same as the delivery start time or is later than the delivery start time (step S63; Yes), the CPU 911 outputs, to the drive circuit 919 illustrated in FIG. 23, a control signal that controls the propellers 931 to 934 illustrated in FIG. 22 so as to move forward on the delivery route (step S64).

In step S64, the CPU 911 acquires a signal from the GPS circuit 916 and acquires, from the information expressing the delivery route, the information expressing the latitude and longitude of the plurality of nodes included in the delivery route. Thereafter, the CPU 911 generates and outputs a control signal that causes the unmanned aircraft 390 to fly so as to reduce the difference between the latitude and longitude of the unmanned aircraft 390 expressed in the acquired signal and the latitude and longitude of the closest node of the plurality of un-passed nodes expressed in the acquired information. In step S64, the CPU 911 outputs, via the input/output port 918 and to the imaging device 951 that has an optical axis that is directed in front of the unmanned aircraft 390, a signal commanding imaging to be performed. Thereafter, the CPU 911 generates and outputs a control signal that causes the unmanned aircraft 390 to fly while avoiding obstacles, on the basis of the information expressing a captured image input from the imaging device 951 via the input/output port 918.

Thereafter, the CPU 911 calculates, on the basis of the signal output from the GPS circuit 916 and the information expressing the latitude and longitude of the nodes included in the delivery route, the difference between the latitude and longitude of the node expressing the end point of the delivery route (that is, the receiving location) and the latitude and longitude of the unmanned aircraft 390. Next, the CPU 911 determines, on the basis of whether or not the difference between the latitude and longitude of the node expressing the receiving location and the latitude and longitude of the unmanned aircraft 390 is less than or equal to a predetermined value, whether or not the unmanned aircraft 390 has arrived at the receiving location (step S65).

The phrase "the unmanned aircraft 390 arrives at the receiving location" does not necessarily mean that the unmanned aircraft 390 has landed at the receiving location or in the vicinity within a predetermined distance from the receiving location. The phrase "the unmanned aircraft 390 arrives at the receiving location" includes the meanings that, for example, the unmanned aircraft 390 is hovering in the air at the receiving location or near the receiving location without landing, the unmanned aircraft 390 lands, takes off, and is hovering, and the unmanned aircraft 390 is circling or moving back and forth above or in the vicinity of the receiving location.

In step S65, in cases in which the difference is greater than the predetermined value and, accordingly, it is determined that the unmanned aircraft 390 has not arrived at the receiving location (step S65; No), the CPU 911 repeats the steps described above from step S64.

In contrast, in cases in which the difference is less than or equal to the predetermined value and, accordingly, it is determined that the unmanned aircraft 390 has arrived at the receiving location (step S65; Yes), the CPU 911 outputs, to the data communication circuit 914a with the delivery control server 310 as the destination, an arrival notification that includes the package ID included in the control instruction and that notifies that the package identified by the package ID has arrived at the receiving location (step S66). Thereafter, the data communication circuit 914a wirelessly sends the arrival notification to a non-illustrated base station that is connected to the internet IN.

Next, the unmanned aircraft 390 moves to directly above the package stand 821 or 822 of the locker device 228 illustrated in FIG. 5 and, then, lands on the package stand 821 or 822 or sufficiently descends. Thereafter, the unmanned aircraft 390 releases the package from the first holding frame 941a and the second holding frame 941b, thereby placing the package on the package stand 821 or 822 (step S67).

Thereafter, the CPU 911 of the unmanned aircraft 390 outputs, to the drive circuit 919, a control signal that controls the propellers 931 to 934 so as to fly on the delivery route back to the office (step S68) and, then, ends the execution of the flight control processing.

When the communication circuit 314 of the delivery control server 310 illustrated in FIG. 8 receives the arrival notification, the CPU 311 acquires, from the use state table illustrated in FIG. 11, the locker ID associated with the state information expressing the reserved state and the package ID included in the arrival notification. Next, the CPU 311 of the delivery control server 310 outputs the arrival notification to the communication circuit 314 with the locker device 228 identified by the acquired locker ID as the destination, thereby forwarding the arrival notification.

When the data communication circuit 834a of the locker device 228 illustrated in FIG. 6 receives the arrival notification from the delivery control server 310, the CPU 831 of the locker device 228 acquires the box ID associated with the state information expressing the reserved state and the package ID included in the arrival notification and outputs the acquired box ID and an open signal to the drive circuit 839. As a result, the door 811 of the reserved storage box 810 is unlocked and opened.

Next, as in the case of storing the package of the shopper, the package placed on the package stand 821 or 822 is gripped by the robot arm 823 and stored in the empty storage box 810 and, then, the locker device 228 closes and locks the door 811 of the storage box 810.

Thereafter, in the box management table of FIG. 7, the CPU 831 of the locker device 228 illustrated in FIG. 6 updates the state information, associated with the box ID of the storage box 810 in which the package is stored and the package ID included in the arrival notification, to state information expressing the in-use state.

Thereafter, the CPU 831 of the locker device 228 outputs, to the data communication circuit 834a with the delivery control server 310 as the destination, a storage completion notification that includes the package ID and that notifies that the storing is complete.

When communication circuit 314 receives the storage completion notification from the locker device 228, the CPU 311 of the delivery control server 310 updates, in the to-be-delivered package table of FIG. 12, the state information associated with the package ID included in the storage completion notification to state information expressing the delivered state.

When the user arrives at the receiving location after the package is stored in the locker device 228 at the receiving location, as with the case of the shopper, the user holds up the IC card 11 to the IC card RW 837 of the locker device 228 illustrated in FIG. 5.

When the card ID of the IC card 11 is input from the IC card RW 837 of the locker device 228, the CPU 831 of the locker device 228 illustrated in FIG. 6 acquires, from the box management table of FIG. 7, the package ID and the box ID associated with the inputted card ID. Thereafter, the CPU 831 outputs, to the drive circuit 839, the acquired box ID and an open signal commanding the unlocking and opening of the door 811.

Additionally, the CPU 831 of the locker device 228 updates the card ID and the package ID associated with the acquired box ID to "NULL", and updates the state information associated with the box ID to state information expressing the empty state. Thereafter, the user removes the package from the storage box 810, thus completing the receiving of the package.

Thereafter, the CPU 831 of the locker device 228 outputs, to the data communication circuit 834a with the delivery control server 310 as the destination, a received notification including the package ID and indicating that the package has been received. When communication circuit 314 receives the received notification from the locker device 228, the delivery control server 310 updates, in the to-be-delivered package table of FIG. 12, the state information associated with the package ID included in the received notification to state information expressing the received state.

According to these configurations, the mobile terminal 10 and the delivery control server 310 generate, on the basis of movement information related to the movement of the user, the receiving method information expressing the receiving method whereby the user receives the package. As such, it is possible to deliver the package by a delivery method that is more convenient to the user than when delivering the package to, for example, the home or the like of the user irrespective of the movement of the user.

According to these configurations, the mobile terminal 10 and the delivery control server 310 generate the receiving method information on the basis of the movement information, in the period from when the movement information is acquired to when the user arrives at the first geographical point. As such, receiving method information that is more related to the movement of the user can be generated than when the receiving method information is generated before the movement information is acquired. Therefore, it is possible to generate receiving method information expressing a receiving method that is more convenient to the user.

According to these configurations, the receiving method information includes the information expressing the receiving location of the package. As such, compared to cases in which the package is delivered to a fixed location unrelated to the movement of the user, such as, for example, the home of the user, it is possible to shorten the distance from the location of the user at the delivery time of the package to the receiving location where the package is delivered.

According to these configurations, the receiving method information includes the information expressing the receiving time of the package and, as such, compared to cases in which the package is delivered at a time unrelated to the movement of the user, it is possible to shorten the amount of time from the delivery time of the package to the time when the user actually receives the package.

According to these configurations, after the movement of the user is detected, the mobile terminal 10 and the delivery control server 310 determine the receiving method in which the user receives the package at the receiving location determined on the basis of the first geographical point and at the receiving time determined on the basis of the expected arrival time at the first geographical point. As such, it is possible to determine the receiving time on the basis of an expected arrival time that is more accurate than in cases in which the receiving time is determined on the basis of the expected arrival time at the first geographical point before the user starts moving to the first geographical point.

According to these configurations, after the movement of the user is detected, the mobile terminal 10 and the delivery control server 310 determine the receiving time on the basis of the expected arrival time at the first geographical point of the train that the user will ride or is riding. Typically, an expected arrival time is determined for each train station at which the train stops and the train travels on a train-dedicated track. As such, there is a higher possibility of the user arriving at the expected arrival time in cases in which the user arrives at the first geographical point by train than when the user arrives by private vehicle or by walking unfamiliar roads. Therefore, there is a high possibility that the amount of time from when the package is delivered to the receiving location to when the package is received by the user can be shortened even more. Additionally, when, for example, the package is an article of which the quality is prone to deteriorate such as an article that requires refrigeration or an article that requires freezing, there is a high possibility that quality deterioration of the package can be prevented.

According to these configurations, the mobile terminal 10 presents the receiving method to the user and the receiving method is selected, adjusted, or approved in accordance with operations by the user. As such, a receiving method better suited to the individual circumstances of the user can be specified. Examples of such individual circumstances include, the user deboarding the train before arriving at the first location, the user going shopping or to eat/drink after arriving at the first location, or the walking speed of the user being slower than that of a typical user for health reasons.

According to these configurations, the delivery control server 310 sends, to the unmanned aircraft 390, an instruction that includes the information expressing the delivery start time, and that is related to control that causes the unmanned aircraft 390 to depart from the office at the delivery start time and deliver the package. When the delivery start time arrives, the unmanned aircraft 390 autonomously departs from the office and starts the delivery of the package. As such, tasks of a worker such as confirming the arrival of the delivery start time, performing an operation on the unmanned aircraft 390 to start the delivery of the package, and the like can be reduced.

According to these configurations, the delivery control server 310 detects the movement of the user on the basis of the admission notification that notifies that the user has passed through the automatic ticket gate 211 and entered the platform. As such, it is possible to detect the movement of the user by train with greater accuracy.

Modified Example 1 of Embodiment 1

In Embodiment 1, it is described that the delivery system 30 illustrated in FIG. 1 is installed in an office that delivers packages, and, in step S57 of FIG. 21, the delivery control server 310 of the delivery system 30 displays a message prompting that the package be loaded onto the unmanned aircraft 390. Additionally, it is described that a worker working at the office searches for the package in accordance with the message, and places the package on a non-illustrated work stand installed near the unmanned aircraft 390. Furthermore, it is described that the unmanned aircraft 390 loads the package in accordance with operations of the worker.

However, Embodiment 1 is not limited thereto, and with the delivery system 30 according to the present modified example, the searching for the package, the placing of the package on the package stand, and the loading of the package on the unmanned aircraft 390 are carried out unattended or mostly unattended. In order to realize this, the delivery system 30 according to the present modified example is installed in a warehouse that stores packages instead of in an office, and the delivery system 30 includes a non-illustrated package storage system in addition to the delivery control server 310 and the unmanned aircraft 390.

The package storage system includes a plurality of non-illustrated shelves on which a plurality of packages are stored, and a non-illustrated self-propelled robot that moves a shelf, of the plurality of shelves, specified by the delivery control server 310 to the vicinity of the unmanned aircraft 390. Additionally, the package storage system includes a non-illustrated robot arm that removes a package specified by the delivery control server 310 from the shelf that is moved to the vicinity of the unmanned aircraft 390, and places the removed package on a non-illustrated package stand installed in the vicinity of the unmanned aircraft 390; and a non-illustrated control device that controls the operations of the robot arm.

The self-propelled robot includes a body that includes a plurality of non-illustrated wheels and a plurality of non-illustrated motors that respectively rotate the plurality of wheels; a non-illustrated data communication circuit installed in the body; a non-illustrated imaging device that has an optical axis that is directed in front of the body; and a non-illustrated microcomputer that controls the operations of the motors, the data communication circuit, and the imaging device (hereinafter referred to as "microcomputer").

The configurations and functions of the data communication circuit and the imaging device of the self-propelled robot are the same as the configurations and functions of the data communication circuit 104a illustrated in FIG. 2 and the imaging device 951 illustrated in FIG. 22, respectively. The microcomputer of the self-propelled robot includes a CPU, a RAM, and a ROM (not illustrated in the drawings) that respectively have the same configurations and functions as the CPU 101, the RAM 102, and the ROM 103a illustrated in FIG. 2.

When the data communication circuit receives, from the delivery control server 310, identification information identifying a shelf (hereinafter referred to as "shelf ID"), the microcomputer of the self-propelled robot controls the plurality of motors in accordance with a predetermined algorithm so as to cause the self-propelled robot to travel in the warehouse. Additionally, the microcomputer detects, from a captured image expressed by a signal output by the imaging device, a shelf area in which the shelf is drawn, and the shelf ID printed on that shelf. When a shelf ID that is the same as the received shelf ID is detected, the microcomputer generates, on the basis of a drawing position of the shelf area in the captured image and a predetermined route search algorithm, a control signal that causes the self-propelled robot to push the shelf on which the shelf ID is printed to the vicinity of the unmanned aircraft 390. Thereafter, the microcomputer outputs the generated control signal to the plurality of motors that respectively rotate the plurality of wheels.

The robot arm installed in the vicinity of the unmanned aircraft 390 includes a non-illustrated imaging device that images the object to be gripped. The configurations and functions of the robot arm and the imaging device are respectively the same as the configurations and functions of the imaging device 824 and the robot arm 823 illustrated in FIG. 5. Additionally, the configurations and functions of the package stand installed in the vicinity of the unmanned aircraft 390 and the control device of the robot arm are respectively the same as the configurations and functions of the package stands 821 and 822 illustrated in FIG. 5 and the control device 830 illustrated in FIG. 6.

When the package ID is received from the delivery control server 310, the control device of the robot arm detects, from a captured image expressed by a signal output from the imaging device of the robot arm, the shelf area in which the shelf is drawn, the package area in which the package is drawn, a package stand area in which the package stand is drawn, and the package ID printed on the package. When a package ID is detected that is the same as the received package ID, the control device generates, on the basis of the drawing positions of the shelf area, the package area, and the package stand area in the captured image, a control signal for removing the package on which the package ID is printed from the shelf, and placing the removed package on the package stand. Then, the control device outputs the generated control signal to the robot arm.

The information storage unit 329 of the delivery control server 310 illustrated in FIG. 9 stores a non-illustrated shelf table in which the package ID and the shelf ID of the shelf on which the package identified by the package ID is stored are associated and stored in advance. The instruction outputter 326 of the delivery control server 310 executes non-illustrated automatic package loading processing instead of step S57 of FIG. 21.

When the execution of the automatic package loading processing starts, the instruction outputter 326 acquires, from the shelf table, the shelf ID associated with the package ID of the package that the unmanned aircraft 390 is to be caused to deliver. Next, the instruction outputter 326 outputs, to the communication circuit 284 illustrated in FIG. 4 with the self-propelled robot as the destination, an instruction that includes the shelf ID and that causes the self-propelled robot to move the shelf identified by the shelf ID to within the movable range of the robot arm. Thereafter, the self-propelled robot receives the instruction, moves the shelf to the vicinity of the unmanned aircraft 390 in accordance with the instruction, and sends a completion notification.

When the communication circuit 284 of the delivery control server 310 receives the completion notification, the instruction outputter 326 outputs, to the communication circuit 284 with the control device of the robot arm as the destination, an instruction that includes the package ID and that causes the robot arm to search the shelf for the package identified by the package ID and move the found package from the shelf to the package stand. Thereafter, the robot arm receives the instruction, moves the package from the shelf to the package stand in accordance with the instruction and, then, sends a completion notification.

When the completion notification is received, the instruction outputter 326 of the delivery control server 310 outputs, to the communication circuit 284 with the unmanned aircraft 390 as the destination, an instruction that causes the package to be loaded and, then, ends the execution of the automatic package loading processing. Thereafter, the unmanned aircraft 390 receives the instruction and loads the package placed on the package stand in accordance with the instruction.

According to these configurations, the delivery control server 310 outputs, to the self-propelled robot, an instruction that causes the self-propelled robot to move the shelf on which the package to be loaded on the unmanned aircraft 390 is stored; outputs, to the control device of the robot arm, an instruction that causes the robot arm to search the shelf moved by the self-propelled robot for the package, and remove the found package; and outputs, to the unmanned aircraft 390, an instruction that causes the unmanned aircraft 390 to load the removed package. As such, tasks of a worker such as moving the shelf on which the package is stored, searching the shelf for the package, removing the found package, and loading the package on the unmanned aircraft 390 can be eliminated or reduced.

It is described that the delivery system 30 according to the present modified example includes a non-illustrated package storage system, and that the package storage system searches for the package, places the package on the package stand, and loads the package on the unmanned aircraft 390 in an unattended or mostly unattended manner. However, the present modified example is not limited thereto, and a configuration is possible in which the delivery system 30 uses known automated warehouse technology different than the package storage system to search for the package, place the package on the package stand, and load the package on the unmanned aircraft 390 in an unattended or mostly unattended manner.

Modified Example 2 of Embodiment 1

In Embodiment 1, it is described that the unmanned aircraft 390 includes the first holding frame 941*a* and the second holding frame 941*b* such as illustrated in FIG. 22 that surround and hold the package. Additionally, in Embodiment 1, it is described that the locker device 228 includes the package stands 821 or 822 such as illustrated in FIG. 5, and the robot arm 823, and that the robot arm 823 is used to store a package placed on the package stand 821 or 822 in the storage box 810.

Figure 25:
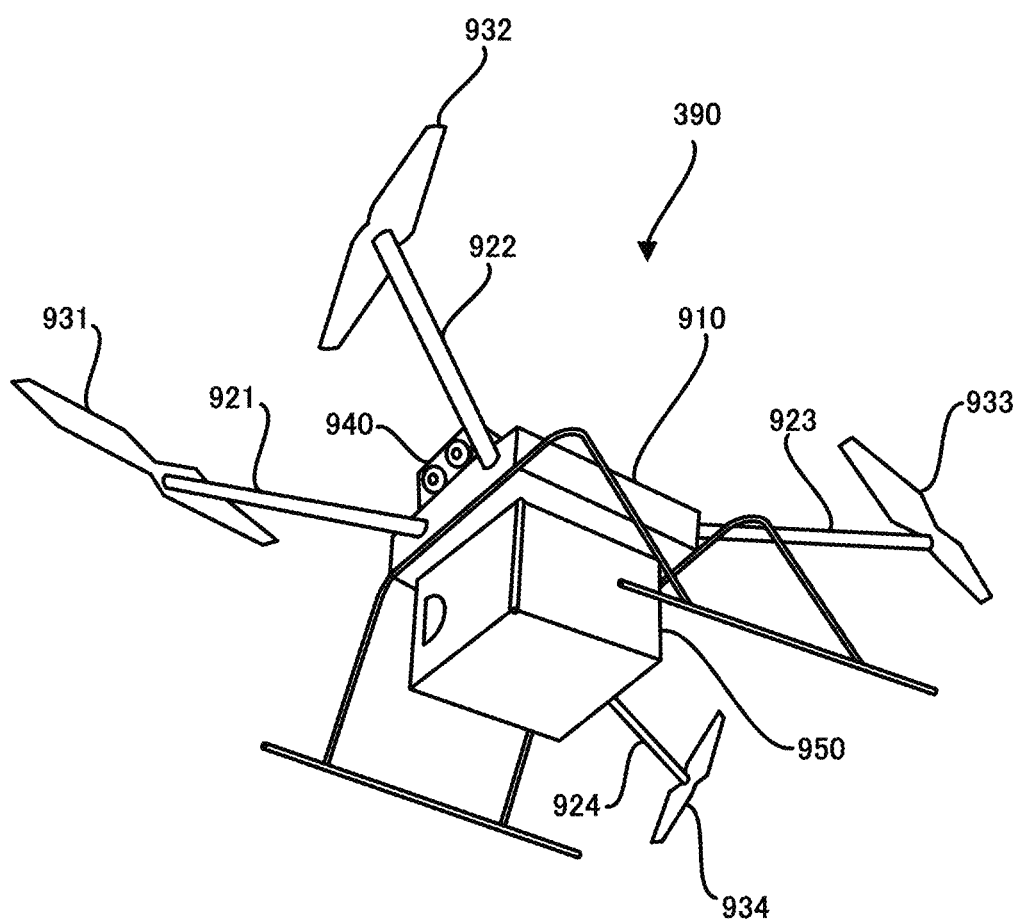
FIG. 25 is an appearance configuration drawing illustrating an example of the appearance of an unmanned aircraft according to Modified Example 2 of Embodiment 1.

However, Embodiment 1 is not limited thereto and the unmanned aircraft 390 according to the present modified example includes, below the control device 910, a storage box 950 such as illustrated in FIG. 25 instead of the first holding frame 941*a* and the second holding frame 941*b* of FIG. 22. The configuration and functions of the storage box 950 of the unmanned aircraft 390 are the same as the configuration and functions of the storage boxes 810 of the locker device 228 illustrated in FIG. 5.

The locker device 228 according to the present modified example is not provided with a package stand 821 or 822 such as illustrated in FIG. 5, and uses the robot arm 823 to remove the package from the storage box 950 of the unmanned aircraft 390 and store the removed package in a storage box 810 of the locker device 228.

As such, the worker that views, in step S57 of FIG. 21, the message displayed on the delivery control server 310 prompting the loading of the package searches for the package in accordance with the message, and stores the found package in the storage box 950 of the unmanned aircraft 390. Thereafter, the worker performs, on the touch panel 915 of the control device 910 of the unmanned aircraft 390, an operation for closing and locking the door of the storage box 950.

When the touch panel 915 outputs a signal in response to the operation, the CPU 911 of the unmanned aircraft 390 illustrated in FIG. 23 executes the flight control processing illustrated in FIG. 24. When the execution of the flight control processing starts, the CPU 911 outputs a close signal to the drive circuit 919, and the drive circuit 919 closes and locks the door by driving, in accordance with the close signal, the non-illustrated motor installed in the door of the storage box 950, thereby completing the loading of the package (step S61).

Thereafter, steps S62 to S66 are executed and, as a result, the unmanned aircraft 390 arrives at the receiving location and send an arrival notification to the delivery control server 310. Next, the CPU 911 of the unmanned aircraft 390 outputs an open signal to the drive circuit 919 to unlock and open the door of the storage box 950 (step S67).

When the data communication circuit 834a of the locker device 228 illustrated in FIG. 6 receives the arrival notification forwarded from the delivery control server 310, the CPU 831 of the locker device 228 acquires, from the box management table illustrated in FIG. 7, the box ID associated with the state information expressing the reserved state and the package ID included in the arrival notification, and outputs the acquired box ID and an open signal to the drive circuit 839. As a result, the door 811 of the reserved storage box 810 is unlocked and opened.

Next, the locker device 228 images the unmanned aircraft 390 using the imaging device 824 illustrated in FIG. 5, and causes the robot arm 823 to operate on the basis of the captured image. When the robot arm 823 grips the package stored in the storage box 950 of the unmanned aircraft 390 and stores the package in the empty storage box 810 of the locker device 228, the locker device 228 closes and locks the door 811 of that storage box 810 and sends a storage completion notification. When the delivery control server 310 receives the storage completion notification from the locker device 228, the delivery control server 310 forwards the storage completion notification to the unmanned aircraft 390.

After executing step S67 of FIG. 24, the CPU 911 of the unmanned aircraft 390 illustrated in FIG. 23 determines whether or not the data communication circuit 914a has received the storage completion notification. At this time, when it is determined that the storage completion notification is not received, the CPU 911 determines that the package is not yet stored in the locker device 228 at the receiving location. Next, the CPU 911 outputs, to the drive circuit 919, a control signal that controls the propellers 931 to 934 illustrated in FIG. 22 so as to hover for a predetermined amount of time and, then, repeats the processing from the determination of whether or not the storage completion notification has been received.

In contrast, when the CPU 911 determines that the storage completion notification is received, the CPU 911 executes step S68, thereby flying on the delivery route back to the office (step S68) and, then, ends the execution of the flight control processing, According to these configurations, the unmanned aircraft 390 stores the package in the storage box 950 while delivering and, as such, compared to cases in which the package is surrounded and held by the first holding frame 941a and the second holding frame 941b illustrated in FIG. 22 while delivering, the package is less likely to become soiled or damaged due to wind, rain, and the like.

Modified Example 3 of Embodiment 1

In Embodiment 1, it is described that the locker devices 228 and 229 are installed at the train station B and are used not only by passengers of the train station B, but also by unspecified users such as shoppers. However, Embodiment 1 is not limited thereto. For example, a configuration is possible in which the locker devices 228 and 229 are delivery boxes that are installed at the home of the user, and are used by the user, people residing with the user, and specified users such as a delivery person that delivers packages to the home of the user. Additionally, the home of the user may be a house or a housing complex.

Modified Example 4 of Embodiment 1

In Embodiment 1, it is described that the locker devices 228 and 229 are installed at the train station B, but Embodiment 1 is not limited thereto. The locker devices 228 and 229 according to the present modified example are not installed at the train station B but, instead, are installed in the vicinity of the train station B near the entrance or exit of, inside, on the roof of, or in the parking lot of a commercial facility such as a convenience store or a department store, for example. In the present modified example, the phrase "the vicinity of the train station B" refers to geographical points apart from a representative geographical point of the train station B at a distance shorter than a distance that is set in advance by the user. However, the present modified example is not limited thereto.

In Embodiment 1, the locker devices 228 and 229 are installed in the train station B and, as such, it is described that, the CPU 311 of the delivery control server 310 illustrated in FIG. 8 starts the execution of the unspecified notification processing illustrated in FIG. 13 when the communication circuit 314 receives an admission notification that is sent from the automatic ticket gate 211 and that notifies that the user has entered the platform. In contrast, the locker devices 228 and 229 according to the present modified example are installed in the vicinity of the train station B and, as such, the CPU 311 of the delivery control server 310 according to the present modified example starts the execution of the unspecified notification processing when the communication circuit 314 receives the exit notification that is a notification sent from the automatic ticket gate 222 and that notifies that the user has exited the platform.

As such, the locker IDs, the box IDs, and the state information of the locker devices 228 and 229 installed in the vicinity of the train station B instead of the locker devices installed at the train station B, and the package IDs and the card IDs are associated and stored in a non-illustrated use state table according to the present modified example. Likewise, the information expressing the name of the train station, the locker IDs of the locker devices 228 and 229 installed in the vicinity of the train station, the information expressing the latitudes and longitudes of the locker devices 228 and 229, and information expressing an average movement time from the platform of the train station to the locker devices 228 and 229 installed in the vicinity of the train station are associated and stored in an non-illustrated installation location table according to the present modified example.

The processes that the delivery control server 310 according to the present modified example executes using these tables are the same as the processes that the delivery control server 310 according the Embodiment 1 executes using the use state table illustrated in FIG. 11 and the installation location table illustrated in FIG. 17.

According to these configurations, while moving from the train station B to, for example, a destination in the vicinity of the train station B such as the home of the user, the user can specify, as the receiving location, a location on the path from the train station B to the destination where the locker devices 228 and 229 are installed.

Modified Example 5 of Embodiment 1

In Embodiment 1, it is described that, in step S26 of FIG. 18, the information generator 324 of the delivery control server 310 illustrated in FIG. 9 sets the installation location of the locker device 228 or 229 as the receiving location, but the receiving location is not limited thereto.

The information generator 324 of the delivery control server 310 according to the present modified example sets, as the receiving location, a location where a landing port, at which the unmanned aircraft 390 can land, is provided. As such, the information storage unit 329 of the delivery control server 310 according to the present modified example stores a landing port table such as illustrated in FIG. 26, instead of the installation location table illustrated in FIG. 17, in which information related to the landing port is stored. A plurality of records are stored in the landing port table and, in each record, the information expressing the name of a train station, information identifying the landing port provided at the train station or in the vicinity of the train station (hereinafter referred to as "port ID"), and information expressing an average movement time from the platform of the train station to the landing port (hereinafter referred to as "port movement time") are associated and stored.

Figure 27:
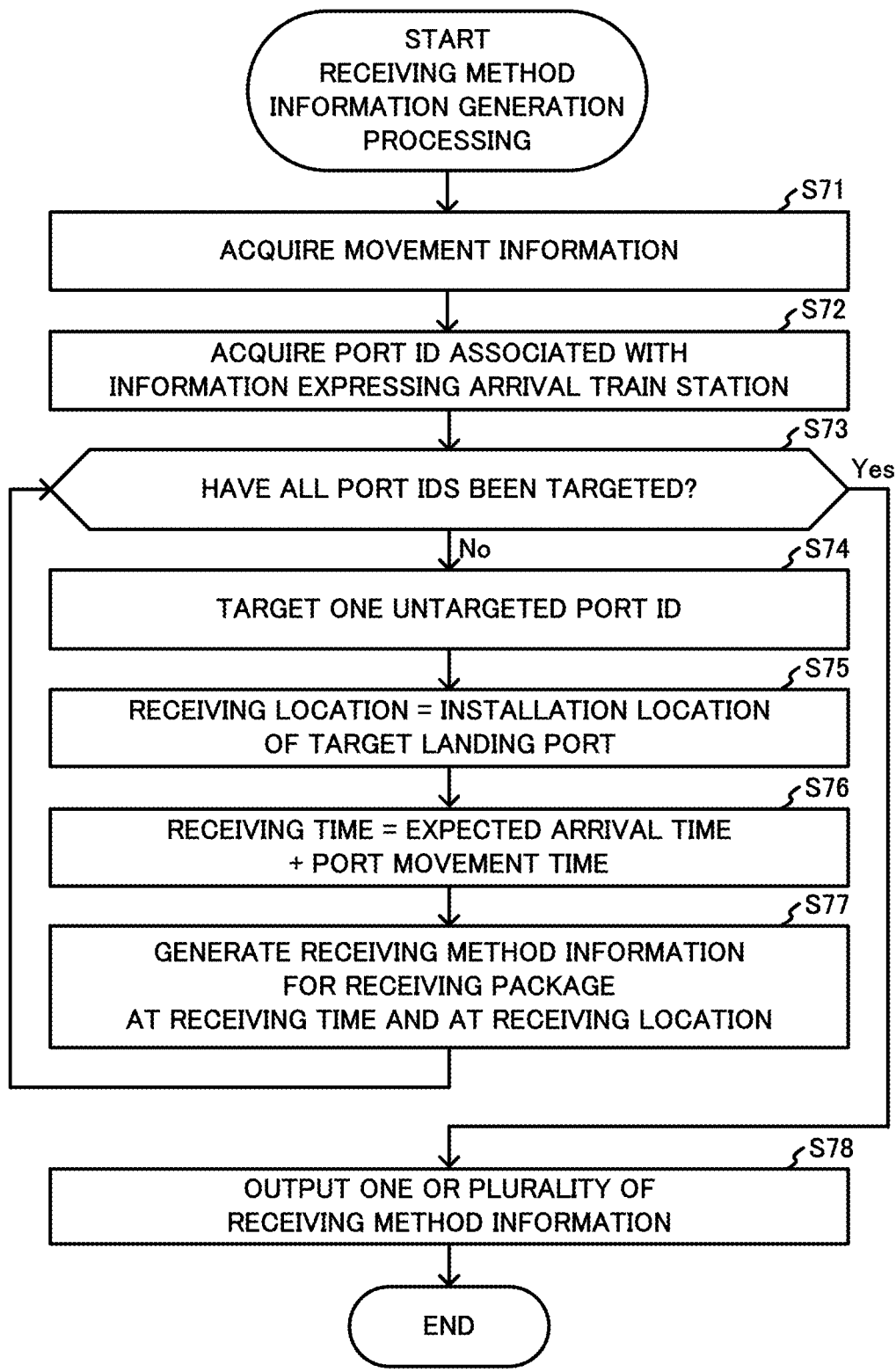
FIG. 27 is a flowchart illustrating receiving method information generation processing executed by the delivery control server according to Modified Example 5 of Embodiment 1.

The delivery control server 310 according to the present modified example executes receiving method information generation processing such as illustrated in FIG. 27, instead of the receiving method information generation processing of FIG. 18. When the execution of the receiving method information generation processing starts, the delivery control server 310 executes the same processing as step S21 of FIG. 18 to acquire the movement information (step S71), and acquires the information expressing the name of the arrival train station and the information expressing the expected arrival time that are included in the movement information. Next, the information acquirer 321 of the delivery control server 310 acquires, from the landing port table of FIG. 26, one or a plurality of port IDs associated with the information expressing the name of the train station B that is the arrival train station (step S72). This is to identify the landing port that is provided at the train station B or in the vicinity of the train station B.

Thereafter, the information acquirer 321 determines whether or not all of the landing ports have been targeted (step S73). At this time, when the information acquirer 321 determines that all of the landing ports have not been targeted (step S73; No), the information generator 324 targets one port ID that has not been targeted, and sets the landing port identified by that targeted port ID as a target port (step S74).

Thereafter, the information acquirer 321 acquires, from the landing port table of FIG. 26, information expressing the latitude and longitude associated with the port ID of the target landing port, and the information expressing the port movement time. Next, the information generator 324 sets, as the receiving location of the package, the installation location of the target landing port located at the latitude and longitude expressed in the acquired information (step S75). Additionally, the information generator 324 sets, as the receiving time of the package, a time obtained by adding the port movement time expressed in the acquired information to the expected arrival time expressed in the information acquired in step S71 (step S76). Thereafter, the receiving method information is generated by executing the same processing as in step S28 of FIG. 18 (step S77) and, then, the steps described above are repeated from step S73.

In step S73, when it is determined that all of the landing ports have been targeted (step S73; Yes), the same processing as in step S29 of FIG. 18 is executed to output one or a plurality of receiving method information (step S78) and, then, the execution of the receiving method information generation processing is ended.

In steps S55 and S56 of FIG. 21, the instruction outputter 326 of the delivery control server 310 according to the present modified example generates and outputs a new delivery instruction that further includes the card ID of the IC card that the user uses to receive the package, and that instructs the unmanned aircraft 390 to depart from the office at the delivery start time, fly on the delivery route to the receiving location, land at the landing port that is the receiving location, and wait at the landing port until the user receives the package.

The unmanned aircraft 390 according to the present modified example further includes a non-illustrated IC card RW that has the same configuration and functions as the configuration and functions of the IC card RW 837 of the locker device 228 illustrated in FIG. 5.

By executing steps S61 to S66 of FIG. 24, the unmanned aircraft 390 according to the present modified example flies to the landing port at the receiving location, lands at the landing port, and waits at the landing port in accordance with the delivery instruction (steps S61 to S66). Thereafter, when the user arrives at the receiving location and holds up the IC card 11 to the IC card RW of the unmanned aircraft 390, the CPU 911 of the unmanned aircraft 390 illustrated in FIG. 23 acquires the card ID of the IC card 11 from the IC card RW. Thereafter, if the CPU 911 determines that the acquired card ID and the card ID included in the delivery instruction are the same, the CPU 911 outputs, to the drive circuit 919, a control signal that causes the first holding frame 941*a* and the second holding frame 941*b* illustrated in FIG. 22 to sufficiently separate from each other. As a result, the unmanned aircraft 390 releases the package from the first holding frame 941*a* and the second holding frame 941*b* (step S67). Next, the user retrieves the package, thus completing the receiving of the package.

Thereafter, the CPU 911 of the unmanned aircraft 390 executes non-illustrated received notification output processing for outputting a received notification. When the received notification output processing starts, the CPU 911 outputs a signal to the imaging device 951 illustrated in FIG. 22 commanding imaging to be performed and, then, acquires information expressing the captured image from the imaging device 951. Thereafter, the CPU 911 extracts, from the captured image, an image area including a feature shared among a plurality of sample images in which people are expressed, and an image area including a feature shared among a plurality of sample images in which packages are expressed, for example, and determines that the receiving of the package by the user is complete when these two image area can be extracted. When it is determined that the receiving is complete, the CPU 911 outputs the received notification to the data communication circuit 914*a* with the delivery control server 310 as the destination and, then, ends the received notification output processing.

Thereafter, the unmanned aircraft 390 executes step S68, thereby flying back on the delivery route (step S68) to return to the office and, then, ends the execution of the flight control processing.

In the present modified example, it is described that the delivery control server 310 determines the landing port as the receiving location, but the receiving location is not limited thereto. For example, any location may be determined as the receiving location provided that the unmanned aircraft 390 can land, such as a park, a schoolyard, a river beach, the roof of a building, a veranda, and a front yard, or provided that the unmanned aircraft 390 can safely descend due to the location being sufficiently wide and relatively free of people.

According to these configurations, the delivery control server 310 can determine any location as the receiving location provided that the unmanned aircraft 390 can land or safely descend. As such, the degree of freedom related to the receiving location can be improved and, as a result, the convenience to the user can be further improved.

Additionally, according to these configurations, the unmanned aircraft 390 surrounds and holds the package with the first holding frame 941a and the second holding frame 941b while waiting at the receiving location. As such, even in cases in which a location where the locker devices 228 and 229 are not installed is specified as the receiving location, the risk of the package being stolen during the period from when the package is delivered to the receiving location to when the user receives the package can be reduced.

Additionally, according to these configurations, the unmanned aircraft 390 may include the storage box 950 illustrated in FIG. 25 in a manner similar to the unmanned aircraft 390 according to Modified Example 2 of Embodiment 1. In such a case, while waiting at the receiving location, the unmanned aircraft 390 may close and lock the door of the storage box 950 in which the package is stored. According to such a configuration, even in cases in which a location where the locker devices 228 and 229 are not installed is specified as the receiving location, the risk of the package being stolen during the period from when the package is delivered to the receiving location to when the user receives the package can be reduced even more than when the package is surrounded and held by the first holding frame 941a and the second holding frame 941b.

Modified Example 6 of Embodiment 1

In Embodiment 1, it is described that, in step S26 of FIG. 18, the information generator 324 of the delivery control server 310 illustrated in FIG. 9 sets the installation location of the locker device 228 or 229 as the receiving location. Additionally, it is described that the unmanned aircraft 390 delivers the package to the receiving location, and the locker device 228 or 229 uses the robot arm 823 to store the package, which the unmanned aircraft 390 has left, in a storage box 810. However, Embodiment 1 is not limited thereto.

The delivery control server 310 according to the present embodiment sets a location such as the doorstep, the front yard, the roof, the veranda, or the driveway of the home of the user, a registration desk, a lobby, or a parking lot of a hotel, or a cash register or a parking lot of a convenience store as the receiving location of the package. Here, the location is a user-specified location that differs from the installation locations of the locker devices 228 and 229. As such, the delivery control server 310 according to the present embodiment stores, in advance, the user ID that identifies the user, and information expressing the latitude and longitude of the user-specified location that differs from the installation locations of the locker devices 228 and 229. The information generator 324 of the delivery control server 310 sets the user-specified location expressed in the information associated with the user ID as the receiving location.

When the unmanned aircraft 390 according to the present embodiment arrives at the specified location, the unmanned aircraft 390 lands at the specified location or sufficiently descends at the specified location and, then, releases the package from the first holding frame 941a and the second holding frame 941b illustrated in FIG. 22, places the package at the specified location, and returns to the office.

As with the unmanned aircraft 390 according to Modified Example 2 of Embodiment 1, the unmanned aircraft 390 according to the present embodiment may include the storage box 950 illustrated in FIG. 25. In this case, the unmanned aircraft 390 may place the package at the specified location by unlocking and opening the door of the storage box 950 and, for example, directing the opened door of the storage box 950 downward and causing the unmanned aircraft 390 to shake while flying. However, the method whereby the unmanned aircraft 390 removes the package from the storage box 950 is not limited thereto.

For example, the unmanned aircraft 390 may include a non-illustrated robot arm that has the same configuration and functions as the configuration and functions of the robot arm 823 of the locker device 228 illustrated in FIG. 5, and the package may be removed from the storage box 950 of the unmanned aircraft 390 and placed at the user-specified location using the robot arm.

According to these configurations, the delivery system 30 that includes the delivery control server 310 and the unmanned aircraft 390 can increase the possibility of reducing the difference between the delivery time of the package and the time at which the user actually receives the package, even when the package is delivered to a user-specified location that differs from the installation locations of the locker devices 228 and 229. As a result, the risk of the package being stolen can be reduced. Additionally, with such a delivery system 30, it is possible to eliminate or mostly eliminate waiting of the unmanned aircraft 390 for the arrival of the user, redelivering of the package, and the like. As such, the delivery efficiency can be improved while reducing the risk of theft.

Modified Example 7 of Embodiment 1

In Embodiment 1, it is described that the delivery control server 310 sets the location at which the locker device 228 or 229 is installed as the receiving location, and performs control that causes the unmanned aircraft 390 to deliver the package to the receiving location. However, Embodiment 1 is not limited thereto. For example, the delivery control server 310 may set a location at which an unmanned vehicle, such as an unmanned ground vehicle 380 such as illustrated in FIG. 28 or a non-illustrated unmanned ship, can stop or berth, and perform control that causes the unmanned ground vehicle 380 or the unmanned ship to deliver the package to the receiving location.

Figure 28:
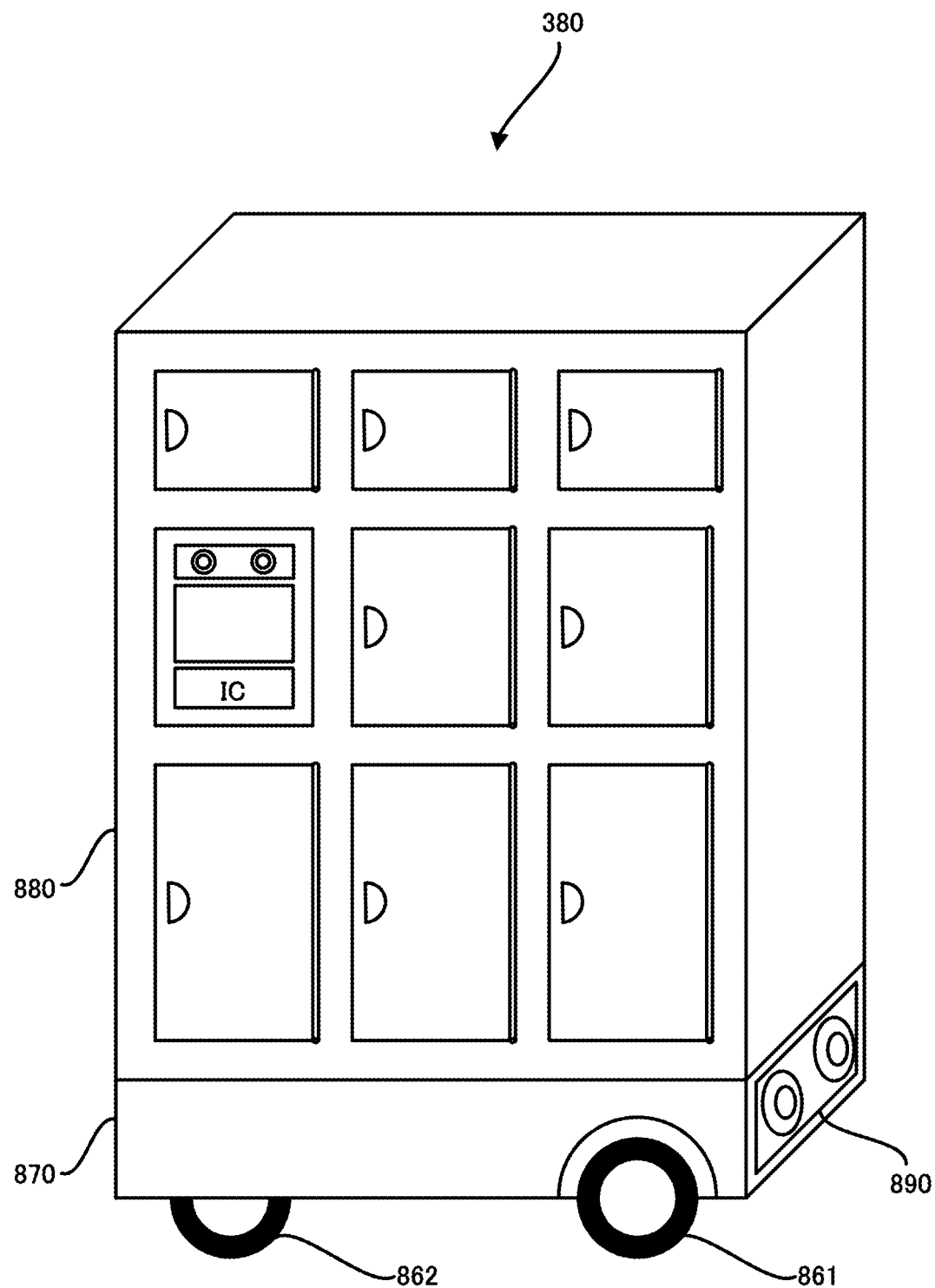
FIG. 28 is an appearance configuration drawing illustrating an example of the appearance of an unmanned ground vehicle.

The unmanned ground vehicle 380 of FIG. 28 includes a body 870 that is provided with a plurality of wheels including wheels 861 and 862, a locker device 880 installed on the body 870, and an imaging device 890 that is installed on a front face of the body 870 and that has an optical axis directed forward. The configuration and functions of the locker device 880 are the same as the configuration and functions of the locker device 228 illustrated in FIG. 5. The configuration and functions of the imaging device 890 are the same as the configuration and functions of the imaging device 951 of the unmanned aircraft 390 illustrated in FIG. 22.

The unmanned ground vehicle 380 further includes a non-illustrated control device that is installed in the body 870 and that, on the basis of information expressing captured images output by the imaging device 890, drives a plurality of non-illustrated motors installed in each of the plurality of wheels so as to travel on the delivery route while avoiding obstacles. The configuration and functions of the control device of the unmanned ground vehicle 380 are the same as the configuration and functions of the control device 910 of the unmanned aircraft 390 illustrated in FIG. 23, with the exception that the control device of the unmanned ground vehicle 380 drives the plurality of non-illustrated motors that rotate each of the plurality of wheels, and the control device 910 of the unmanned aircraft 390 drives the plurality of non-illustrated motors that rotate each of the propellers 931 to 934.

Modified Example 8 of Embodiment 1

In Modified Example 7 of Embodiment 1, it is described that the delivery control server 310 is installed at the train station B, sets the installation location of the locker device 228 or 229, which is used by unspecified users, as the receiving location, and performs control that causes the unmanned ground vehicle 380 to deliver the package to the receiving location.

However, the receiving location is not limited thereto, and the locker devices 228 and 229 may be implemented as delivery boxes that are installed at the home of the user and that are used by a specified user. However, the installation location is not limited thereto, and the locker devices 228 and 229 may be installed at any location in the vicinity of the train station B including, for example, a location located at a commercial facility such as a convenience store.

Additionally, the receiving location is not limited thereto, and the delivery control server 310 may set, as the receiving location, a location where the unmanned ground vehicle 380 can park such as a parking lot, a river beach, or road that has a wide width and on which the amount of traffic is relatively low. Moreover, the unmanned ground vehicle 380 may park at the receiving location during a period from when arriving at the receiving location to when the user arrives at the receiving location and receives the package stored in the storage box of the unmanned ground vehicle 380.

Furthermore, the receiving location is not limited thereto and a location that is specified by the user and at which the unmanned aircraft 390 can stop, such as the doorstep, the front yard, or the driveway of the home of the user, may be set as the receiving location. The unmanned ground vehicle 380 may include a robot arm that has the same configuration and functions as the configuration and functions of the robot arm 823 of the locker device 228 illustrated in FIG. 5. In such a case, the robot arm may be used to remove the package from the storage box of the unmanned ground vehicle 380 and place the package at the user-specified location and, then, the unmanned ground vehicle 380 may leave.

Modified Example 9 of Embodiment 1

In Embodiment 1 it is described that the delivery system 30 includes the delivery control server 310 and the unmanned aircraft 390, and that the delivery control server 310 sends, to the unmanned aircraft 390, a control instruction including information expressing the delivery start time and information expressing the delivery route. However, Embodiment 1 is not limited thereto.

A configuration is possible in which the delivery system 30 includes the delivery control server 310 but does not include the unmanned aircraft 390, and a worker delivers the package instead of the unmanned aircraft 390. In such a case, the delivery control server 310 may display the delivery start time and the delivery route on the display device 315*b* illustrated in FIG. 8. After confirming the delivery start time and the delivery route that are displayed, the delivery person may load the package onto a manned vehicle such as, for example, a bicycle, a motorcycle, or a delivery vehicle, depart from the office at the displayed delivery start time, and drive the manned vehicle on the displayed delivery route so as to arrive at the receiving location. Additionally, the delivery person may deliver the package to the receiving location on foot.

The delivery control server 310 may send the information expressing the delivery start time and the information expressing the delivery route to a navigation device of the manned vehicle or to a mobile terminal, of the delivery person, running navigation software.

Modified Example 10 of Embodiment 1

In Embodiment 1, it is described that the delivery control server 310 executes steps S22 and S26 of FIG. 18 to set the location where the locker device 228 or 229, of the arrival train station that is located at the first geographical point, is installed as the receiving location, and to determine the receiving time on the basis of the expected arrival time at the arrival train station. However, Embodiment 1 is not limited thereto. The delivery control server 310 according to the present modified example sets the installation location of a locker device located at a second geographical point on the movement route by train to the first geographical point where the arrival train station is located, and determines the receiving time on the basis of an expected arrival time at the second geographical point.

As such, in step S15 of FIG. 15, the information acquirer 121 of the mobile terminal 10 according to the present modified example outputs, to the data communication circuit 104*a* with a search engine as the destination, a request for requesting a search for combinations that include a usable movement route, the expected arrival time at the final arrival train station, a transfer train station on the movement route that is used to transfer between railway lines or trains, and the expected arrival time at the transfer train station. After sending the request, the data communication circuit 104*a* receives a response from the search engine (step S15).

After steps S16 and S17 are executed, instead of step S18 of FIG. 15, the information acquirer 121 of the mobile terminal 10 according to the present modified example acquires, as the movement information and from information expressing the selected combination, information expressing the name of the transfer train station (that is, information expressing the second geographical point), and information expressing the expected arrival time at the transfer train station included in the selected combination.

Thereafter, when the delivery control server 310 according to the present modified example outputs the movement information from the mobile terminal 10 (step S19), in step S21 of FIG. 18, the information acquirer 321 acquires the information expressing the name of the transfer train station and the information expressing the expected arrival time at the transfer train station that are included in the movement information (step S21). Next, instead of step S22 of FIG. 18, the information acquirer 321 acquires, from the installation location table of FIG. 17, locker IDs associated with the acquired information expressing the name of the transfer train station (step S22). This is to identify the locker devices that are installed at the transfer train station located at the second geographical point.

Thereafter, steps S23 to S27 of FIG. 18 are executed to set one of the locker devices located at the second geographical point as a target locker device and, then, the information generator 324 sets the installation location of that target locker device as the receiving location (step S26). Additionally, the information generator 324 sets, as the receiving time, a time obtained by adding the movement time in train station to the expected arrival time at the transfer train station expressed in the information acquired in step S21 (step S27).

In the present modified example, it is described that the second geographical point is a geographical point, on the movement route from the departure train station to the first geographical point, at which the transfer train station is located. However, the second geographical point is not limited thereto, and may be any train station that is on the movement route.

According to these configurations, the delivery control server 310 can determine the second geographical point on the movement route to the first geographical point as the receiving location. As such, the degree of freedom related to the receiving location can be improved and, as a result, the convenience to the user can be improved.

Modified Example 11 of Embodiment 1

In Modified Example 4 of Embodiment 1, it is described that the delivery control server 310 sets, as the receiving location, the location in the vicinity of the first geographical point where the locker device 228 or 229 is installed, and determines the receiving time on the basis of the expected arrival time at the arrival train station. However, Embodiment 1 is not limited thereto.

Additionally, in Modified Example 10 of Embodiment 1, it is described that the delivery control server 310 sets, as the receiving location, the location of a locker device of a transfer train station located on the movement route to the first geographical point, and determines the receiving time on the basis of the expected arrival time at the transfer train station. However, Embodiment 1 is not limited thereto.

For example, the delivery control server 310 may set, as the receiving location, an installation location of a locker device located at a second geographical point positioned in the vicinity of the transfer train station that is on the movement route by train to the first geographical point, and determine the receiving time on the basis of the expected arrival time at the second geographical point.

Modified Example 12 of Embodiment 1

In Embodiment 1 it is described that, when the delivery control server 310 receives an admission notification notifying that the user has passed through the automatic ticket gate 211 and entered the platform, the delivery control server 310 executes the unspecified notification processing illustrated in FIG. 13 for notifying that there is a package for which the receiving method is not specified. However, Embodiment 1 is not limited thereto. A configuration is possible in which, in cases in which the probability of the delivery by the unmanned aircraft 390 being made by the receiving time is lower than a predetermined threshold, the delivery control server 310 according to the present modified example does not execute the unspecified notification processing even when an admission notification is received.

Figure 29:
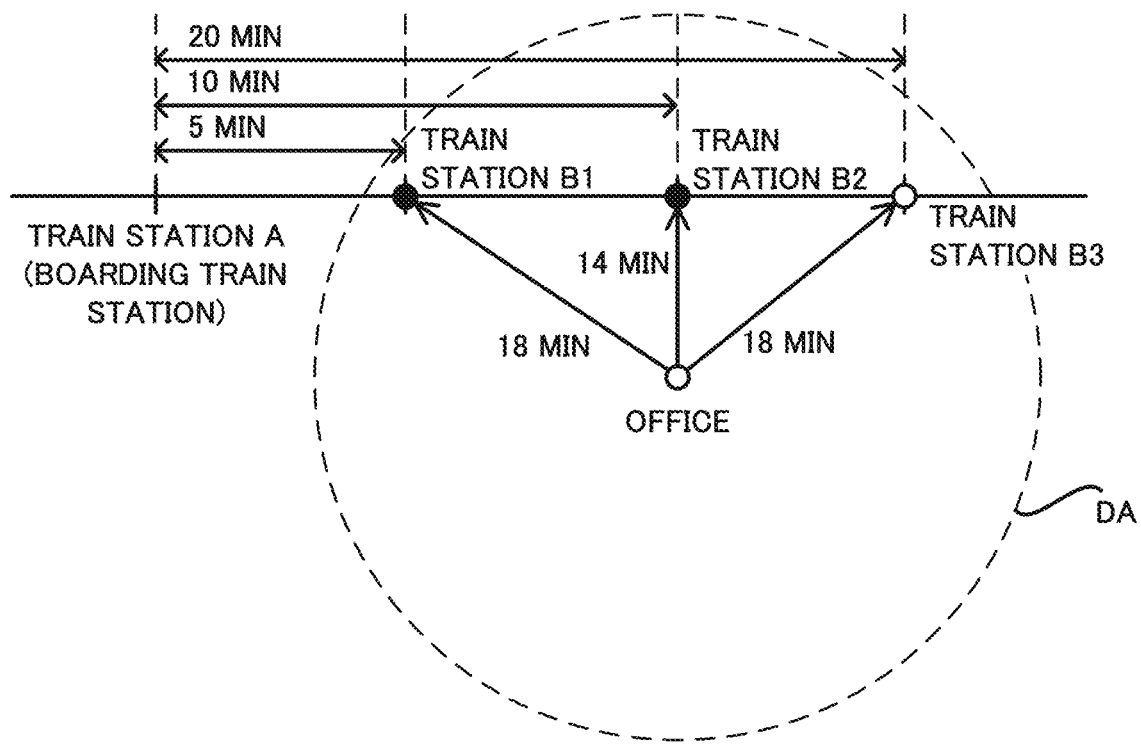
FIG. 29 is a drawing illustrating an example of a train station within a delivery area.

In the present modified example, a description is given in which the train station B1, the train station B2, and a train station B3 exist within the delivery area DA of the office where the unmanned aircraft 390 is located, as illustrated in FIG. 29. As such, the information storage unit 329 of the delivery control server 310 according to the present modified example stores a flight time table such as illustrated in FIG. 30, in which information expressing a flight time required for the unmanned aircraft 390 to fly from the office to the train station is stored. Information expressing the name of the train station B1 and information expressing that the flight time from the office to the train station B1 is "8 minutes" are associated and stored in the flight time table. Additionally, information expressing the name of the train station B2 and information expressing that the flight time from the office to the train station B2 is "4 minutes" are associated and stored in the flight time table. Moreover, information expressing the name of the train station B3 and information expressing that the flight time from the office to the train station B3 is "8 minutes" are associated and stored in the flight time table.

The information storage unit 329 of the delivery control server 310 according to the present modified example stores a ride time table such as illustrated in FIG. 31, in which information expressing a ride time required for a train to move from the departure train station to a train station within the delivery area DA is stored. In the ride time table, information expressing the name of the train station A and information expressing that the ride time from the train station A to the train station B1 is "5 minutes" is associated and stored; information expressing the name of the train station A and information expressing that the ride time from the train station A to the train station B2 is "10 minutes" is associated and stored; and information expressing the name of the train station A and information expressing that the ride time from the train station A to the train station B3 is "20 minutes" is associated and stored.

The automatic ticket gate 211 according to the present modified example sends an admission notification that includes the information expressing the name of the train station A at which the automatic ticket gate 211 is installed. When the communication circuit 314 receives the admission notification, the CPU 311 of the delivery control server 310 according to the present modified example acquires, from the flight time table of FIG. 30, the information expressing the flight time of "8 minutes" from the office to the train station B1 that is associated with the information expressing the name of the train station B1. Next, the CPU 311 acquires, from the hard disk 313b, information expressing an average specification time of "10 minutes", which is the average amount of time required for the user to specify the receiving method. Thereafter, in a case in which the installation location of a locker device located at the train station B1 is specified as the receiving location, the CPU 311 sets, as a grace time up to the earliest receiving time that may be specified, a value of "18 minutes." Here, the grace time is obtained by adding the average specification time of "10 minutes" to the flight time of "8 minutes."

Next, the CPU 311 acquires, from the ride time table of FIG. 31, the information expressing the ride time of "5 minutes" associated with the information expressing the name of the train station A included in the admission notification and the information expressing the name of the train station B1. Since the ride time of "5 minutes" from the train station A to the train station B1 is shorter than the grace time of "18 minutes", the CPU 311 determines that, in a case in which the installation location of the locker device located at the train station B1 is specified as the receiving location, it may not be possible to deliver the package by the receiving time.

In the same manner, the CPU 311 sets, as the grace time, a value of "14 minutes", which is obtained by adding the average specification time of "10 minutes" to the flight time of "4 minutes" from the office to the train station B2, and determines that the ride time of "10 minutes" from the train station A to the train station B2 is shorter than the grace time of "14 minutes." As such, the CPU 311 determines that, in a case in which the installation location of the locker device located at the train station B2 is specified as the receiving location, it may not be possible to deliver the package by the receiving time.

In the same manner, the CPU 311 sets the grace time for the train station B3 to "18 minutes." Thereafter, since the ride time of "20 minutes" from the train station A to the train station B3 is longer than the grace time of "18 minutes", the CPU 311 determines that, if the installation location of the locker device located at the train station B3 is specified as the receiving location, it is possible to deliver the package by the receiving time.

Thereafter, the CPU 311 calculates the probability that the package can be delivered to the receiving location by the receiving time (hereinafter referred to as "deliverability probability") as "33%." This calculation is performed on the basis of a value obtained by dividing a number "1" of train stations where locker devices that are determined to be deliverable to are installed, by a number "3" of train stations within the office jurisdiction. The CPU 311 acquires, from the hard disk 313$b$, information expressing a threshold of "50%" that is preset by the administrator of the delivery control server 310. Thereafter, since the deliverability probability of "33%" is lower than the threshold of "50%", the CPU 311 determines not to execute the unspecified notification processing illustrated in FIG. 13.

In contrast, when the deliverability probability is greater than or equal to the threshold of "50%", the CPU 311 determines to execute the unspecified notification processing. Note that, the average specification time is not limited to "10 minutes", and the threshold is not limited to "50%." A person skilled in the art can determine, by experiment, an average specification time and a threshold that are more optimal.

According to these configurations, since the delivery control server 310 does not execute the unspecified notification processing when the deliverability probability is lower than the preset threshold, the unspecified notification is not sent to the mobile terminal 10 of the user even if there is a package for the user for which the receiving method is not specified. As such, for packages with a high risk of being undeliverable by the specified receiving time, the delivery control server 310 can prevent the mobile terminal 10 from outputting audio or displays prompting the user to specify the receiving method. Therefore, the convenience to the user can be improved compared to cases in which the unspecified notification is sent regardless of the deliverability probability. Additionally, the delivery control server 310 can reduce the possibility of not being able to deliver the package by the receiving time specified by the mobile terminal 10.

In the present modified example, the delivery control server 310 acquires the flight time and the ride time on the basis of the flight time table illustrated in FIG. 30 and the ride time table illustrated in FIG. 31. However, the present modified example is not limited thereto. The delivery control server 310 may send, to a search engine, a request requesting a search for the flight time and the ride time and, then, acquire the flight time and the ride time from the search engine.

Modified Example 13 of Embodiment 1

In Embodiment 1, it is described that, in step S53 of FIG. 21, the delivery control server 310 outputs a reservation request that requests a reservation of an empty storage box of the locker device 228 located at the receiving location specified by the delivery instruction. However, Embodiment 1 is not limited thereto, and a configuration is possible in which the delivery control server 310 does not execute step S53.

Modified Example 14 of Embodiment 1

In Embodiment 1, it is described that the movement detector 323 of the delivery control server 310 illustrated in FIG. 9 detects the movement of the user on the basis of the admission notification sent from the automatic ticket gate 211 installed at the train station. However, Embodiment 1 is not limited thereto.

For example, the movement detector 323 may detect the movement of the user on the basis of a notification sent from a non-illustrated fare collection device installed in a fixed-route bus or a streetcar that uses a pre-pay system in which the fare is paid at the time of boarding. Here, the notification is an exit notification that notifies that the user has exited the station and boarded a fixed-route bus or streetcar. Additionally, for example, in the case of a fixed-route bus or a streetcar that uses a post-pay system in which the fare is paid at the time of deboarding, the movement detector 323 may detect the movement of the user on the basis of an admission notification that notifies that the user has deboarded the fixed-route bus or streetcar and entered a station at which the fixed-route bus or streetcar stops.

In such a case, in step S13 of FIG. 15, the mobile terminal 10 acquires, as the name of the departure station, the name of the station at which the fixed-route bus or streetcar stops. Additionally, in step S14, the mobile terminal 10 acquires, as the name of the arrival station, the name of a station at which the fixed-route bus or streetcar stops and that is different from the name of the departure station. Furthermore, in steps S15 and S16, the mobile terminal 10 acquires and displays one or a plurality of combinations of expected arrival times and movement routes from the departure station to the arrival station of the fixed-route bus or streetcar.

In one example, the non-illustrated fare collection device may include an IC card RW that has the same configuration and features as the configuration and features of the IC card RW 217 illustrated in FIG. 3, and a control device that has the same configuration and features as the configuration and features of the control device 218 illustrated in FIG. 4.

Modified Example 15 of Embodiment 1

In Embodiment 1 it is described that, when the delivery control server 310 receives an admission notification notifying that the user has passed through the automatic ticket gate 211 and entered the platform, the delivery control server 310 executes the unspecified notification processing illustrated in FIG. 13 for sending an unspecified notification. Additionally, it is described that, when the unspecified notification is received, the mobile terminal 10 acquires and send the movement information by executing the movement information acquisition processing of FIG. 15 on the basis of an operation by the user and, when the movement information is received, the delivery control server 310 executes the receiving method information generation processing illustrated in FIG. 18.

As such, it is described that, typically, the delivery control server 310 and the mobile terminal 10 acquire the movement information and generate the receiving method information while the user is waiting for the train at the train station A or while the user is moving by train from the train station A to the first geographical point that is the train station B. However, Embodiment 1 is not limited thereto.

The mobile terminal 10 according to the present modified example executes the movement information acquisition processing of FIG. 15 and the receiving method approval processing of FIG. 19 only while movement of the user to the first geographical point is detected. As such, the mobile terminal 10 according to the present modified example detects, on a predetermined cycle, whether or not the user is moving to the first geographical point on the basis of the latitude and longitude or a change in the latitude and longitude expressed by a signal output from the GPS circuit 106.

Similar to the mobile terminal 10, the delivery control server 310 according to the present modified example executes the receiving method information generation processing of FIG. 18 only while movement of the user to the first geographical point is detected. As such, the mobile terminal 10 according to the present modified example sends, to the delivery control server 310 on a predetermined cycle, information expressing the latitude and longitude output from the GPS circuit 106. Each time the information expressing the latitude and longitude sent from the mobile terminal 10 on the predetermined cycle is received, the delivery control server 310 according to the present modified example detects, on the basis of the latitude and longitude of the mobile terminal 10 expressed in the received information and the change in the latitude and longitude, whether or not the user is moving to the first geographical point.

Additionally, the mobile terminal 10 according to the present modified example starts and continues the execution of each of the movement information acquisition processing and the receiving method approval processing only while movement of the user to the first geographical point is continuously detected. When movement of the user to the first geographical point is no longer detected, the delivery control server 310 cancels the execution of the movement information acquisition processing and the receiving method approval processing. In the same manner, the delivery control server 310 according to the present modified example starts and continues the execution of the receiving method information generation processing only while movement of the user to the first geographical point is continuously detected. When movement of the user to the first geographical point is no longer detected, the delivery control server 310 cancels the execution of the receiving method information generation processing.

Modified Example 16 of Embodiment 1

In Embodiment 1, it is described that the to-be-delivered package information includes the notes information, and that the notes information includes information expressing the sender of the package and information expressing the type of the package. However, Embodiment 1 is not limited thereto. The notes information according to the present modified example further includes information expressing a storage box size, among storage box sizes determined in advance according to standards, that has the smallest volume capable of storing the package (hereinafter referred to as "storable box size").

Additionally, in Embodiment 1, it is described that in the installation location table of FIG. 17, information expressing the name of the train station where the locker device 228 or 229 is installed, information expressing the latitude and longitude of the locker device 228 or 229, and information expressing the movement time in train station are associated with the locker ID of the locker device 228 or 229. In contrast, in the non-illustrated installation location table according to the present modified example, information expressing the storable box size is further associated with the locker ID of the locker device 228 or 229.

As such, in step S23 of FIG. 18, for each of the one or plurality of locker IDs acquired in step S22, the CPU 311 of the delivery control server 310 acquires, from the non-illustrated installation location table, the box ID associated with the locker ID and the state information expressing the empty state, and the information expressing the storable box size included in the to-be-delivered package information acquired in step S04 of FIG. 13. As such, the delivery control server 310 can identify, from the storage boxes 810 of the locker devices 228 and 229 located at the arrival train station, the storage boxes 810 that have the smallest volume capable of storing the package to be delivered. As a result, package storing efficiency of the locker devices 228 and 229 can be improved.

Additionally, in the present modified example, in step S23 of FIG. 18, for each of the one or plurality of locker IDs acquired in step S22, the CPU 311 of the delivery control server 310 may acquire one or a plurality of combinations of the box ID associated with the locker ID and the state information expressing the empty state, and the information expressing the storable box size. In this case, when a plurality of the combinations are acquired, the combination that includes information expressing the size having the smallest volume, among the plurality of pieces of information expressing the storable box size of each of the plurality of combinations, may be selected. As such, the delivery control server 310 can identify, for each of the locker devices 228 and 229 located at the arrival train station, the storage box 810 among the storage boxes 810 in the empty state that has the smallest volume capable of storing the package to be delivered. As such, the delivery control server 310 can identify, for each of the locker devices 228 and 229 located at the arrival train station, the storage box 810 among the storage boxes 810 in the empty state that has the smallest volume capable of storing the package to be delivered.

Modified Example 17 of Embodiment 1

In Embodiment 1, it is described that the to-be-delivered package information is stored in advance in the to-be-delivered package table illustrated in FIG. 12. However, Embodiment 1 is not limited thereto. For example, the information acquirer 321 of the delivery control server 310 illustrated in FIG. 9 may acquire the to-be-delivered package information on the basis of a signal output from the input device 315c on which an input operation is performed by the user, and the information storer 322 may store the acquired to-be-delivered package information in the to-be-delivered package table. As such, the information acquirer 321 may control the display device 315*b* illustrated in FIG. 8 so as to perform a display prompting the input of the to-be-delivered package information.

Additionally, the information acquirer 321 may acquire to-be-delivered package information downloaded by the communication circuit 314 from a non-illustrated delivery management server. In order to realize this, the information acquirer 321 may output, to the communication circuit 314 with the non-illustrated delivery management server as the destination, a request requesting the sending of unsent to-be-delivered package information and, then, may acquire the to-be-delivered package information that the communication circuit 314 receives from the delivery management server.

Modified Example 18 of Embodiment 1

In Embodiment 1, it is described that, as illustrated in FIG. 1, the delivery system 30 includes the delivery control server 310 and the unmanned aircraft 390, and the delivery control server 310 includes the information storage unit 329 illustrated in FIG. 9.

However, Embodiment 1 is not limited thereto, and a configuration is possible in which the delivery system 30 further includes a non-illustrated file server that has the same functions as the information storage unit 329 illustrated in FIG. 9, the delivery control server 310 does not include the information storage unit 329 illustrated in FIG. 9, and the delivery control server 310 performs delivery control while referencing tables stored in the file server.

The non-illustrated file server includes hardware such as a CPU, a RAM, a ROM, a hard disk, a communication circuit, a video card, a display device, and an input device (all not illustrated in the drawings). These hardware have the same configurations and functions as the CPU 311, the RAM 312, the ROM 313*a*, the hard disk 313*b*, the communication circuit 314, the video card 315*a*, the display device 315*b*, and the input device 315*c* of the delivery control server 310 illustrated in FIG. 8.

Furthermore, in one example, the file server may include a plurality of file servers that are physically connected to each other across a local area network (LAN), and a scale controller that changes the number of servers, among the plurality of file servers, caused to virtually function as a single cloud server.

Modified Example 19 of Embodiment 1

In Embodiment 1, it is described that the delivery control server 310 sends a request to a non-illustrated search engine, and receives a response from the search engine. However, Embodiment 1 is not limited thereto, and the delivery control server 310 may include the search functions of a search engine.

Modified Example 20 of Embodiment 1

In Modified Example 2 of Embodiment 1 and Modified Example 7 of Embodiment 1, it is described that the locker device 228 illustrated in FIG. 5 includes one robot arm 823. However, the locker device 228 is not limited thereto, a configuration is possible in which the locker device 228 includes a plurality of robot arms 823, and the plurality of robot arms 823 cooperate to remove the package from the storage box 950 of the unmanned aircraft 390 illustrated in FIG. 25 or from the storage box of the unmanned ground vehicle 380 illustrated in FIG. 28.

Additionally, a configuration is possible in which the locker device 228 does not include the robot arm 823, and the unmanned aircraft 390 and the unmanned ground vehicle 380 include one or a plurality of robot arms that has the same configuration and functions as the configuration and functions of the robot arm 823. In this case, the one or plurality of robot arms of the unmanned aircraft 390 and the unmanned ground vehicle 380 removes the package from the storage box 950 of the unmanned aircraft 390 or from the storage box of the unmanned ground vehicle 380. Thereafter, the one or plurality of robot arms of the unmanned aircraft 390 and the unmanned ground vehicle 380 stores the package in a storage box 810 of the locker device 228 illustrated in FIG. 5. According to these configurations, even if the locker device does not include a robot arm, packages to be delivered by the unmanned aircraft 390 and the unmanned ground vehicle 380 can be stored and, as such, the degree of freedom of the receiving location can be improved.

Modified Example 21 of Embodiment 1

In Embodiment 1, it is described that the automatic ticket gate 211 sends an admission notification notifying that the user has entered the platform, and the delivery control server 310 detects the movement of the user on the basis of the admission notification. However, Embodiment 1 is not limited thereto. A configuration is possible in which the automatic ticket gate 211 sends a passing notification notifying that the user has passed through the automatic ticket gate 211, and the delivery control server 310 detects the movement of the user on the basis of the passing notification.

In Embodiment 1, it is described that the mobile terminal 10 is a smartphone or a tablet personal computer. However, the mobile terminal 10 is not limited thereto and may be a notebook personal computer. Additionally, in Embodiment 1, it is described that the delivery control server 310 determines the receiving time on the basis of the expected arrival time at the first geographical point, but a receiving date and time may be determined on the basis of an expected arrival date and time at the first geographical point. Furthermore, in Embodiment 1, it is described that the delivery system 30 includes one unmanned aircraft 390, but the delivery system 30 may include a plurality of unmanned aircraft 390. Additionally, the package to be delivered by the unmanned aircraft 390 may be an article or a living creature.

In Embodiment 1, it is described that the locker device 228 illustrated in FIG. 5 includes the package stands 821 and 822 on the top surface thereof. However, Embodiment 1 is not limited thereto, and a configuration is possible in which a package placement area in which the package stands 821 and 822 are not installed is provided on the top surface. The installation locations of the package stands 821 and 822 and the package placement area are not limited to the top surface of the locker device 228, and may be installed on the front surface, a side surface, or the back surface of the locker device 228, or may be installed in the vicinity within a predetermined distance from the locker device 228.

In Embodiment 1, it is described that the delivery control server 310 and the locker devices 228 and 229 use the card ID of the IC card 11 as an electronic key to the doors 811 of the storage boxes 810, but Embodiment 1 is not limited thereto. A configuration is possible in which, for example, the delivery control server 310 and the locker devices 228 and 229 use, as an electronic key, information expressing a personal identification number (PIN) or a password set in advance by the user; information expressing a physical feature such as a fingerprint, an iris, a voice print, a face shape, or a vein; or information expressing a behavioral feature such as handwriting.

Embodiment 2

Figure 32:
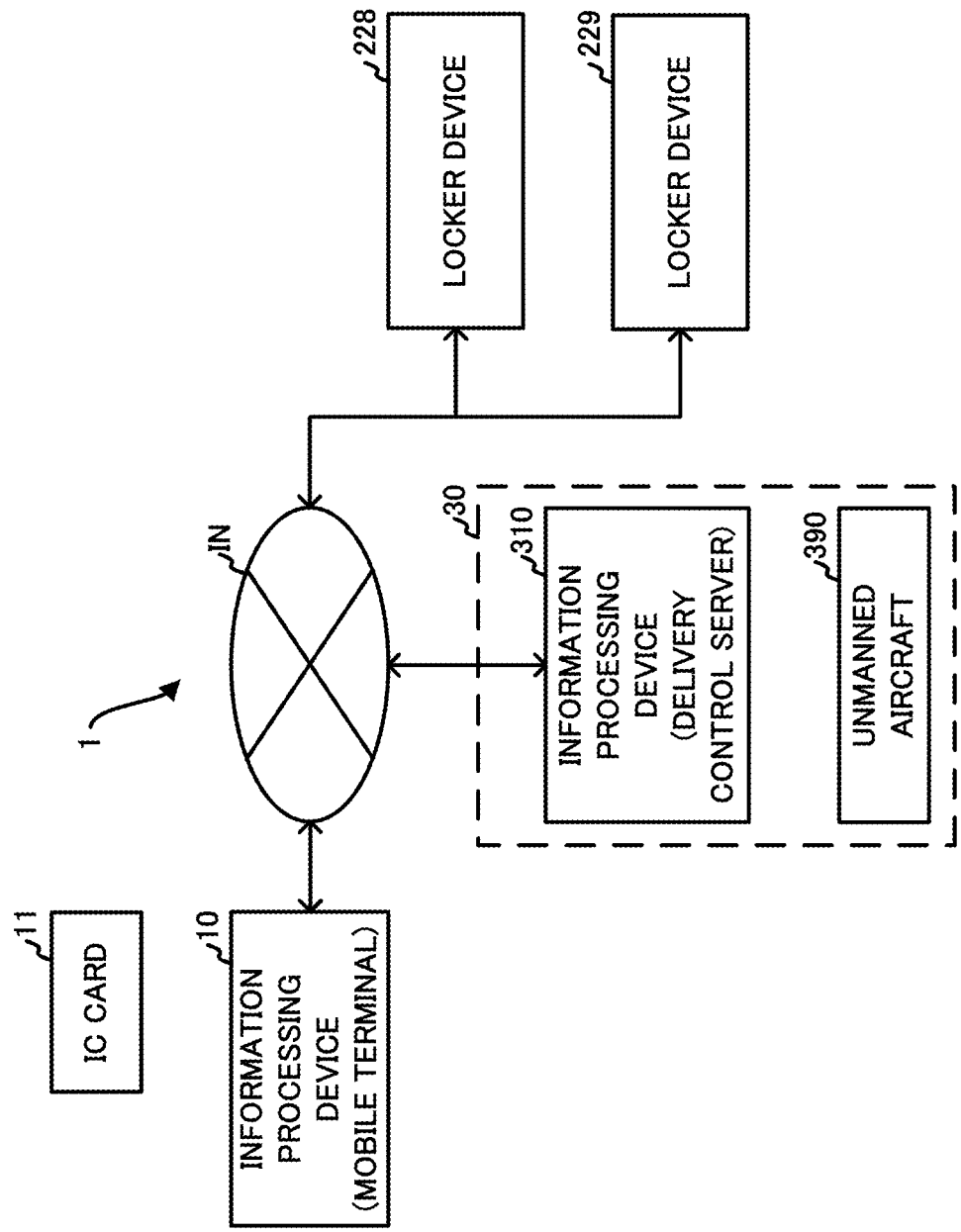
FIG. 32 is a system configuration drawing illustrating a configuration example of an information processing system according to Embodiment 2.

As illustrated in FIG. 32, the information processing system 1 according to the present embodiment includes the mobile terminal 10, the locker devices 228 and 229 installed at the train station B, and the delivery system 30 that includes the delivery control server 310 and the unmanned aircraft 390. The information processing system 1 according to the present embodiment differs from the information processing system 1 of Embodiment 1 in that the information processing system 1 according to the present embodiment does not include the automatic ticket gates 211, 212, 221, and 222 illustrated in FIG. 1. In the following, the configurations that are the same as those in Embodiment 1 are marked with the same reference numerals used in Embodiment 1, and the description focuses on the differences between the present embodiment and Embodiment 1.

Figure 33:
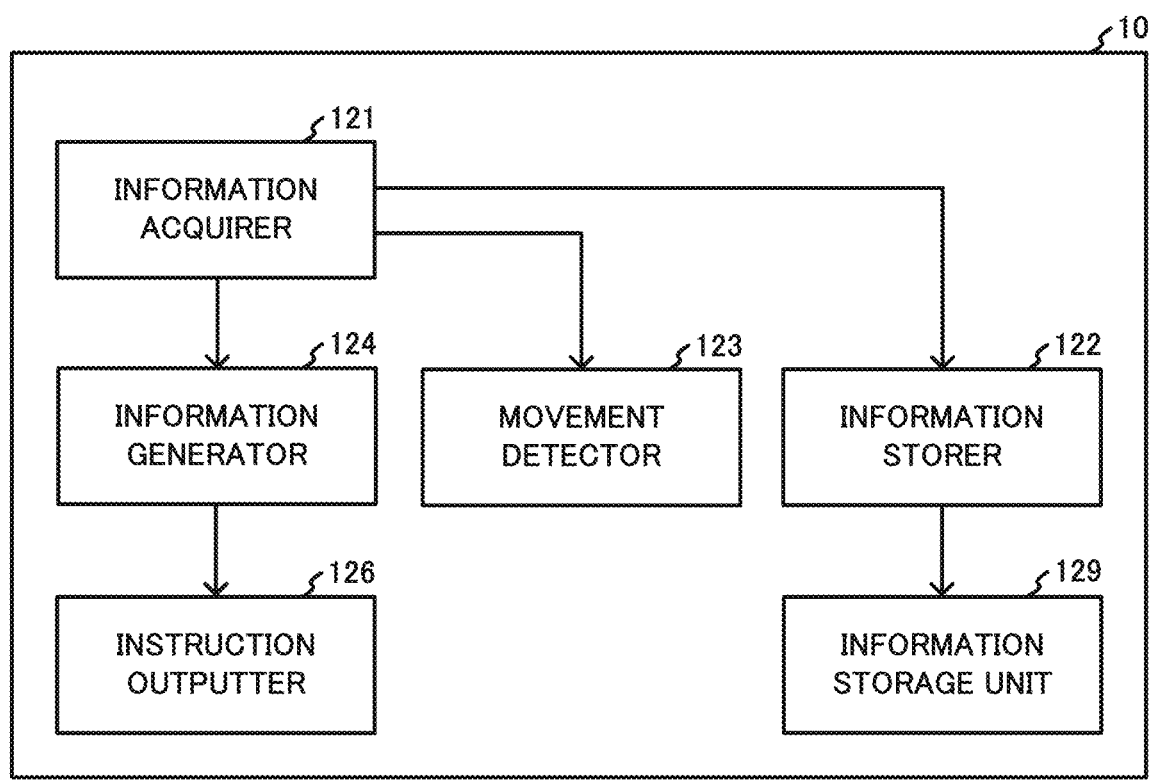
FIG. 33 is a functional block diagram illustrating an example of the functions of a mobile terminal according to Embodiment 2.

The CPU 101 of the mobile terminal 10 illustrated in FIG. 2 executes the receiving method specification app in the background at the time of start up to non-illustrated execute movement detection processing for detecting the movement of the user by train at a predetermined cycle of one-minute, for example. As such, the CPU 101 further functions as an information storer 122 and a movement detector 123 such as illustrated in FIG. 33, and the flash memory 103b functions as an information storage unit 129.

A non-illustrated train station table is stored in advance in the information storage unit 129. Information expressing the name of the train station and information expressing the latitude and longitude of a representative geographical point of the train station are associated and stored in the train station table.

When the execution of the movement detection processing starts, the information acquirer 121 acquires, from the information storage unit 129, information expressing the latitude and longitude of the mobile terminal 10 stored in the previous execution (hereinafter referred to as "previous latitude and longitude"). Note that, at the time of the first execution, information expressing a predetermined latitude and longitude is stored in the information storage unit 129.

Next, the information acquirer 121 acquires, from the GPS circuit 106, information expressing the latitude and longitude of the mobile terminal 10 (hereinafter referred to as "current latitude and longitude"), and the information storer 122 updates the information expressing the previous latitude and longitude stored in the information storage unit 129 with the acquired information expressing the current latitude and longitude.

Next, the movement detector 123 acquires, from the information storage unit 129, information expressing a pre-identified error of the GPS circuit 106. Next, in a case in which the difference between the current latitude and the previous latitude is greater than the error or the difference between the current longitude and the previous longitude is greater than the error, the movement detector 123 detects movement of the mobile terminal 10. In contrast, in cases in which the difference with the current latitude and the previous latitude is less than or equal to the error and the difference between the current longitude and the previous longitude is less than or equal to the error, the movement detector 123 does not detect movement of the mobile terminal 10 and ends the execution of the movement detection processing.

When movement of the mobile terminal 10 is detected, the information acquirer 121 acquires, from the non-illustrated train station table, information expressing the name of the train station associated with the information expressing a latitude for which the difference with the current latitude is less than the error and a longitude for which the difference with the current longitude is less than the error. When the information acquirer 121 cannot acquire the information expressing the name of the train station, the movement detector 123 determines that the user has not entered a train station and ends the execution of the movement detection processing. In contrast, when the information acquirer 121 can acquire the information expressing the name of the train station, the movement detector 123 determines that the user has entered a train station. Thereafter, the movement detector 123 outputs, to the data communication circuit 104a with the delivery control server 310 as the destination, an admission notification including the user ID and, then, ends the execution of the movement detection processing.

When the communication circuit 314 receives the admission notification, the CPU 311 of the delivery control server 310 illustrated in FIG. 8 starts the execution of the unspecified notification processing illustrated in FIG. 13 for notifying that there is a package for which the receiving method is not specified by the user that entered the train station. When the unspecified notification processing starts, the information acquirer 321 of the delivery control server 310 illustrated in FIG. 9 acquires the card ID of the IC card 11 included in the admission notification. Next, instead of steps S01 and S02 described in Embodiment 1 in which the user ID is acquired on the basis of the acquired card ID, the information acquirer 321 acquires the user ID included in the admission notification received by the communication circuit 314.

Then, after the movement detector 323 detects the movement of the user identified by the user ID (step S03), the processing of steps S04 to S06 is executed and, then, the execution of the unspecified notification processing is ended. Thus, when there is a package for which the receiving method is not specified by the user for which movement is detected, an unspecified notification is sent to the mobile terminal 10 of that user.

According to this configuration, the mobile terminal 10 sends the admission notification when the entering of the user carrying the mobile terminal 10 into the train station is detected on the basis of a signal output by the GPS circuit. Additionally, when the admission notification is received, the delivery control server 310 sends, to the mobile terminal 10, the unspecified notification notifying that there is a package for which the receiving method is not specified by the user. As such, even if the user enters a train station where the automatic ticket gate 211 or the like illustrated in FIG. 1 is not installed, the delivery control server 310 can detect the movement of the user and send the unspecified notification to the mobile terminal 10 of the user for which movement is detected.

Additionally, according to these configurations, when the admission notification is received, the delivery control server 310 detects the movement of the user identified by the user ID included in the admission notification. As such, the delivery control server 310 can detect the movement of the user even if the user does not settle the admission fee using the IC card 11 illustrated in FIG. 1.

Modified Example 1 of Embodiment 2

In Embodiment 2, it is described that, when it is detected that the user has entered the train station, the mobile terminal 10 sends an admission notification that includes the user ID to the delivery control server 310. However, Embodiment 2 is not limited thereto. A configuration is possible in which, when it is detected that the user has exited the train station, or that the user has passed the train station, the mobile terminal 10 sends an exit notification or a passing notification that includes the user ID to the delivery control server 310.

Modified Example 2 of Embodiment 2

In Embodiment 2, it is described that, when it is detected that the user has entered the train station, the mobile terminal 10 sends an admission notification that includes the user ID to the delivery control server 310. However, Embodiment 2 is not limited thereto. For example, a configuration is possible in which the mobile terminal 10 notifies that the user has entered a checkpoint specified in advance by the user, such as a bus stop or a bus terminal. Additionally, for example, a configuration is possible in which the mobile terminal 10 detects that the user has exited from a checkpoint specified in advance by the user, such as a place of employment of the user or a school that the user attends, and sends an exit notification that includes the user ID to the delivery control server 310. Furthermore, for example, a configuration is possible in which the mobile terminal 10 detects that a checkpoint specified in advance by the user, such as a train station located from the departure train station to the arrival train station and at which the train starts to become less crowded, has been passed, and sends a passing notification that includes the user ID to the delivery control server 310.

Embodiment 3

It is described that the delivery control server 310 according to Embodiment 1 receives, from the automatic ticket gate 211, an admission notification notifying that the user has entered the platform, and detects the movement of the user on the basis of the received admission notification. However, the delivery control server 310 according to the present embodiment differs from the delivery control server according to Embodiment 1 in that the delivery control server 310 according to the present embodiment performs, on the basis of the action history of the user, a movement prediction from a checkpoint to the first geographical point, and compares the movement prediction result with the latitude and longitude of the mobile terminal 10 used by the user to detect the movement of the user. In the following, the configurations that are the same as those in Embodiment 1 are marked with the same reference numerals used in Embodiment 1, and the description focuses on the differences between the present embodiment and Embodiment 1.

In the present embodiment, an example is described in which the office where the user works is the checkpoint and the geographical point at which the train station B is located is the first geographical point. As such, the delivery control server 310 and the information storage unit 329 according to the present embodiment store a setting point table such as illustrated in FIG. 34, in which information related to the checkpoint set by the user is stored. A plurality of records are stored in the setting point table. The user ID identifying the user, information expressing the latitude and longitude that is the position of the checkpoint specified in advance by the user, and information expressing the latitude and longitude of the first geographical point are associated and stored in each of the records.

Additionally, an action history table such as illustrated in FIG. 35, in which information expressing an action history of the user is stored, is stored in the information storage unit 329. A plurality of records are stored in the action history table. The user ID identifying the user, and data expressing the action history that includes data expressing the movement history of the user are stored in each of the records. The data expressing the movement history of the user is data in which information expressing the latitude and longitude of a location that the user enters, passes, or exits and information expressing the date and time when the entering, the passing, or the exiting is detected (hereinafter referred to as "detection date and time") are associated.

The data stored in the action history table is data that the delivery control server 310 receives from the mobile terminal 10. The mobile terminal 10 executes the receiving method specification app in the background and, for example, detects, on a predetermined cycle and on the basis of a signal output by the GPS circuit 106, the entering, the passing, or the exiting of a location serving as a landmark, such as a public facility such as an intersection, a building, a bridge, a tunnel, and a train station. When the entering, the passing, or the exiting is detected, the mobile terminal 10 sends, to the delivery control server 310, data in which the user ID, the latitude and longitude of the location where the entering, the passing, or the exiting was performed, and information expressing the detection date and time are associated. When the communication circuit 314 of the delivery control server 310 receives this data, the information acquirer 321 acquires the data from the communication circuit 314, and the information storer 322 adds a new record to the action history table and stores the acquired data in the added record.

The information storage unit 329 stores an action prediction result table such as illustrated in FIG. 36 in which information expressing the result of predicting the action of the user (hereinafter referred to as "action prediction result") is stored. A plurality of records are stored in the action prediction result table. Information expressing the action prediction result is stored in each of the records. The information expressing the action prediction result includes information expressing the result of predicting the movement from the checkpoint set by the user to the first geographical point (hereinafter referred to as "movement prediction result"). The information expressing the movement prediction result includes information expressing the latitude and longitude of the geographical point serving as a landmark included in the predicted movement route from the checkpoint to the first geographical point (hereinafter referred to as "predicted movement route"), and information expressing a time at which the user is predicted to pass that geographical point (hereinafter referred to as "predicted time").

Figure 37:
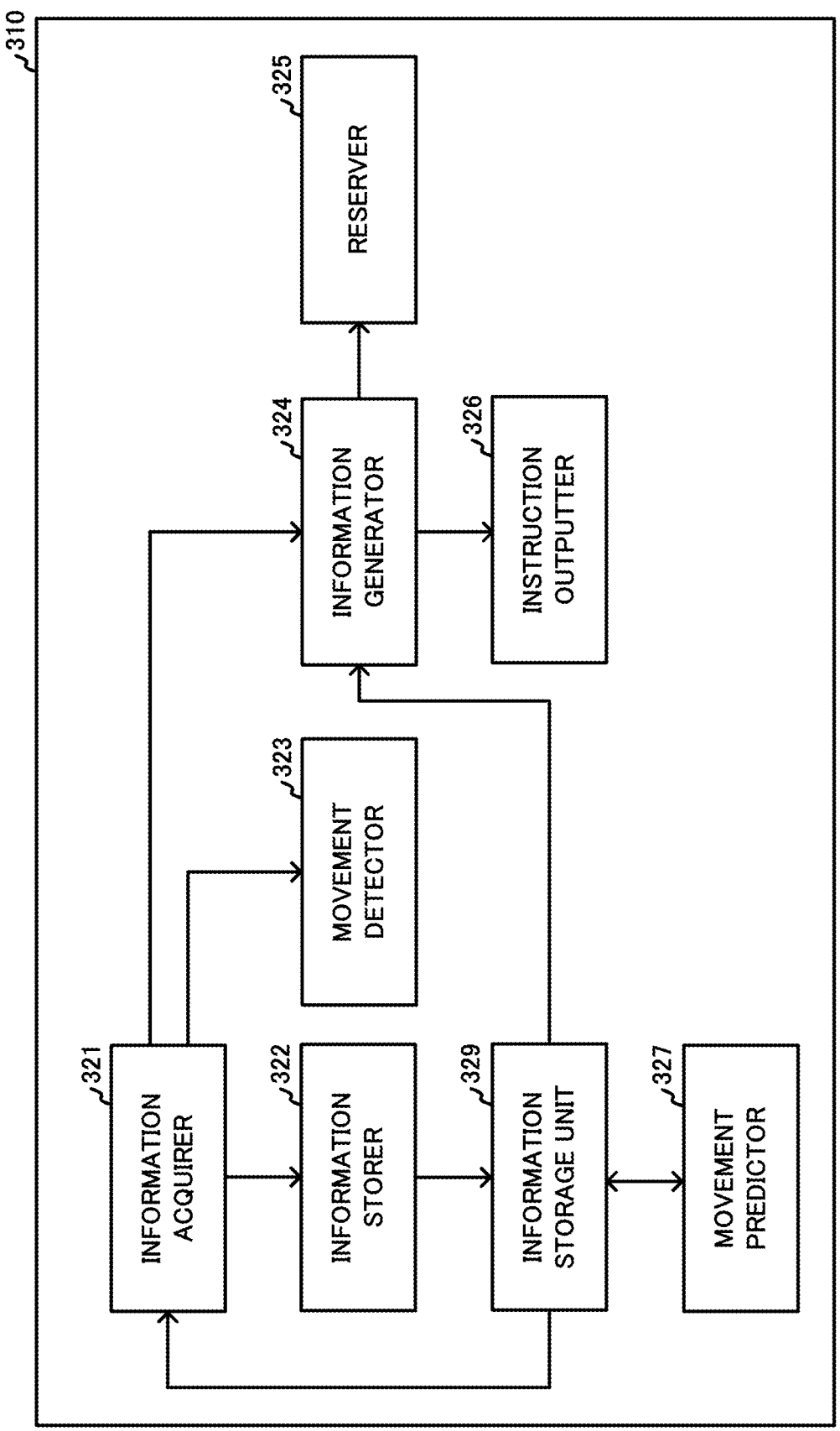
FIG. 37 is a functional block diagram illustrating an example of the functions of a delivery control server according to Embodiment 3.

The CPU 311 of the delivery control server 310 functions as a movement predictor 327 such as illustrated in FIG. 37 by executing non-illustrated movement prediction processing for predicting the movement of the user on a predetermined cycle such as once per week, for example. When the execution of the movement prediction processing starts, the information acquirer 321 illustrated in FIG. 9 acquires, for each user ID stored in the setting point table of FIG. 34, a plurality of information expressing the latitude and longitude stored in association with the user ID in the action history table of FIG. 35. Thereafter, the information acquirer 321 identifies, on the basis of the acquired plurality of information expressing the latitude and longitude, one or a plurality of movement routes from the checkpoint to the first geographical point, and acquires, as the predicted movement route, the movement route identified the most.

Next, the information acquirer 321 acquires, for each user ID, the information expressing the latitude and longitude of the checkpoint associated with that user ID, and acquires, from the action history table of FIG. 35, one or a plurality of pieces of information expressing the detection date and time of an exiting associated with the acquired information expressing the latitude and longitude of the checkpoint. Thereafter, the information acquirer 321 acquires, for each user ID, the most common detection time among the detection times expressed in the acquired one or plurality of pieces of information as the predicted time of the exiting (hereinafter referred to as "predicted exit time").

In the same manner, the information acquirer 321 acquires, for each user ID, a predicted time of the passing (hereinafter referred to as "predicted passing time") for the plurality of geographical points included in the predicted movement route and a predicted time of the entering at the first geographical point (hereinafter referred to as "predicted entry time").

Thereafter, the information storer 322 associates and stores, in the action prediction result table of FIG. 36, the user ID, the information expressing the latitude and longitude of the checkpoint specified by the user identified by that user ID, and the information expressing the predicted exit time of the user from the checkpoint. Likewise, for each of the plurality of geographical points included in the predicted movement route, the information storer 322 associates and stores, in the action prediction result table of FIG. 36, the user ID, the information expressing the latitude and longitude of the geographical point, and the information expressing the predicted passing time. Likewise, the information storer 322 associates and stores, in the action prediction result table of FIG. 36, the user ID, the information expressing the latitude and longitude of the first geographical point, and the information expressing the predicted entry time at the first geographical point. Thus, the information storer 322 associates and stores, in the action prediction result table of FIG. 36, the user ID and the information expressing the movement prediction result of the user identified by that user ID.

The CPU 101 of the mobile terminal 10 according to the present embodiment executes the receiving method specification app in the background at the time of start up, and reads the user ID from the flash memory 103b. Next, the CPU 101 acquires the information expressing the latitude and longitude of the mobile terminal 10 from the GPS circuit 106 illustrated in FIG. 2, generates a position notification including the acquired information expressing the latitude and longitude and the user ID, and outputs the generated position notification to the data communication circuit 104a with the delivery control server 310 as the destination. Then, the CPU 101 sleeps for a predetermined amount of time and, then, repeats the processing described above from the acquisition of the information expressing the latitude and longitude.

Figure 38:
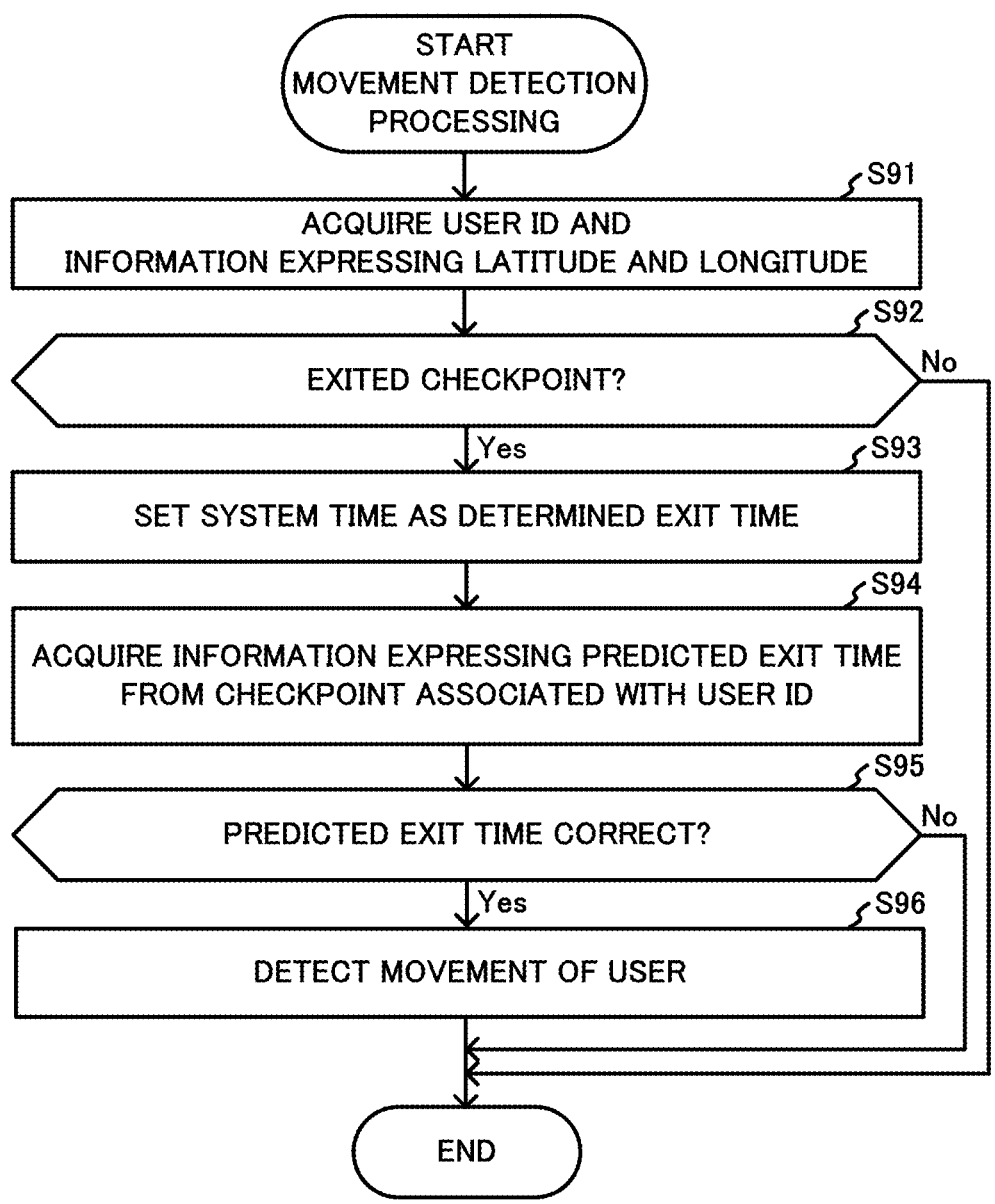
FIG. 38 is a flowchart illustrating movement detection processing executed by the delivery control server.

When the communication circuit 314 receives the position notification from the mobile terminal 10, the CPU 311 of the delivery control server 310 illustrated in FIG. 8 starts the execution of movement detection processing such as illustrated in FIG. 38. When the movement detection processing starts, the information acquirer 321 illustrated in FIG. 9 acquires the position notification from the communication circuit 314, and acquires, from the position notification, the user ID, and the information expressing the latitude and longitude of the mobile terminal 10 of the user identified by that user ID (step S91).

Thereafter, using the same method as described in Embodiment 2 for determining whether or not the user has entered the train station, the movement detector 323 determines whether or not the user using the mobile terminal 10 has exited the checkpoint (step S92). At this time, when the movement detector 323 determines that the user has not exited the checkpoint (step S92; No), the execution of the movement detection processing is ended without detecting movement of the user from the checkpoint to the first geographical point.

In contrast, when the movement detector 323 determines that the user has exited the checkpoint (step S92; Yes), the movement detector 323 acquires the system time managed by the OS, and sets the acquired time as the time at which the exiting of the checkpoint is determined (hereinafter referred to as "determined exit time") (step S93). Next, the movement detector 323 acquires, from the setting point table illustrated in FIG. 34, the information expressing the latitude and longitude of the checkpoint associated with the user ID. Thereafter, the movement detector 323 acquires, from the action prediction result table of FIG. 36, information expressing the predicted exit time from the checkpoint associated with the user ID and the acquired information expressing the latitude and longitude (step S94). This is to identify the time that the user is predicted to depart from the checkpoint of the user, which is the office at which the user is employed.

Thereafter, the movement detector 323 determines, on the basis of a difference between the determined exit time and the predicted exit time from the checkpoint, whether or not the predicted exit time is correct (step S95). At this time, when the difference is greater than a predetermined threshold and, as such, the movement detector 323 determines that the predicted exit time is incorrect (step S95; No), the movement detector 323 determines that the movement prediction result is incorrect and ends the execution of the movement detection processing without detecting the movement of the user.

In contrast, when the difference is less than or equal to the predetermined threshold and, as such, the movement detector 323 determines that the predicted exit time is correct (step S95; Yes), the movement detector 323 determines that the movement prediction result is correct, detects the movement of the user (step S96) and, then, ends the execution of the movement detection processing.

When the movement of the user is detected, the CPU 311 of the delivery control server 310 executes the processing of steps S04 to S06 of FIG. 13. As a result, when there is a package for which the receiving method is not specified by the user for which movement is detected by the movement prediction, an unspecified notification is sent to the mobile terminal 10 of the user.

The mobile terminal 10 that receives the unspecified notification performs a display for notifying that there is a package for which the receiving method is not specified. Upon viewing the display, the user operates the touch panel 105 of the mobile terminal 10 and performs an operation for executing the receiving method specification app in the foreground. Without executing the movement information acquisition processing of FIG. 15, the CPU 101 of the mobile terminal 10 outputs, to the data communication circuit 104a with the delivery control server 310 as the destination and on the basis of the signal output from the touch panel 105, a request that includes the user ID and requests the sending of the receiving method information. This is so that the delivery control server 310 can acquire the movement information by the movement prediction.

When the communication circuit 314 of the delivery control server 310 receives the request, the CPU 311 of the delivery control server 310 executes the receiving method information generation processing illustrated in FIG. 18. When the execution of the receiving method information generation processing starts, the information acquirer 321 acquires the user ID included in the request, and acquires, from the setting point table illustrated in FIG. 34, the information expressing the latitude and longitude of the first geographical point that is associated with the acquired user ID. Next, the information acquirer 321 acquires, from the action prediction result table illustrated in FIG. 36, the information expressing the predicted entry time that is associated with the acquired user ID and the information expressing the latitude and longitude of the first geographical point. This is to identify the time when the user is predicted to arrive at the first geographical point where the train station closest to the home of the user is located.

Next, the information acquirer 321 acquires the movement information by setting the predicted entry time at the first geographical point as the expected arrival time at the first geographical point (step S21). Thereafter, steps S22 to S29 are executed, thereby determining, as the receiving location, the installation location of the locker device 228 or 229 of the train station B located at the first geographical point, determining the receiving time on the basis of the predicted entry time at the first geographical point and, then, ending the execution of the receiving method information generation processing.

According to these configurations, the delivery control server 310 predicts the movement of the user from the checkpoint to the first geographical point on the basis of the action history of the user, and detects the movement of the user from the checkpoint to the first geographical point on the basis of the information expressing the latitude and longitude acquired from the mobile terminal 10 and the information expressing the movement prediction result. Thus, the movement of the user can be more accurately detected.

Additionally, according to these configurations, the delivery control server 310 sets, as the expected arrival time, the arrival time at the first geographical point, which is predicted on the basis of the action history of the user. As such, an accurate expected arrival time can be acquired even when the user moves using movement means for which the expected arrival time at the first geographical point is not predetermined, such as walking, a taxi, a private vehicle, a company vehicle, or a motorcycle.

In the present embodiment, it is described that the checkpoint is the office where the user works, and the delivery control server 310 determines, on the basis of the information expressing the latitude and longitude acquired from the mobile terminal 10, whether or not the user has exited the checkpoint. Additionally, it is described that the delivery control server 310 determines whether or not the movement prediction result is correct on the basis of the difference between the time at which the user is determined to have exited the checkpoint and the time at which the user is predicted to exit the checkpoint, and that the movement of the user is detected when it is determined that the movement prediction result is correct. However, the present embodiment is not limited thereto, and the checkpoint may be any location included in the action history of the user. Preferably, the checkpoint is a location that is frequently included in the action history of the user. For example, the checkpoint may be the closest train station or a transfer train station to the office at which the user works, a school that the user attends, or the closest train station or a transfer train station to that school. Additionally, for example, the checkpoint may be a restaurant, a bar, or a fitness club that the user frequently visits before going home. Moreover, the delivery control server 310 may determine, on the basis of the information expressing the latitude and longitude acquired from the mobile terminal 10, whether or not the user has entered the checkpoint or whether or not the user has passed the checkpoint. Additionally, the delivery control server 310 may determine whether or not the movement prediction result is correct on the basis of the difference between the time at which the user enters the checkpoint or passes the checkpoint and the predicted entry time or passing time of the checkpoint.

In the present embodiment, it is described that the delivery control server 310 determines that the predicted exit time is correct when the difference between the determined exit time and the predicted exit time from the checkpoint is less than or equal to a predetermined threshold and, when it is determined that the predicted exit time is correct, it is determined that the movement prediction result is correct. However, the present embodiment is not limited thereto and, when m is less than a total number M of geographical points included in the predicted movement route, in cases in which all of m differences between each time at which it is determined that the user passes m geographical points and each predicted passing time of the m geographical points is less than or equal to a predetermined threshold, the delivery control server 310 may determine that m predicted passing times are correct. In this case, the delivery control server 310 may determine that the movement prediction result is correct when it is determined that the m predicted passing times are correct.

Modified Example 1 of Embodiment 3

It is described that the delivery control server 310 according to Embodiment 3 performs movement prediction of the user on the basis of the action history of the user, and compares the movement prediction result with the latitude and longitude of the mobile terminal 10 used by the user to detect the movement of the user. However, Embodiment 3 is not limited thereto, and the mobile terminal 10 may perform movement prediction of the user on the basis of the action history of the user. Additionally, the mobile terminal 10 may detect the movement of the user by comparing the movement prediction result with the latitude and longitude expressed in information output from the GPS circuit 106.

Modified Example 2 of Embodiment 3

In Embodiment 3, it is described that the delivery control server 310 determines, as the receiving location, the installation location of the locker device 228 or 229 of the train station B located at the first geographical point, and determines the receiving time on the basis of the arrival time at the first geographical point predicted on the basis of the action history. However, Embodiment 3 is not limited thereto. The locker devices 228 and 229 according to the present modified example are installed at a second geographical point that is positioned on the predicted movement route or in the vicinity of the predicted movement route of the user. The delivery control server 310 according to the present modified example sets, as the receiving location, the installation location of the locker devices 228 and 229, and determines the receiving time on the basis of an arrival time, predicted on the basis of the movement history at a geographical point on the predicted movement route that is the same as or is closest to the second geographical point (hereinafter referred to as "closest geographical point").

As such, the information storage unit 329 illustrated in FIG. 9 stores a non-illustrated installation location table in which the locker ID of the locker device 228 or 229 and the information expressing the latitude and longitude of the locker device 228 or 229 are associated and stored.

Figure 39:
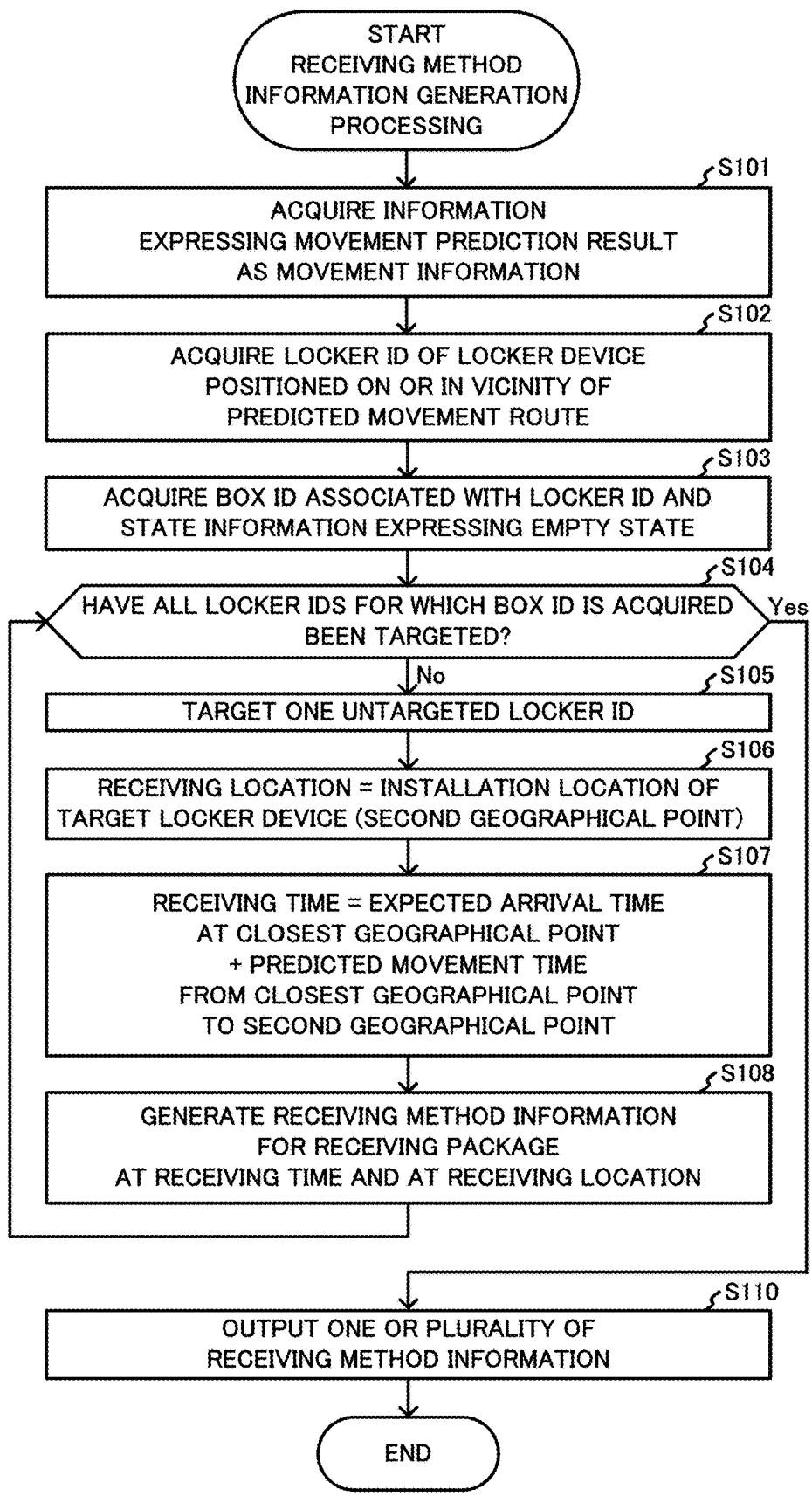
FIG. 39 is a flowchart illustrating receiving method information generation processing executed by the delivery control server according to Modified Example 2 of Embodiment 3.

The CPU 311 of the delivery control server 310 uses the non-illustrated installation location table to execute receiving method information generation processing such as illustrated in FIG. 39. When the execution of the receiving method information generation processing starts, the information acquirer 321 of the delivery control server 310 acquires, as the movement information and from the action prediction result table of FIG. 36, the information expressing the movement prediction result associated with the user ID (step S101).

Next, the information acquirer 321 acquires, from the information expressing the movement prediction result, information expressing the latitude and longitude of a plurality of geographical points on the predicted movement route. Thereafter, the information acquirer 321 identifies the closest geographical point for each of the locker devices 228 and 229 on the basis of the information expressing the latitude and longitude of the locker devices 228 and 229 stored in the non-illustrated installation location table and the information expressing the latitude and longitude of the plurality of geographical points on the predicted movement route. Next, the information acquirer 321 calculates a distance to the closest geographical point for each of the locker devices 228 and 229 and, when the calculated distance is shorter than a distance predetermined by the user, determines that the locker device 228 or 229 is positioned on the predicted movement route or in the vicinity of the predicted movement route. Thereafter, the information acquirer 321 acquires the locker ID of the locker device 228 or 229 determined to be positioned on the predicted movement route or in the vicinity of the predicted movement route (step S102).

Thereafter, the same processing as steps S23 to S25 of FIG. 18 is executed (steps S103 to S105). Thereafter, the information generator 324 sets, as the receiving location, the geographical point (that is, the second geographical point) where the target locker device 228 or 229, determined to be positioned on the predicted movement route or in the vicinity of the predicted movement route, is located (step S106).

Next, the information acquirer 321 acquires, from the information expressing the movement prediction result, the information expressing the latitude and longitude of the closest geographical point, and the information expressing the predicted passing time of the closest geographical point. Additionally, the information acquirer 321 acquires information expressing the latitude and longitude of a passing geographical point on the predicted movement route that the user is predicted to pass next after the closest geographical point, and information expressing the predicted passing time at that passing geographical point. Thereafter, the information acquirer 321 calculates a predicted movement speed on the basis of the information expressing the latitude and longitude of the closest geographical point and the information expressing the predicted passing time of the closest geographical point, and the information expressing the latitude and longitude of the next passing geographical point after the closest geographical point and the information expressing the predicted passing time of the next passing geographical point after the closest geographical point. Thereafter, the information acquirer 321 calculates a predicted movement time from the closest geographical point to the second geographical point (hereinafter referred to as "predicted movement time") on the basis of the distance between the closest geographical point and the second geographical point calculated in step S102 and the predicted movement speed.

Next, the information acquirer 321 sets the predicted passing time of the closest geographical point as the expected arrival time at the closest geographical point. Thereafter, the information acquirer 321 sets, as the receiving time, a time obtained by adding the predicted movement time from the closest geographical point to the second geographical point that is the receiving location to the expected arrival time at the closest geographical point (step S107). Thereafter, steps S108 and S109 that are the same as steps S28 and S29 of FIG. 18 are executed to send one or a plurality of receiving method information to the mobile terminal 10 and, then, the execution of the receiving method information generation processing is ended.

Thereafter, as in Embodiment 1, when the receiving method is approved after the mobile terminal 10 receives the one or plurality of receiving method information, the unmanned aircraft 390 is controlled so as to deliver the package to the second geographical point, which is the receiving location, that is on or in the vicinity of the predicted movement route. Note that, the unmanned ground vehicle 380 may be controlled so as to deliver the package to the second geographical point.

According to these configurations, the delivery control server 310 sets, as the receiving location, the installation location of the locker device 228 or 229 that is positioned on or in the vicinity of the movement route predicted on the basis of the movement history of the user. As such, provided that the receiving location is the installation location of the locker device 228 or 229 positioned on or in the vicinity of a daily movement route of the user, any location can be determined as the receiving location. Therefore, the degree of freedom of the receiving location can be improved. Additionally, the delivery control server 310 determines the receiving time on the basis of the arrival time that is predicted on the basis of the action history of the user at the geographical point, on the predicted movement route, closest to the second geographical point. As such, it is possible to determine, as the receiving time, a time that is better suited to the individual circumstances of the user such as driving at a speed faster than a typical driver or walking slower than a typical pedestrian.

Modified Example 3 of Embodiment 3

In Modified Example 2 of Embodiment 3, it is described that the delivery control server 310 sets a location at which the locker device 228 or 229 is installed as the receiving location, and performs control that causes the unmanned aircraft 390 to deliver the package to the receiving location. However, Modified Example 2 of Embodiment 3 is not limited thereto. For example, the delivery control server 310 may set, as the receiving location, a location where an unmanned vehicle such as an unmanned ground vehicle 380 such as illustrated in FIG. 28 or a non-illustrated unmanned ship can stop or berth, and perform control that causes the unmanned ground vehicle 380 or the unmanned ship to deliver the package to the receiving location.

Embodiment 4

In Embodiment 1, it is described that, in step S53 of FIG. 21, the delivery control server 310 outputs a reservation request requesting the reservation of a storage box 810 of the locker device 228 illustrated in FIG. 5. However, the present disclosure is not limited thereto. The delivery control server 310 according to the present embodiment differs from the delivery control server 310 according to Embodiment 1 in that the delivery control server 310 according to the present embodiment does not perform step S53.

Additionally, the locker device 228 according to the present embodiment determines whether or not there is a storage box 810 in the empty state when the unmanned aircraft 390, in which the package is stored, arrives. The locker device 228 according to the present embodiment differs from the locker device 228 according to Embodiment 1 in that, when the locker device 228 according to the present embodiment determines that there is not a storage box 810 in the empty state, a package selected on the basis of priority, from among the plurality of packages stored in each of the plurality of storage boxes 810, is exchanged with the package delivered by the unmanned aircraft 390. In the following, the configurations that are the same as those in Embodiment 1 are marked with the same reference numerals used in Embodiment 1, and the description focuses on the differences between the present embodiment and Embodiment 1.

A use state table such as illustrated in FIG. 40 is stored in the information storage unit 329 of the delivery control server 310 according to the present embodiment. The locker ID, the box ID, the state information, the package ID, and the card ID stored in the use state table according to Embodiment 1 and, also, information expressing a priority given to the package identified by the package ID are associated and stored in the use state table according to the present embodiment.

A user table such as illustrated in FIG. 41 is stored in the information storage unit 329 according to the present embodiment. The user ID and the card ID stored in the user table according to Embodiment 1 and, also, information expressing the latitude and longitude of the mobile terminal 10 used by the user identified by the user ID are associated and stored in the user table according to the present embodiment.

The mobile terminal 10 according to the present embodiment sends, on a predetermined cycle, the user ID and information expressing the latitude and longitude output from the GPS circuit 106. Each time the communication circuit 314 illustrated in FIG. 8 receives the user ID and the information expressing the latitude and longitude, the information acquirer 321 of the delivery control server 310 illustrated in FIG. 9 acquires the user ID and the information expressing the latitude and longitude, and the information storer 322 updates the information expressing the latitude and longitude associated with the acquired user ID in the user table of FIG. 41 with the acquired information expressing the latitude and longitude.

The information storage unit 329 according to the present embodiment stores a package in delivery table such as illustrated in FIG. 42 in which information about packages being delivered by the unmanned aircraft 390 is stored. The package ID of the package in delivery, the locker ID of the locker device 228 or 229 located at the receiving location of the package, the card ID of the IC card 11 that the user uses to remove the package, and the information expressing the priority given to the package are associated and stored in the package in delivery table.

In step S57 of FIG. 21, after a display prompting for the package to be loaded onto the unmanned aircraft 390 is performed (step S57), the information storer 322 of the delivery control server 310 according to the present embodiment executes a processing step for storing, in the package in delivery table of FIG. 42, information related to the package loaded onto the unmanned aircraft 390 and, then, ends the execution of the delivery control processing. In the processing step, the information storer 322 stores, in the package in delivery table of FIG. 42, the package ID of the package loaded onto the unmanned aircraft 390, the locker ID of the locker device 228 or 229 located at the receiving location of the package, the card ID of the IC card 11 that the user uses to remove the package, and information expressing an initial value of the priority given to the package.

In the following, for ease of description, a case in which the unmanned aircraft 390 arrives at the locker device 228 is described. When the execution of the flight control processing illustrated in FIG. 24 starts, the unmanned aircraft 390 executes steps S61 to S66, thereby arriving at the locker device 228, and sends, to the delivery control server 310, an arrival notification that includes the package ID identifying the package in delivery (steps S61 to S66).

Thereafter, when the unmanned aircraft 390 receives, from the delivery control server 310, an instruction for storing the package loaded on the unmanned aircraft 390 in the locker device 228 (hereinafter referred to as "store instruction"), the unmanned aircraft 390 releases the package loaded onto the unmanned aircraft 390 on the package stand 821 of the locker device 228 illustrated in FIG. 5 (step S67). Next, when the unmanned aircraft 390 receives a return instruction from the delivery control server 310, step S68 is executed, the unmanned aircraft 390 returns to the office (step S68) and, then, the execution of the flight control processing is ended.

In contrast, when the unmanned aircraft 390 receives, from the delivery control server 310, an instruction for exchanging the package stored in the locker device 228 with the package loaded on the unmanned aircraft 390 (hereinafter referred to as "exchange instruction"), the unmanned aircraft 390 releases the package loaded onto the unmanned aircraft 390 on the package stand 821 of the locker device 228 illustrated in FIG. 5 (step S67). Next, the locker device 228 removes a package which has lower priority from a storage box 810 and places that package on the package stand 822. Then, the unmanned aircraft 390 loads that package. Thereafter, when the unmanned aircraft 390 receives a return instruction from the delivery control server 310, step S68 is executed, the unmanned aircraft 390 returns to the office (step S68) and, then, the execution of the flight control processing is ended.

Figure 43:
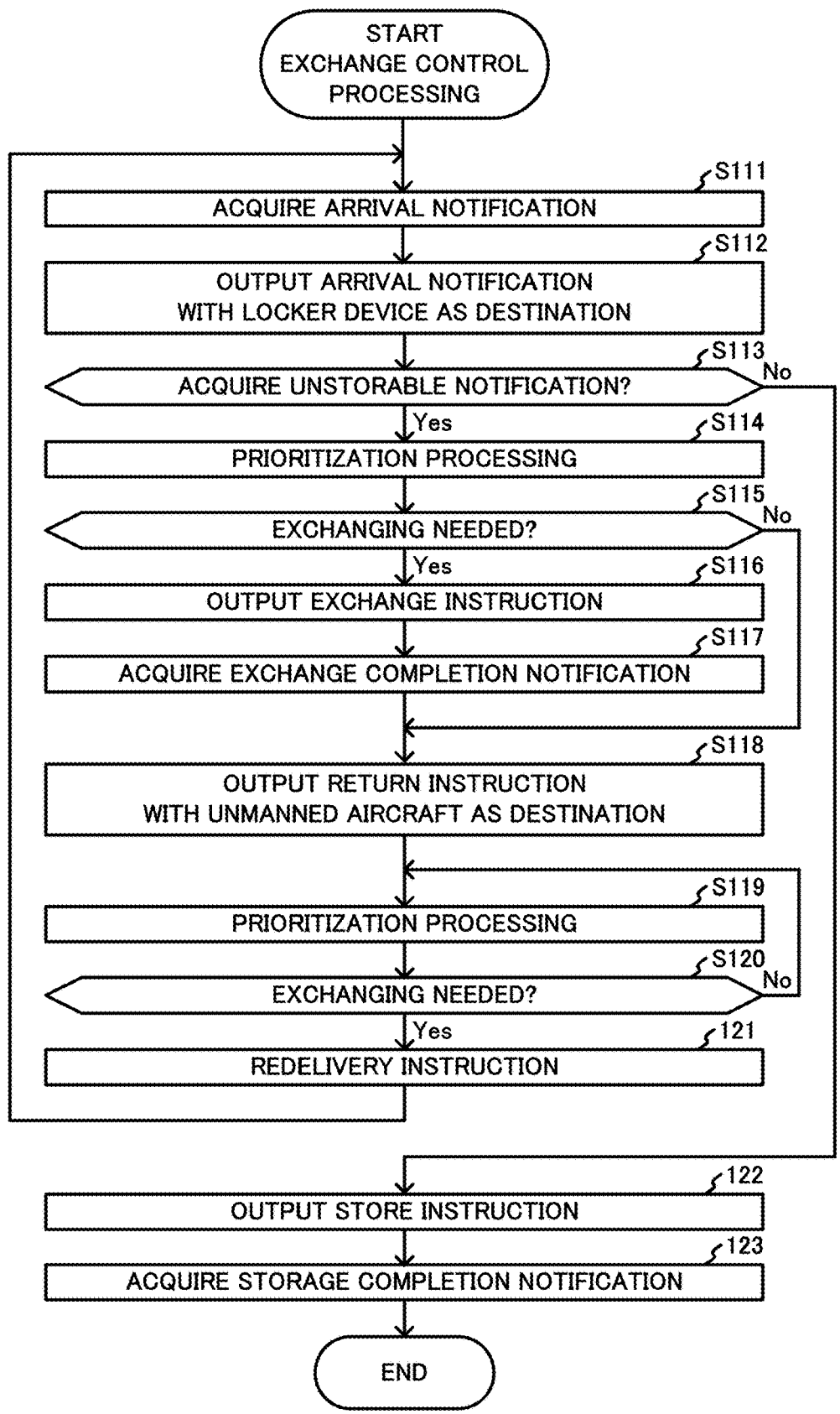
FIG. 43 is a flowchart illustrating exchange control processing executed by the delivery control server.
Figure 44:
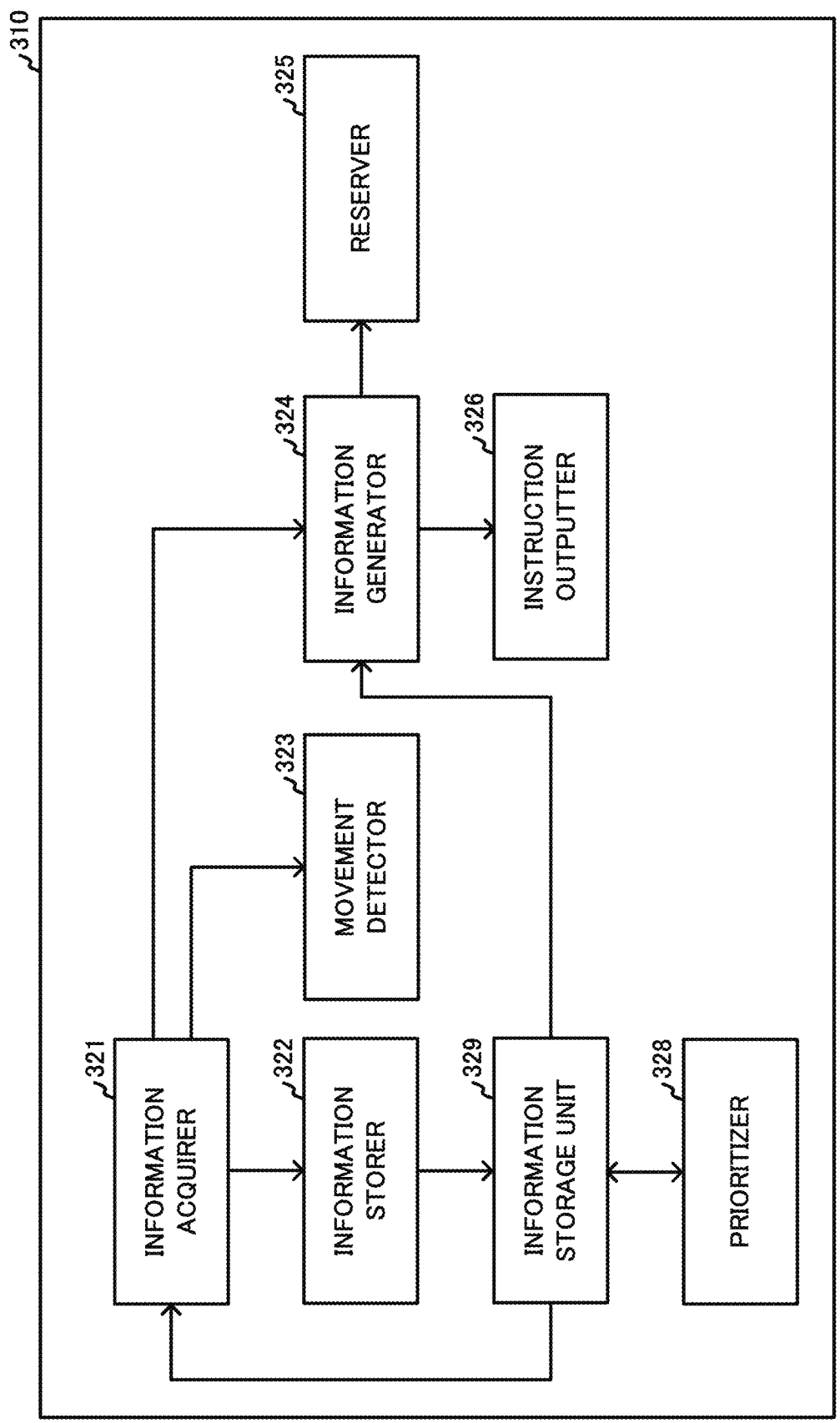
FIG. 44 is a functional block diagram illustrating an example of the functions of the delivery control server according to Embodiment 4.

When the communication circuit 314 of the delivery control server 310 receives the arrival notification from the unmanned aircraft 390, the CPU 311 of the delivery control server 310 executes, on the basis of the priority of the package delivered by the unmanned aircraft 390, exchange control processing such as illustrated in FIG. 43 for controlling the exchanging the package stored in the locker device 228 or 229 installed at the receiving location. Thus, the CPU 311 functions as a prioritizer 328 such as illustrated in FIG. 44 that assigns priority to packages.

When the execution of the exchange control processing starts, the information acquirer 321 of the delivery control server 310 acquires the arrival notification from the communication circuit 314 (step S111) and outputs the arrival notification to the communication circuit 314 with the locker device 228 as the destination to transfer the arrival notification (step S112).

Thereafter, when the data communication circuit 834a of the locker device 228 illustrated in FIG. 6 receives the arrival notification, the CPU 831 of the locker device 228 acquires, from the box management table illustrated in FIG. 7, a box ID associated with the state information expressing the empty state. At this time, when the CPU 831 of the locker device 228 determines that a box ID can be acquired, there is a storage box 810 in the empty state and, as such, the CPU 831 of the locker device 228 outputs, to the data communication circuit 834a with the delivery control server 310 as the destination, a storable notification notifying that the package can be stored. In contrast, when the CPU 831 of the locker device 228 determines that a box ID cannot be acquired, there are no storage boxes 810 in the empty state and, as such, the CPU 831 of the locker device 228 outputs, to the data communication circuit 834a with the delivery control server 310 as the destination, an unstorable notification notifying that the package cannot be stored.

After executing step S112, when the communication circuit 314 of the delivery control server 310 receives the notification, the information acquirer 321 acquires the notification from the communication circuit 314 and determines whether or not the acquired notification is an unstorable notification (step S113). At this time, when the information acquirer 321 determines that the acquired notification is an unstorable notification (step S113; Yes), the prioritizer 328 performs prioritization processing for assigning a priority to the package to be delivered by the unmanned aircraft 390 and the plurality of packages stored in the locker device 228 located at the receiving location of the package (step S114).

When the execution of the prioritization processing starts, the information acquirer 321 acquires, from the package in delivery table illustrated in FIG. 42, the locker ID and the card ID associated with the package ID included in the arrival notification. Next, the information acquirer 321 acquires, from the user table illustrated in FIG. 41, the information expressing the latitude and longitude associated with the acquired card ID. This is to identify the position of the mobile terminal 10 carried by the user that is to receive the package to be delivered by the unmanned aircraft 390. Thereafter, the information acquirer 321 acquires, from the installation location table illustrated in FIG. 17, the information expressing the latitude and longitude associated with the acquired locker ID. This is to identify the position of the locker device 228 located at the receiving location of the package to be delivered by the unmanned aircraft 390.

Thereafter, the prioritizer 328 calculates, on the basis of the information expressing the latitude and longitude of the mobile terminal 10 of the user that is to receive the package and the information expressing the latitude and longitude of the locker device 228 located at the receiving location of the package, the distance from the mobile terminal 10 of the user that is to receive the package to be delivered by the unmanned aircraft 390 to the locker device 228.

Next, the information acquirer 321 acquires, from the use state table illustrated in FIG. 40, a plurality of combinations of card IDs and package IDs associated with the acquired locker ID. Thereafter, for each of the acquired plurality of combinations, the information acquirer 321 acquires, from the user table illustrated in FIG. 41, the information expressing the latitude and longitude associated with the card ID included in that combination. This is to identify, for each of the plurality of packages already stored in the locker device 228, the position of the mobile terminal 10 of the user that is to receive that package. Next, for each of the plurality of packages already stored in the locker device 228, the prioritizer 328 calculates, on the basis of the plurality of acquired information expressing the latitude and longitude, the distance from the mobile terminal 10 of the user that is to receive the package to the locker device 228.

Next, for the package stored in the unmanned aircraft 390 and each of the plurality of packages already stored in the locker device 228, the prioritizer 328 assigns a priority that increases as the distance from the user that is to receive that package to the locker device 228 decreases. This is because there is a high possibility that users located at positions closer to the locker device 228 will come to receive packages sooner than users at positions farther from the locker device 228.

Thereafter, in the package in delivery table illustrated in FIG. 42, the information storer 322 updates the information expressing the priority associated with the package ID of the package loaded on the unmanned aircraft 390 with the information expressing the priority assigned to that package. Additionally, in the use state table illustrated in FIG. 40, the information storer 322 updates the information expressing the priority associated with the locker ID of the locker device 228 at which the unmanned aircraft 390 has arrived and the package IDs of the packages already stored in the locker device 228 with the information expressing the priority assigned to each package. Thereafter, the prioritizer 328 ends the execution of the prioritization processing.

After executing step S114, the prioritizer 328 determines, on the basis of whether or not the priority assigned to the package loaded on the unmanned aircraft 390 is greater than one of the priorities assigned to each of the plurality of packages already stored in the locker device 228, whether or not exchanging of the packages is needed (step S115). At this time, when the prioritizer 328 determines that the priority assigned to the package loaded on the unmanned aircraft 390 is greater than one of the priorities assigned to each of the plurality of packages already stored in the locker device 228, the prioritizer 328 determines that exchanging of the packages is needed (step S115; Yes).

Next, the information acquirer 321 acquires, from the use state table of FIG. 40, the box ID stored in association with the locker ID of the locker device 228 at which the unmanned aircraft 390 has arrived and information expressing the lowest priority. Thereafter, the instruction outputter 326 outputs, to the data communication circuit 834a with the unmanned aircraft 390 and the locker device 228 at which the unmanned aircraft 390 has arrived as destinations, an exchange instruction that includes the acquired box ID and that causes the package stored in the storage box 810 identified by the box ID to be exchanged with the package loaded on the unmanned aircraft 390 (step S116).

When the data communication circuit 834a of the locker device 228 illustrated in FIG. 6 receives the exchange instruction, the CPU 831 of the locker device 228 outputs, to the drive circuit 839, an open signal and the box ID included in the exchange instruction. As a result, the door 811 of the storage box 810, in which the package to which the lowest priority is assigned is stored, is unlocked and opened. Next, the CPU 831 outputs, via the input/output port 838 and to the robot arm 823 illustrated in FIG. 5, a control signal for removing the package stored in the storage box 810 and temporarily placing the removed package on the package stand 822 installed on the top surface of the locker device 228. This is because the package placed on the package stand 822 is to be taken thereafter to the office by the unmanned aircraft 390. Next, the CPU 831 outputs, to the robot arm 823, a control signal for picking up the package that the unmanned aircraft 390 placed on the package stand 821, and storing that package in the storage box 810 that has been emptied. Thereafter, the CPU 831 outputs the box ID and a close signal to the drive circuit 839 to close and lock the door 811.

Thereafter, the CPU 831 outputs an exchange completion notification to the data communication circuit 834a with the delivery control server 310 as the destination. Thus, the exchanging of a package having a lower priority stored in the locker device 228 with the package having a higher priority loaded on the unmanned aircraft 390 is completed.

After step S116, when the data communication circuit 834a of the delivery control server 310 receives the exchange completion notification (step S117), the information storer 322 deletes, from the package in delivery table illustrated in FIG. 42, the record in which the package ID of the package, that is stored from the unmanned aircraft 390 into the locker device 228, is stored. This is because the delivery of the package has been completed. Next, the information acquirer 321 acquires, from the use state table of FIG. 40, information expressing the locker ID, the card ID, and the priority associated with the package ID of the package removed from the locker device 228 and loaded on the unmanned aircraft 390. Thereafter, the information storer 322 associates and stores the package ID and the acquired information expressing the locker ID, the card ID, and the priority in the package in delivery table of FIG. 42. This is because the delivery of the package is restarted due to the package being moved from the locker device 228 to the unmanned aircraft 390.

When it is determined in step S115 that exchanging is not needed (step S115; No), or after the execution of step S117, the instruction outputter 326 outputs, to the communication circuit 314 with the unmanned aircraft 390 as the destination, a return instruction that causes the unmanned aircraft 390 to return to the office. Note that, the instruction outputter 326 may output an instruction that causes the unmanned aircraft 390 to land at the receiving location or in the vicinity of the receiving location or an instruction that causes the unmanned aircraft 390 to hover, circle, or fly back and forth above the receiving location or in the vicinity of the receiving location and wait.

After the execution of step S118, the prioritizer 328 performs the prioritization processing again (step S119) and determines again whether or not exchanging is needed (step S120). This is because the priority assigned to the package changes when the position of the user changes due to the passage of time.

Here, when the prioritizer 328 determines that the exchanging is not needed (step S120; No), the steps described above are repeated from step S119. In contrast, when the user that will receive the package that is removed from the locker device 228 and loaded onto the unmanned aircraft 390 due to having the lowest priority approaches the locker device 228, the priority of that package rises. At this time, when the prioritizer 328 determines that the exchanging is needed (step S120; Yes), the instruction outputter 326 outputs an instruction to the unmanned aircraft 390 that causes the unmanned aircraft 390 to redeliver the package to the locker device 228 (step S121). Thereafter, when the unmanned aircraft 390 arrives again at the locker device 228, the steps described above are repeated from step S111.

In step S113, when it is determined that the storable notification is acquired (step S113; No), a store instruction that causes the package loaded on the unmanned aircraft 390 to be stored in the locker device 228 is output to the data communication circuit 834a with the unmanned aircraft 390 and the locker device 228 as destinations (step S122). Thereafter, a storage completion notification notifying that the storing of the package, delivered by the unmanned aircraft 390, in the locker device 228 is complete is received (step S123) and, then, the execution of the exchange control processing is ended.

According to these configurations, when it is determined that there are no storage boxes 810 in the empty state, the locker device 228 exchanges a package, among the plurality of packages respectively stored in the plurality of storage boxes 810, that has a lower priority than the package delivered by the unmanned aircraft 390 with the package delivered by the unmanned aircraft 390. Due to these configurations, the locker device 228 can further improve the storage efficiency of packages that have high priorities.

According to these configurations, the delivery control server 310 assigns a higher priority to a package for which the distance from the position of the mobile terminal 10 of the user that receives the package to the receiving location is shorter. Typically, there is a high possibility that users located at positions closer to the locker device 228 will come to receive packages sooner than users at positions farther from the locker device 228. As a result, increases in the possibility of the package not being able to be received when the user arrives at the receiving location can be suppressed, even when a package already delivered to the locker device 228 is removed from the locker device 228.

In the present embodiment, it is described that the delivery control server 310 instructs the exchanging of one package that has a higher priority and is stored in the unmanned aircraft 390 with one package that has a lower priority and is stored in the locker device 228. However, the present embodiment is not limited thereto. The delivery control server 310 may instruct the exchanging of a plurality of packages with a plurality of packages.

In the present embodiment, it is described that the delivery control server 310 instructs the exchanging of a package that is loaded on the unmanned aircraft 390 with a package that has the lowest priority and is stored in the locker device 228. However, the present embodiment is not limited thereto. The delivery control server 310 may select, from the plurality of packages stored in the locker device 228, one package from a plurality of packages that have been assigned priorities lower than the priority of the package stored in the unmanned aircraft 390, and instruct the exchanging of the selected package with the package stored in the unmanned aircraft 390.

In the present embodiment, it is described that the locker device 228 includes one robot arm 823, and that the packages are exchanged by using the one robot arm 823 to place the package that is stored in the storage box 810 of the locker device 228 on the package stand 822, and store the package that is placed on the package stand 821 by the unmanned aircraft 390 in the storage box 810. However, the present embodiment is not limited thereto.

As with the unmanned aircraft 390 according to Modified Example 2 of Embodiment 1, in cases in which the unmanned aircraft 390 includes the storage box 950 illustrated in FIG. 25, the locker device 228 may include a first robot arm and a second robot arm that have the same configurations and functions as the configurations and functions of the robot arm 823. In such a case, the locker device 228 may use the first robot arm to remove the package stored in the storage box 950 of the unmanned aircraft 390, and the second robot arm to remove the package stored in the storage box 810 of the locker device 228. Thereafter, the locker device 228 may use the first robot arm to store the package removed from the unmanned aircraft 390 in the storage box 810 of the locker device 228, and the second robot arm to store the package removed from the locker device 228 in the storage box 950 of the unmanned aircraft 390.

Modified Example of Embodiment 4

In Embodiment 4, it is described that the delivery control server 310 assigns a higher priority to a package for which the distance from the position of the mobile terminal 10 of the user that receives the package to the receiving location is shorter. However, Embodiment 4 is not limited thereto. In the present modified example, the locker device 228 gives a higher priority to a package for which an amount of storage time is shorter. This is because the possibility that the user has forgotten to receive the package increases as the amount of storage time of the package increases.

A box management table such as illustrated in FIG. 45 is stored in in the flash memory 833*b* of the locker device 228 according to the present modified example. The box ID, the state information, the package ID, and the card ID stored in the box management table according to Embodiment 1 and, also, a time at which the package identified by the package ID is stored (hereinafter referred to as "store time"), and information expressing the priority assigned to the package identified by the package ID are associated and stored in the box management table according to the present embodiment.

The CPU 831 of the locker device 228 illustrated in FIG. 6 executes, on a predetermined cycle, non-illustrated prioritization processing for assigning priority to the packages. When the execution of the prioritization processing starts, the CPU 831 acquires the system time from the OS and, then, acquires, from the box management table illustrated in FIG. 45, a plurality of combinations of the package ID and the information expressing the store time. Next, the CPU 831 calculates the amount of storage time from the store time to the system time for each of the acquired plurality of combinations. Thereafter, for each of the acquired plurality of combinations, the CPU 831 assigns a priority to the package identified by the package ID. In this case, the priority rises as the amount of storage time shortens. Thereafter, for each of the plurality of combinations, in the box management table of FIG. 45, the CPU 831 updates the information expressing the priority associated with the package ID included in the combination with the information expressing the priority assigned to the package identified by that package ID and, then, ends the execution of the prioritization processing.

When the arrival notification sent from the unmanned aircraft 390 in step S66 of FIG. 24 is received, the delivery control server 310 acquires, from the to-be-delivered package table illustrated in FIG. 12, the user ID associated with the package ID included in the arrival notification, and acquires, from the user table of FIG. 10, the card ID associated with the acquired user ID. This is to identify the card ID as the electronic key that will be used to receive the package delivered by the unmanned aircraft 390. Thereafter, the delivery control server 310 appends the card ID to the arrival notification, and forwards the arrival notification to the locker device 228.

When the data communication circuit 834*a* of the locker device 228 illustrated in FIG. 6 receives the arrival notification, the CPU 831 of the locker device 228 acquires, from the box management table illustrated in FIG. 45, a box ID associated with the state information expressing the empty state.

At this time, when the locker device 228 determines that a box ID associated with state information expressing the empty state can be acquired, the locker device 228 sends a storable notification to the delivery control server 310, as described in Embodiment 4. When the delivery control server 310 receives the storable notification, the delivery control server 310 sends a store instruction to the unmanned aircraft 390. When the unmanned aircraft 390 receives the store instruction, the unmanned aircraft 390 releases the package on the package stand 821 of the locker device 228. Additionally, the locker device 228 uses the robot arm 823 illustrated in FIG. 5 to store the package, placed on the package stand 821 by the unmanned aircraft 390, in the empty storage box 810 identified by the acquired box ID.

In contrast, when the CPU 831 of the locker device 228 determines that a box ID associated with state information expressing the empty state cannot be acquired, the CPU 831 acquires, from the plurality of information expressing priority stored in the box management table illustrated in FIG. 45, the package ID and the box ID associated with the information expressing the lowest priority.

Thereafter, the CPU 831 outputs the acquired box ID and an open signal to the drive circuit 839 to unlock and open the door 811 of the storage box 810 in which the package that has the lowest priority is stored. Next, the CPU 831 outputs, to the robot arm 823, a control signal similar to the control signal described in Embodiment 4, thereby causing the robot arm 823 to lift the package that has the lowest priority stored in the storage box 810 and place that package on the package stand 822.

Thereafter, the CPU 831 of the locker device 228 outputs an unstorable notification to the data communication circuit 834*a* with the delivery control server 310 as the destination. When the delivery control server 310 receives the unstorable notification, the delivery control server 310 sends an exchange instruction to the unmanned aircraft 390. When the unmanned aircraft 390 receives the exchange instruction, the unmanned aircraft 390 releases the package onto the package stand 821 of the locker device 228 and, then, loads the package that has the low priority and that is placed on the package stand 822.

Thereafter, the locker device 228 uses the robot arm 823 to store the package, placed on the package stand 821 by the unmanned aircraft 390, in the storage box 810 that has been emptied. Thereafter, the CPU 831 outputs the box ID and a close signal to the drive circuit 839 to close and lock the door 811.

Next, the CPU 831 acquires and sets the system time as the store time and, then, in the box management table of FIG. 45, updates the information associated with the box ID of the storage box 810 in which the package exchanging was performed with state information expressing the in-use state, the package ID and the card ID included in the arrival notification, information expressing the store time, and information expressing the highest priority. The reason for setting to the highest priority is because the amount of storage time of the package stored in the locker device 228 by the exchanging is shorter than that of all of the other packages already stored in the locker device 228.

Next, the CPU 831 outputs, to the data communication circuit 834a with the delivery control server 310 as the destination, an exchange completion notification that includes the package ID of the package loaded on the unmanned aircraft 390.

According to these configurations, the priority assigned to a package is lowered as the amount of storage time of the package increases. Due to these configurations, the need to acquire, for each package, the latitude and longitude of the mobile terminal 10 of the user on a predetermined cycle, which is the case with the delivery control server 310 according to Embodiment 4, is eliminated. As such, the amount of calculations and amount of information needed to assign priority are reduced. Additionally, since the need to acquire, for each package, the latitude and longitude of the mobile terminal 10 of the user on a predetermined cycle is eliminated, the locker device 228 can assign priorities to packages for which the recipient is unknown, for example. Furthermore, the locker device 228 can assign priorities to packages even when the information expressing the latitude and longitude of the mobile terminal 10 of the recipient cannot be acquired.

Embodiments 1 to 4, Modified Examples 1 to 21 of Embodiment 1, Modified Examples 1 and 2 of Embodiment 2, Modified Examples 1 to 3 of Embodiment 3, and the Modified Example of Embodiment 4 can each be combined with each other. It is possible to provide information processing devices 10 and 310 that include configurations for realizing the functions according to any of Embodiments 1 to 4, Modified Examples 1 to 21 of Embodiment 1, Modified Examples 1 and 2 of Embodiment 2, Modified Examples 1 to 3 of Embodiment 3, and the Modified Example of Embodiment 4. Moreover, it is possible to provide a system that includes a plurality of devices that includes, as an overall system, configurations for realizing the functions according to any of Embodiments 1 to 4, Modified Examples 1 to 21 of Embodiment 1, Modified Examples 1 and 2 of Embodiment 2, Modified Examples 1 to 3 of Embodiment 3, and the Modified Example of Embodiment 4.

Additionally, by applying a program, an existing information processing devices 10 and 310 can be made to respectively function as the information processing devices 10 and 310 according to any of Embodiments 1 to 4, Modified Examples 1 to 21 of Embodiment 1, Modified Examples 1 and 2 of Embodiment 2, Modified Examples 1 to 3 of Embodiment 3, and the Modified Example of Embodiment 4. That is, by applying a program for realizing the various functional configurations of the information processing devices 10 and 310 described in any of Embodiments 1 to 4, Modified Examples 1 to 21 of Embodiment 1, Modified Examples 1 and 2 of Embodiment 2, Modified Examples 1 to 3 of Embodiment 3, and the Modified Example of Embodiment 4 so as to be executable by a computer (CPU or the like) that controls existing information processing devices, those existing information processing devices can be caused to function as the information processing devices 10 and 310 according to any of Embodiments 1 to 4, Modified Examples 1 to 21 of Embodiment 1, Modified Examples 1 and 2 of Embodiment 2, Modified Examples 1 to 3 of Embodiment 3, and the Modified Example of Embodiment 4.

Any distribution method of such a program can be used. For example, the program can be stored and distributed on a recording medium such as a memory card, a compact disc read-only memory (CD-ROM), or a digital versatile disk read-only memory (DVD-ROM), or can be distributed via a communication medium such as the internet. Additionally, a method according to the present disclosure can be implemented using the information processing device 10 or 310 according to any of Embodiments 1 to 4, Modified Examples 1 to 21 of Embodiment 1, Modified Examples 1 and 2 of Embodiment 2, Modified Examples 1 to 3 of Embodiment 3, and the Modified Example of Embodiment 4.

Preferred embodiments of the present disclosure have been described, but the present disclosure should not be construed as being limited to these specific embodiments. Various modifications and changes may be made within the broader spirit and scope of the invention as set forth in the claims.

APPENDIX

Appendix 1

An information processing device, including:
an information acquirer that acquires
to-be-delivered package information related to a package to be delivered to a user, and
movement information related to a movement of the user to a first geographical point; and
an information generator that generates, on the basis of the movement information, receiving method information expressing a receiving method whereby the user receives the package related to the to-be-delivered package information, the receiving method information being generated from when the movement information is acquired to when the user arrives at the first geographical point.

Appendix 2

The information processing device according to appendix 1, wherein
the information acquirer acquires the movement information that includes information expressing the first geographical point and information expressing an expected arrival time of the user at the first geographical point, and
the information generator generates the receiving method information expressing the receiving method whereby the user receives the package at a receiving location determined on the basis of the first geographical point and at a receiving time determined on the basis of the expected arrival time.

Appendix 3

The information processing device according to appendix 1 or 2, wherein the information generator generates the receiving method information in a case in which the movement of the user to the first geographical point is detected and the package to be delivered to the user exists.

Appendix 4

The information processing device according to appendix 3, wherein
the information acquirer further acquires a notification notifying of an entering to, a passing of, or an exiting from a predetermined location by the user, and
the information processing device further includes a movement detector that detects, on the basis of the acquired notification, the movement of the user from the predetermined location or the movement of the user passing the predetermined location.

Appendix 5

The information processing device according to appendix 4, wherein
the predetermined location is a predetermined station at which a train or a fixed-route bus stops, and
the first geographical point is a geographical point located at a station at which the train or the fixed-route bus stops, and that is different than the predetermined station.

Appendix 6

The information processing device according to appendix 3, wherein
the information acquirer further acquires information expressing a position of the user and information expressing the movement that includes an entering to, a passing of, or an exiting from the predetermined location by the user and an arrival of the user at the first geographical point, the movement being predicted on the basis of a movement history of the user, and
the information processing device further includes a movement detector that detects, on the basis of the acquired information expressing the position of the user and the acquired information expressing the predicted movement, the movement of the user arriving at the first geographical point from the predetermined location or by passing the predetermined location.

Appendix 7

The information processing device according to any one of appendices 1 to 6, wherein the receiving method is presented to the user and is selected, adjusted, or approved by the user.

Appendix 8

The information processing device according to any one of appendices 1 to 7, further including:
an instruction outputter that outputs, on the basis of the receiving method, an instruction related to delivery.

Appendix 9

The information processing device according to appendix 8, wherein the instruction includes an instruction related to control of an unmanned vehicle that delivers the package.

Appendix 10

The information processing device according to appendix 9, wherein
the unmanned vehicle is an unmanned ground vehicle or an unmanned aircraft, and
the receiving method includes delivery by the unmanned vehicle to a second geographical point positioned on a movement route to the first geographical point or in a vicinity of the movement route.

Appendix 11

The information processing device according to any one of appendices 1 to 9, wherein the receiving method further includes delivery to a locker device positioned on a movement route to the first geographical point or in a vicinity of the movement route.

Appendix 12

The information processing device according to appendix 10, wherein the receiving method includes delivery to a locker device positioned on the movement route to the first geographical point or in the vicinity of the movement route.

Appendix 13

The information processing device according to appendix 11 or 12, further including:
a reserver that reserves the locker device.

Appendix 14

The information processing device according to appendix 2, further including:
an instruction outputter that outputs, to an unmanned vehicle caused to deliver the package, an instruction related to a delivery start time of the package determined on the basis of the receiving time, and a delivery route determined on the basis of the receiving location.

Appendix 15

A program causing a computer to function as:
an information acquirer that acquires
to-be-delivered package information related to a package to be delivered to a user, and
movement information related to a movement of the user to a first geographical point; and
an information generator that generates, on the basis of the movement information, receiving method information expressing a receiving method whereby the user receives the package related to the to-be-delivered package information, the receiving method information being generated from when the movement information is acquired to when the user arrives at the first geographical point.

Appendix 16

A method that is executed by an information processing device, the method including:
a first information acquisition step of acquiring, by the information processing device, to-be-delivered package information related to a package to be delivered to a user;
a second information acquisition step of acquiring, by the information processing device, movement information related to a movement of the user to a first geographical point; and
an information generation step of generating, by the information processing device and on the basis of the movement information, receiving method information expressing a receiving method whereby the user receives the package related to the to-be-delivered package information, the receiving method information being generated from when the movement information is acquired to when the user arrives at the first geographical point.

REFERENCE SIGNS LIST

1 Information processing system
10 Information processing device (mobile terminal)

11 IC card
21, 22 Train station service system
30 Delivery system
101, 281, 311, 831, 911 CPU
102, 282, 312, 832, 912 RAM
103a, 283a, 313a, 833a, 913a ROM
103b, 283b, 833b, 913b Flash memory
104a, 834a, 914a Data communication circuit
104b Voice communication circuit
105, 835, 915 Touch panel
105a, 315a, 915a Video card
105b, 315b, 915b Display device
105c, 315c, 915c Input device
106, 916 GPS circuit
107a Speaker
107b Microphone
121, 321 Information acquirer
122, 322 Information storer
123, 123 Movement detector
124, 324 Information generator
125 Audio and display controller
126, 326 Instruction outputter
129, 329 Information storage unit
211, 212, 221, 222 Automatic ticket gate
216a, 216b, 811 Door
217, 837 IC card RW
218, 830, 910 Control device
219a Master
219b Slave
228, 229, 880 Locker device
284, 314 Communication circuit
288, 838, 918 Input/output port
289, 839, 919 Drive circuit
310 Information processing device (delivery control server)
313b Hard disk
325 Reserver
327 Movement predictor
328 Prioritizer
380 Unmanned ground vehicle
390 Unmanned aircraft
810, 950 Storage box
812 Door frame
813 Deadbolt
814 Strike plate
821, 822 Package stand
823 Robot arm
824, 890, 951, 952 Imaging device
861, 862 Wheel
870 Vehicle body
921 to 924 Propeller arm
931 to 934 Propeller
941a First holding frame
941b Second holding frame
942a, 942b Guide rail
DA Delivery area
IN Internet
MA Map display area
R1, R2 Receiving location icon
TA Receiving time display area

The invention claimed is:

1. An information processing device, comprising:
at least one memory storing program code thereon; and
at least one processor operable to read the program code and operate as instructed by the program code, wherein the program code includes:

information acquiring code configured to cause the at least one processor to acquire
to-be-delivered package information related to a package to be delivered to a user, and a notification notifying of an entering to, a passing of, or an exiting from a predetermined station by the user, the predetermined station being a station at which a train or a fixed-route bus stops; and
movement detecting code configured to cause the at least one processor to detect, on the basis of the acquired notification, a movement of the user from the predetermined station or a movement of the user passing the predetermined station,
the information acquiring code is configured to, (a) when the movement of the user is detected and (b) when there is a package (i) that is the package related to the to-be-delivered package information and (ii) for which receiving method information expressing a receiving method whereby the user receives the package is not generated, cause the at least one processor to output a notification notifying of existence of the package and then cause the at least one processor to further acquire movement information related to the movement of the user,
the movement information includes (i) information expressing a first geographical point that is a geographical point selected by the user and located at a station different than the predetermined station and (ii) information expressing an expected arrival time that is a time selected by the user and a time at which the train or the fixed-route bus is to arrive at the first geographical point, and
the program code further includes:
information generating code configured to cause the at least one processor to generate receiving method information expressing a receiving method whereby the user receives the package at a receiving location determined on the basis of the first geographical point selected by the user and at a receiving time determined on the basis of the expected arrival time selected by the user, the receiving method information being generated from when the movement information is acquired to when the user arrives at the first geographical point; and
instruction outputting code configured to cause the at least one processor to
(a) output, on the basis of the receiving method, an instruction including an instruction (i) related to delivery of the package and (ii) that controls an unmanned vehicle to cause the unmanned vehicle to deliver the package, or
(b) output, to the unmanned vehicle, an instruction related to (i) a delivery start time of the package determined on the basis of the receiving time and (ii) a delivery route determined on the basis of the receiving location.

2. The information processing device according to claim 1, wherein
when the movement of the user is detected, the receiving method is presented to the user and is selected, adjusted, or approved by the user, and
the instruction outputting code is configured to cause the at least one processor to output the instruction related to the delivery, on the basis of the selected, adjusted, or approved receiving method.

3. The information processing device according to claim 2, wherein the receiving method includes delivery by an unmanned vehicle to a locker device positioned on a movement route to the first geographical point or in a vicinity of the movement route, the unmanned vehicle delivering the package and including an unmanned ground vehicle or an unmanned aircraft.

4. The information processing device according to claim 3, wherein
the program code further includes reserving code configured to cause the at least one processor to reserve the locker device.

5. A non-transitory computer-readable recording medium storing a program thereon that, upon execution by a computer, causes the computer to function as:
an information acquirer that acquires
to-be-delivered package information related to a package to be delivered to a user, and a notification notifying of an entering to, a passing of, or an exiting from a predetermined station by the user, the predetermined station being a station at which a train or a fixed-route bus stops; and
a movement detector that detects, on the basis of the acquired notification, a movement of the user from the predetermined station or a movement of the user passing the predetermined station, wherein
(a) when the movement of the user is detected and (b) when there is a package (i) that is the package related to the to-be-delivered package information and (ii) for which receiving method information expressing a receiving method whereby the user receives the package is not generated, the information acquirer outputs a notification notifying of existence of the package and then further acquires movement information related to the movement of the user,
the movement information includes (i) information expressing a first geographical point that is a geographical point selected by the user and located at a station different than the predetermined station and (ii) information expressing an expected arrival time that is a time selected by the user and a time at which the train or the fixed-route bus is to arrive at the first geographical point, and
the program, upon execution by the computer, causes the computer to further function as:
an information generator that generates, receiving method information expressing a receiving method whereby the user receives the package at a receiving location determined on the basis of the first geographical point selected by the user and at a receiving time determined on the basis of the expected arrival time selected by the user, the receiving method information being generated from when the movement information is acquired to when the user arrives at the first geographical point; and
an instruction outputter that
(a) outputs, on the basis of the receiving method, an instruction including an instruction (i) related to delivery of the package and (ii) that controls an unmanned vehicle to cause the unmanned vehicle to deliver the package, or
(b) outputs, to the unmanned vehicle, an instruction related to (i) a delivery start time of the package determined on the basis of the receiving time and (ii) a delivery route determined on the basis of the receiving location.

6. A method that is executed by an information processing device, the method comprising:
acquiring, by the information processing device, to-be-delivered package information related to a package to be delivered to a user;
acquiring, by the information processing device, a notification notifying of an entering to, a passing of, or an exiting from a predetermined station by the user, the predetermined station being a station at which a train or a fixed-route bus stops;
detecting, by the information processing device and on the basis of the acquired notification, a movement of the user from the predetermined station or a movement of the user passing the predetermined station; and
(a) when the movement of the user is detected and (b) when there is a package (i) that is the package related to the to-be-delivered package information and (ii) for which receiving method information expressing a receiving method whereby the user receives the package is not generated, outputting, by the information processing device, a notification notifying of existence of the package and then further acquiring, by the information processing device, movement information related to the movement of the user, wherein
the movement information includes (i) information expressing a first geographical point that is a geographical point selected by the user and located at a station different than the predetermined station and (ii) information expressing an expected arrival time that is a time selected by the user and a time at which the train or the fixed-route bus is to arrive at the first geographical point, and
the method further comprises:
generating, by the information processing device, receiving method information expressing a receiving method whereby the user receives the package at a receiving location determined on the basis of the first geographical point selected by the user and at a receiving time determined on the basis of the expected arrival time selected by the user, the receiving method information being generated from when the movement information is acquired to when the user arrives at the first geographical point; and
outputting, by the information processing device,
(a) on the basis of the receiving method, an instruction including an instruction (i) related to delivery of the package and (ii) that controls an unmanned vehicle to cause the unmanned vehicle to deliver the package, or
(b) to the unmanned vehicle that is caused, by the information processing device, to deliver the package, an instruction related to (i) a delivery start time of the package determined on the basis of the receiving time and (ii) a delivery route determined on the basis of the receiving location.

* * * * *